US012411913B2

(12) United States Patent
Nagao et al.

(10) Patent No.: US 12,411,913 B2
(45) Date of Patent: Sep. 9, 2025

(54) CRYPTOGRAPHIC TOKEN RIGHTS MANAGEMENT SYSTEMS AND METHODS USING TRUSTED LEDGERS

(71) Applicant: Intertrust Technologies Corporation, Milpitas, CA (US)

(72) Inventors: Yutaka Nagao, Minami-Alps (JP); Vishisht Tiwari, Fremont, CA (US); Rohaan Advani, San Francisco, CA (US); Jayant Kannadkar, Sunnyvale, CA (US)

(73) Assignee: Intertrust Technologies Corporation, Berkeley, CA (US)

( * ) Notice: Subject to any disclaimer, the term of this patent is extended or adjusted under 35 U.S.C. 154(b) by 78 days.

(21) Appl. No.: 17/956,439

(22) Filed: Sep. 29, 2022

(65) Prior Publication Data

US 2023/0102525 A1 Mar. 30, 2023

Related U.S. Application Data

(60) Provisional application No. 63/315,874, filed on Mar. 2, 2022, provisional application No. 63/291,929, filed
(Continued)

(51) Int. Cl.
*G06F 21/10* (2013.01)
*G06Q 20/38* (2012.01)
(Continued)

(52) U.S. Cl.
CPC ......... *G06F 21/10* (2013.01); *G06Q 20/3827* (2013.01); *G06Q 2220/18* (2013.01);
(Continued)

(58) Field of Classification Search
CPC ...................................................... G06F 21/10
See application file for complete search history.

(56) References Cited

U.S. PATENT DOCUMENTS 9,112,862 B2 * 8/2015 Sorotokin ............... G06F 21/10
10,447,478 B2 * 10/2019 Gray ........................ H04L 9/32
(Continued)

FOREIGN PATENT DOCUMENTS

| CN | 1577205 A | * | 2/2005 | ............. G06F 21/00 |
| CN | 107682328 A | * | 2/2018 | ............. H04L 63/12 |

(Continued)

OTHER PUBLICATIONS

E. Bellini, Y. Iraqi and E. Damiani, "Blockchain-Based Distributed Trust and Reputation Management Systems: A Survey," in IEEE Access, vol. 8, pp. 21127-21151, 2020. https://ieeexplore.ieee.org/stamp/stamp.jsp?tp=&arnumber=8970496 (Year: 2020).*
(Continued)

*Primary Examiner* — El Mehdi Oussir
(74) *Attorney, Agent, or Firm* — John P. Davis; Thayne and Davis LLC

(57) ABSTRACT

The disclosure relates to, among other things, systems and methods for securely managing digital assets, products, and/or associated tokens in a dynamic way. Various embodiments disclosed herein may use trusted ledgers to securely record certain assertions relating to the digital assets, products, rightsholders, and/or various ecosystems participants. Such assertions may be used in connection with rights binding, content packaging, management, and/or protection operations in connection with a variety of transactions associated with digital assets, products, and/or associated tokens.

13 Claims, 55 Drawing Sheets

Related U.S. Application Data on Dec. 20, 2021, provisional application No. 63/261,821, filed on Sep. 29, 2021.

(51) Int. Cl.
*H04L 9/08* (2006.01)
*H04L 9/32* (2006.01)
*H04L 9/40* (2022.01)

(52) U.S. Cl.
CPC .......... *H04L 9/0822* (2013.01); *H04L 9/3213* (2013.01); *H04L 63/10* (2013.01); *H04L 2209/603* (2013.01)

(56) References Cited

U.S. PATENT DOCUMENTS

| | | | | |
|---|---|---|---|---|
| 10,503,905 | B1* | 12/2019 | Misra | G06F 21/64 |
| 10,958,419 | B2* | 3/2021 | Schuler | H04L 9/0637 |
| 11,356,448 | B1* | 6/2022 | Varanasi | H04L 63/0272 |
| 11,564,266 | B1* | 1/2023 | Kahn | H04W 12/69 |
| 11,625,694 | B2* | 4/2023 | Wright | G06F 16/27 |
| | | | | 705/71 |
| 11,720,549 | B1* | 8/2023 | McKervey | H04L 9/3239 |
| | | | | 707/690 |
| 11,954,147 | B1* | 4/2024 | Della Santa | G06F 16/27 |
| 11,995,625 | B1* | 5/2024 | Irwin | G06Q 50/184 |
| 12,118,127 | B1* | 10/2024 | Cordi | H04L 9/3297 |
| 2003/0041110 | A1* | 2/2003 | Wenocur | H04L 63/126 |
| | | | | 709/206 |
| 2010/0317420 | A1* | 12/2010 | Hoffberg | G06Q 30/0282 |
| | | | | 463/1 |
| 2013/0159021 | A1* | 6/2013 | Felsher | G16H 10/60 |
| | | | | 705/3 |
| 2015/0047007 | A1* | 2/2015 | Colnot | H04L 9/3271 |
| | | | | 726/1 |
| 2016/0127334 | A1* | 5/2016 | Bangole | H04L 67/12 |
| | | | | 713/171 |
| 2017/0344728 | A1* | 11/2017 | Steele | H04L 9/3231 |
| 2019/0065709 | A1* | 2/2019 | Salomon | H04L 9/0643 |
| 2020/0120023 | A1* | 4/2020 | Munson | G06F 21/602 |
| 2020/0273048 | A1 | 8/2020 | Andon et al. | |
| 2021/0035246 | A1 | 2/2021 | Schouppe et al. | |
| 2021/0184859 | A1* | 6/2021 | Wilbrecht | H04L 9/0618 |
| 2021/0200892 | A1* | 7/2021 | Nagao | G06F 21/10 |
| 2021/0201310 | A1* | 7/2021 | Moss-Pultz | G06F 21/64 |
| 2021/0266150 | A1* | 8/2021 | Ornelas | G06F 3/0679 |
| 2021/0279305 | A1 | 9/2021 | Goldston et al. | |
| 2021/0279695 | A1* | 9/2021 | Rice | G06Q 20/12 |
| 2022/0021728 | A1* | 1/2022 | Kelly | G06F 21/6245 |
| 2022/0210061 | A1* | 6/2022 | Simu | H04L 9/3239 |
| 2022/0270089 | A1* | 8/2022 | Babar | G06Q 20/401 |
| 2022/0391887 | A1* | 12/2022 | Jakobsson | H04L 9/3239 |
| 2022/0398340 | A1* | 12/2022 | Jakobsson | G06F 21/6245 |
| 2023/0011621 | A1* | 1/2023 | Jakobsson | H04L 9/3213 |
| 2023/0086191 | A1* | 3/2023 | Jakobsson | H04L 9/3231 |
| | | | | 705/66 |
| 2023/0103486 | A1* | 4/2023 | Nilsson | H04L 9/3247 |
| | | | | 726/26 |
| 2023/0206329 | A1* | 6/2023 | Cella | G06Q 20/0855 |
| 2023/0214925 | A1* | 7/2023 | Cella | G06Q 30/06 |
| | | | | 705/37 |
| 2023/0222187 | A1* | 7/2023 | Goldston | G06F 16/686 |
| | | | | 726/28 |
| 2023/0325473 | A1* | 10/2023 | Buffard | G06F 21/1064 |
| | | | | 713/155 |
| 2024/0171393 | A1* | 5/2024 | Bathen | H04L 9/3247 |
| 2024/0396752 | A1* | 11/2024 | Khan | H04L 9/3239 |

FOREIGN PATENT DOCUMENTS

| | | | | |
|---|---|---|---|---|
| CN | 111201752 | A * | 5/2020 | G06F 21/602 |
| CN | 112019586 | A * | 12/2020 | G06F 16/2255 |
| CN | 112512019 | A * | 3/2021 | G06Q 10/02 |
| CN | 110235410 | B * | 5/2022 | H04L 9/3213 |
| CN | 110268678 | B * | 6/2022 | G06F 21/30 |
| CN | 117216740 | A * | 12/2023 | |
| EP | 3413507 | A1 * | 12/2018 | G06F 21/645 |
| JP | 2008210410 | A * | 9/2008 | G06F 17/00 |
| KR | 20220146088 | A * | 11/2022 | |
| WO | WO-2013081849 | A1 * | 6/2013 | G06F 21/105 |
| WO | WO-2018131885 | A1 * | 7/2018 | G06Q 20/027 |
| WO | WO-2018151426 | A1 * | 8/2018 | H04L 9/3213 |
| WO | WO-2019213752 | A1 * | 11/2019 | |
| WO | 20200123464 | | 6/2020 | |
| WO | WO-2020123464 | A1 * | 6/2020 | G06F 21/6218 |
| WO | WO-2022076028 | A1 * | 4/2022 | G06F 21/10 |
| WO | WO-2023034527 | A1 * | 3/2023 | G06F 21/44 |
| WO | WO-2025015369 | A1 * | 1/2025 | |
| WO | WO-2025019042 | A1 * | 1/2025 | G06F 8/60 |
| WO | WO-2025081164 | A1 * | 4/2025 | |

OTHER PUBLICATIONS

"IEEE Standard Protocol for Stream Management in Media Client Devices," in IEEE Std 2200-2012 , vol. No., pp. 1-196, Aug. 9, 2012. https://ieeexplore.ieee.org/document/6265328?source=IQplus (Year: 2012).*

H. R. Hasan and K. Salah, "Proof of Delivery of Digital Assets Using Blockchain and Smart Contracts," in IEEE Access, vol. 6, pp. 65439-65448, 2018. https://ieeexplore.ieee.org/abstract/document/8501910 (Year: 2018).*

J. Gao, H. Yu, X. Zhu and X. Li, "Blockchain-Based Digital Rights Management Scheme via Multiauthority Ciphertext-Policy Attribute-Based Encryption and Proxy Re-Encryption," in IEEE Systems Journal, vol. 15, No. 4, pp. 5233-5244. https://ieeexplore.ieee.org/document/9387553?source=IQplus (Year: 2021).*

J. Kishigami, S. Fujimura, H. Watanabe, A. Nakadaira and A. Akutsu, "The Blockchain-Based Digital Content Distribution System," 2015 IEEE Fifth International Conference on Big Data and Cloud Computing, Dalian, 2015, pp. 187-190. https://ieeexplore.ieee.org/document/7310737?source=IQplus (Year: 2015).*

A. Kaushik and M. Malik, "Securing the transfer and controlling the piracy of digital files using Blockchain," 2022 Fifth International Conference on Computational Intelligence and Communication Technologies (CCICT), Sonepat, India.https://ieeexplore.ieee.org/document/9913594?source=IQplus (Year: 2022).*

Jan. 20, 2023 International Search Report—International Application No. PCT/US2022/045253 (6 pgs).

Jan. 20, 2023 Written Opinion of the International Searching Authority—International Application No. PCT/US2022/045253 (6 pgs).

EPO Official Communication—EP Application No. 22797935.8—Objections raised in the Written Opinion issued in connection with the corresponding international PCT Application No. PCT/US2022/045253 (3 pgs).

* cited by examiner

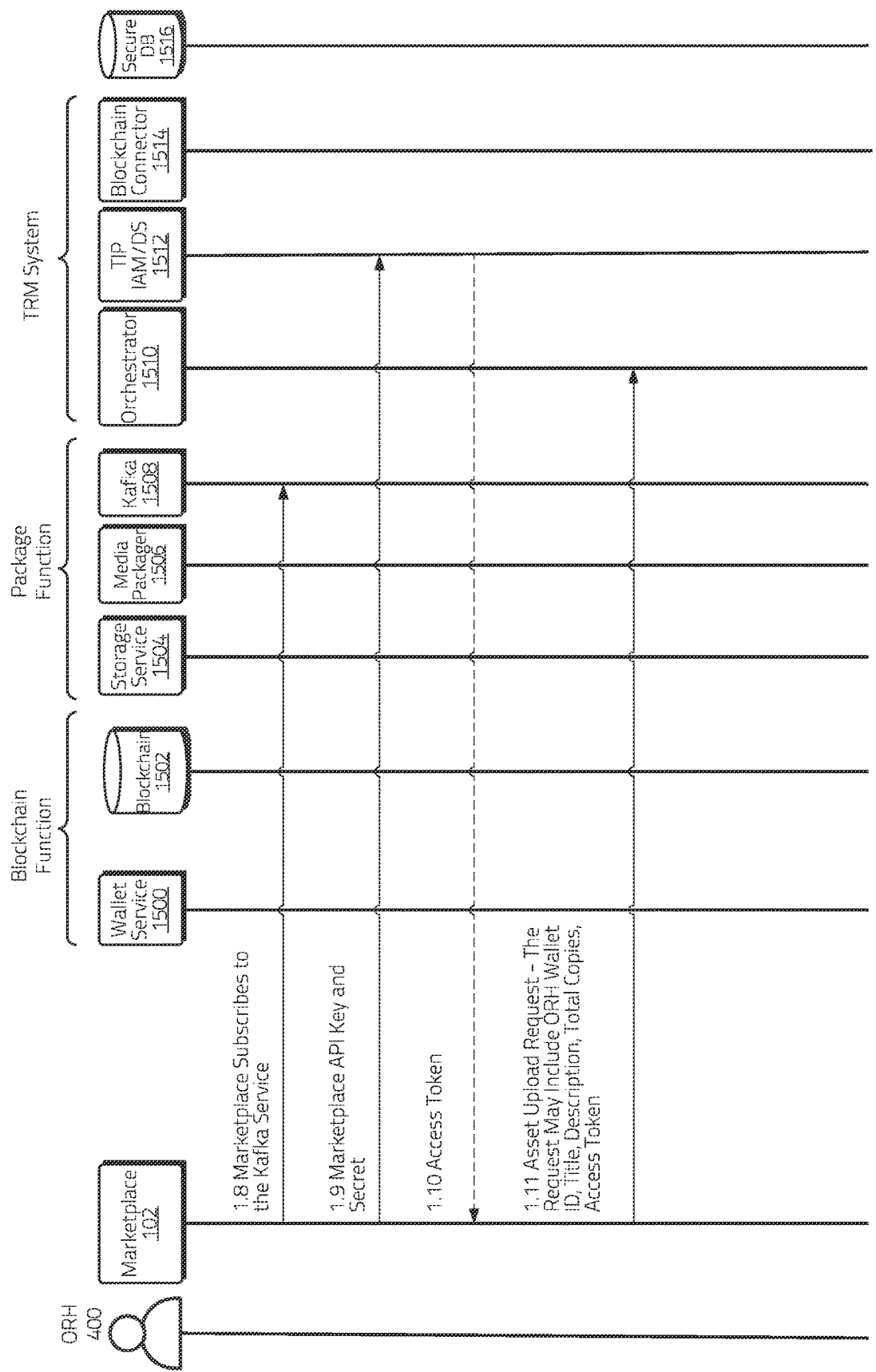

CRYPTOGRAPHIC TOKEN RIGHTS MANAGEMENT SYSTEMS AND METHODS USING TRUSTED LEDGERS

RELATED APPLICATIONS

This application claims the benefit of priority under 35 U.S.C. § 119(e) to U.S. Provisional Patent Application No. 63/261,821 filed Sep. 29, 2021, and entitled "CRYPTOPGRAHIC TOKEN MANAGEMENT SYSTEMS AND METHODS," to U.S. Provisional Patent Application No. 63/291,929 filed Dec. 20, 2021, and entitled "SYSTEMS AND METHODS FOR CRYPTOGRAPHIC TOKEN MANAGEMENT USING TRUSTED LEDGERS," and to U.S. Provisional Patent Application No. 63/315,874 filed Mar. 2, 2022, and entitled "CRYPTOGRAPHIC TOKEN RIGHTS MANAGEMENT SYSTEMS AND METHODS USING TRUSTED LEDGERS," the contents of which are hereby incorporated by referenced in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing cryptographic tokens. More specifically, the present disclosure relates to systems and methods for managing non-fungible tokens ("NFT") and rights to associated content in a NFT marketplace using trusted ledgers.

An NFT is a type of cryptographic token on a trusted distributed ledger (e.g., a blockchain ledger) that may represent an asset, which may comprise a digital asset and/or a physical asset. NFTs may be used in a variety of contexts, with applications varying from simple digital asset transactions to complex collateral loans.

NFT paradigms may be implemented using a variety of architectures. For example, a centralized server may be used to store metadata associated with a digital asset. The server may create a reference to that data and may store a reference link in a trusted ledger such as a cryptographic blockchain. This approach may be relatively high speed and inexpensive in implement in terms of costs and processing power, and may allow for flexible updating of referenced metadata which is not directly stored in the trusted lodger. However, if the server goes down, there may not be enough data in the trusted ledger to allow one to obtain the original asset, potentially rendering the NFT essentially useless. In addition, if an owner deletes or changes the location of the data and the asset is not stored on the central server, then the link to the asset may not function as intended.

Another approach to implementing an NFT paradigm may involve the storage of metadata on a trusted ledger itself. This may allow relevant data to be stored on the ledger with less third-party dependence and more reliability in the event an NFT marketplace goes down. There are, however, additional costs for this type of implementation in terms of expense, speed, and/or processing demands.

Embodiments of the systems and methods may provide an improved architecture for managing digital assets. In certain embodiments, metadata associated with digital assets may be stored in a server database, and the correlation of digital assets and associated metadata may be securely stored in a trusted ledger, which may comprise a blockchain ledger.

Many conventional NFT marketplaces may not be well suited to address copyright concerns. For example, if a marketplace customer purchases a NFT for a song, then the customer can download the song and easily upload it on other platforms, potentially in violation of other's rights to the song. Embodiments of the disclosed systems and methods may use digital rights management ("DRM") technology in connection with NFT management paradigms to help ameliorate at least some of these concerns. For example, using various aspects of the disclosed systems and methods, a customer can listen to a purchased song, but they may not be able to download the song and upload it on other platforms in violation of their rights to the song, because the purchased song may be protected with DRM techniques.

In various disclosed embodiments, trusted databases, ledgers, and/or the like (which may be generally referred to herein as "trusted ledgers" and/or variations of the same), may be used to record and/or otherwise manage various assertions associated with digital assets and/or NFTs. In some embodiments, such databases and/or ledgers may be distributed, and may be referred to herein as trusted immutable distributed assertion ledgers ("TIDALs") and/or variations of the same.

In some embodiments, trusted ledgers used in connection with various aspects of the disclosed embodiments may comprise blockchain ledgers. Databases and/or ledgers may, in various embodiments, be public, private, and/or a combination thereof. In certain embodiments, a TIDAL may comprise a public indelible distributed database ("PIDD"). TIDALs consistent with various aspects of the disclosed embodiments may be associated with a variety of properties including, for example, ledger processes that may be resistant to byzantine failures, entries that may be immutable and/or relatively immutable, entries that may be time-synced (at least in part), entries that may be scalable, and/or entries that may be available for relatively fast lookup.

Embodiments of the disclosed systems and methods may allow for rights binding, packaging, management, and/or protection operations in connection with a variety of NFT transactions (e.g., minting NFTs, transferring NFTs, etc.). DRM functionality and/or key management may be provided, facilitating management of digital assets, products, and/or NFTs based on authenticated access rights.

In some embodiments, digital assets (e.g., digital content) may be packaged into products, serialized, and/or managed in accordance with one or more enforced business conditions. Business conditions may include permitted actions that may be performed in connection with a digital asset and/or an associated product and may be set by entities that hold certain rights to the digital asset and/or associated product. For example and without limitation, business conditions may be used to manage digital assets and/or associated NFTs based on sell models, rental models, subscription models, rent-ownership models, and/or the like.

Embodiments of the disclosed systems and methods may provide elements of an ecosystem for registering and uploading of digital assets, downloading of digital assets and/or products, creation and/or packaging of digital assets and/or products, listing of digital assets and/or products, delisting of digital assets and/or products, updating of digital assets and/or products, sharing of digital assets and/or products, playback of digital assets and/or products, and/or the like. Further embodiments may facilitate compensation of a rights holder and/or plurality of rights holders associated with a digital asset, product, and/or associated NFT(s) based on consumer usage and/or interaction with associated digital assets, products, and/or NFTs. Certain embodiments may use one or more commercial blockchain ledgers such as, for example, the FLOW blockchain, and blockchain connector services to provide mechanisms to readily implement aspects of the disclosed systems and methods with such established blockchain architectures.

BRIEF DESCRIPTION OF THE DRAWINGS

The inventive body of work will be readily understood by referring to the following detailed description in conjunction with the accompanying drawings, in which:

FIG. 15B illustrates a second part of a non-limiting example of an asset creation process using a blockchain ledger consistent with certain embodiments disclosed herein.

DETAILED DESCRIPTION

Figure 1A:
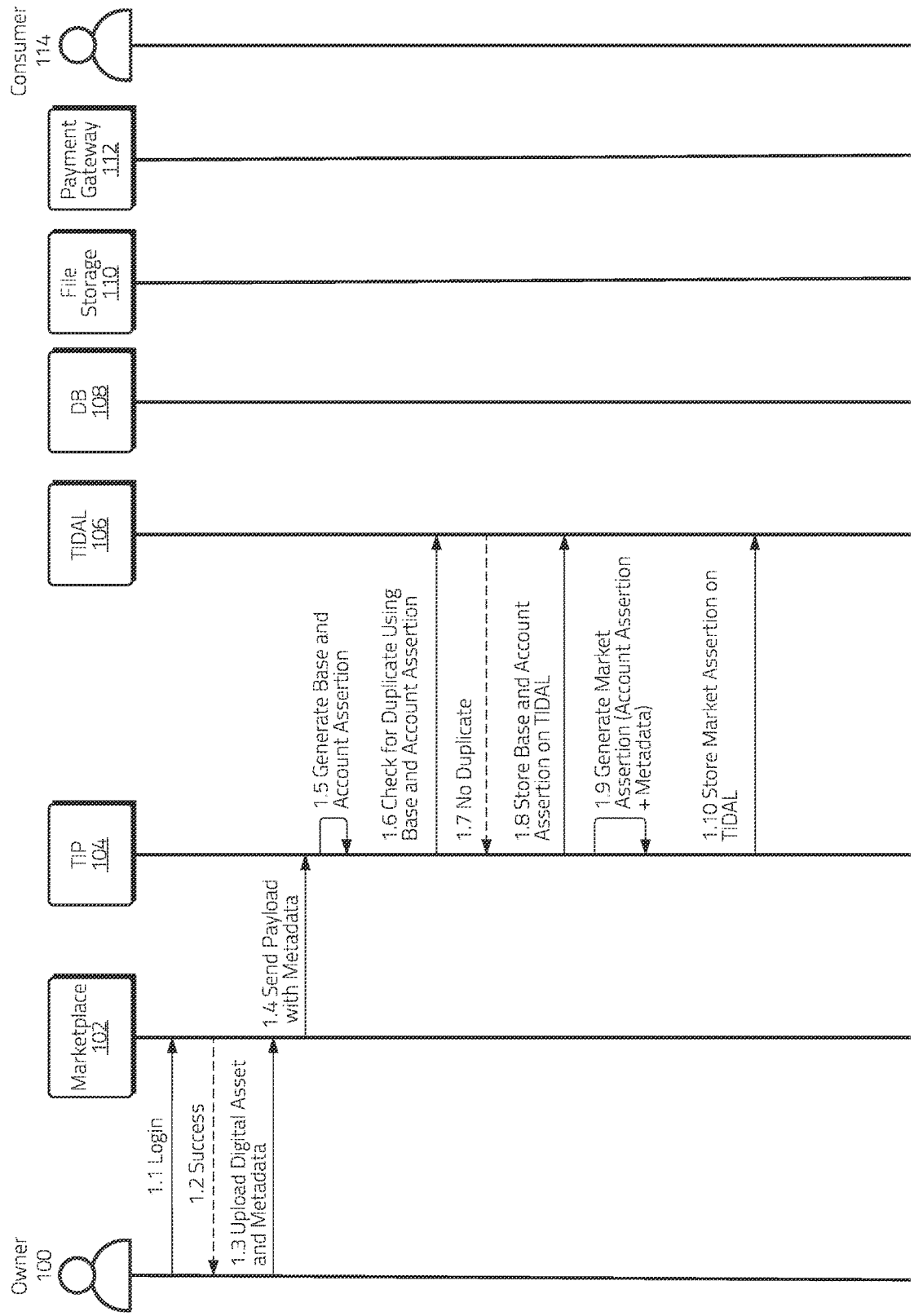
FIG. 1A illustrates a first part of a non-limiting example of a process for registering an NFT asset with a trusted service consistent with certain embodiments disclosed herein.

A description of systems and methods consistent with embodiments of the present disclosure is provided herein. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, where in certain instances, but not necessarily all instances, like parts may be designated by like numerals or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods may provide for dynamic management of digital assets, products, and/or associated NFTs in a secure way, where the rights of rights holders in such assets, products, and/or NFTs are respected and/or otherwise enforced. Various embodiments disclosed herein may use trusted ledgers to securely record certain assertions relating to the digital assets, products, rightsholders, and/or various ecosystems participants. Such assertions may be used in connection with rights binding, content packaging, management, and/or protection operations in connection with a variety of transactions associated with digital assets, products, and/or associated NFTs.

Certain embodiments disclosed herein may be used to manage digital assets, products, and/or associated NFTs in accordance with a variety of associated business conditions, supporting sell models, rental models, subscription models, rent-ownership models, and/or the like, as well as supporting a variety of rights holder compensation models. DRM and/or key management services may be used in connection with managing access to digital assets and/or associated products, which may comprise and/or otherwise be associated with digital content such as, for example and without limitation, audio content, video content, image content, text content, and/or the like. Further embodiments facilitate integration of various aspects of the disclosed systems and methods with established commercial blockchain and digital wallet services using blockchain connector services.

Certain aspects of the disclosed processes may be performed by and/or otherwise be performed in connection with one or more entities, services, and/or systems that may include, for example and without limitation, one or more of:

Marketplace service—An entity, which may comprise a third-party entity that uses a trusted data management platform ("TIP") service (or, in certain instances herein, more generally a "trusted data management service") for NFT and/or DRM implementations.

Owner—A digital asset owner that may upload content to the marketplace service.

TIDAL—A distributed blockchain service and/or other suitable trusted ledger service that may be provided by the TIP service and/or another service and/or entity. Although various examples described herein may use a TIDAL, it will be appreciated that various embodiments and aspects of the disclosed systems and methods may be implemented using a variety of other trusted databases, ledgers, and/or blockchains that may, or may not, have certain attributes associated with a TIDAL. As used herein, a TIDAL may generally describe an assertion ledger having certain properties of a TIDAL as detailed herein (and/or a subset thereof), and in some instances may describe a TIDAL with entries derived and/or otherwise generated based on entries in one or more other ledgers and/or TIDALs, which in some instances may be referred to alternatively and/or additionally as a derivative TIDAL.

DB—A database that may be created by the marketplace service that may interact with data virtualization services.

File storage—A file storage service such as, for example and without limitation, Amazon S3 cloud, that may be used to store an encrypted digital asset.

TIP—In various illustrative examples included herein, "TIP" may reference an API offered by a TIP service for the marketplace service to access various services that may include, for example and without limitation, one or more of the TIDAL, DB, and/or file storage services.

Consumer—A buyer of digital assets through the marketplace service.

Payment gateway—A service facilitating payment between various services and entities in connection with certain transactions involving digital assets.

NFT Asset Registration and Upload

Figure 1B:
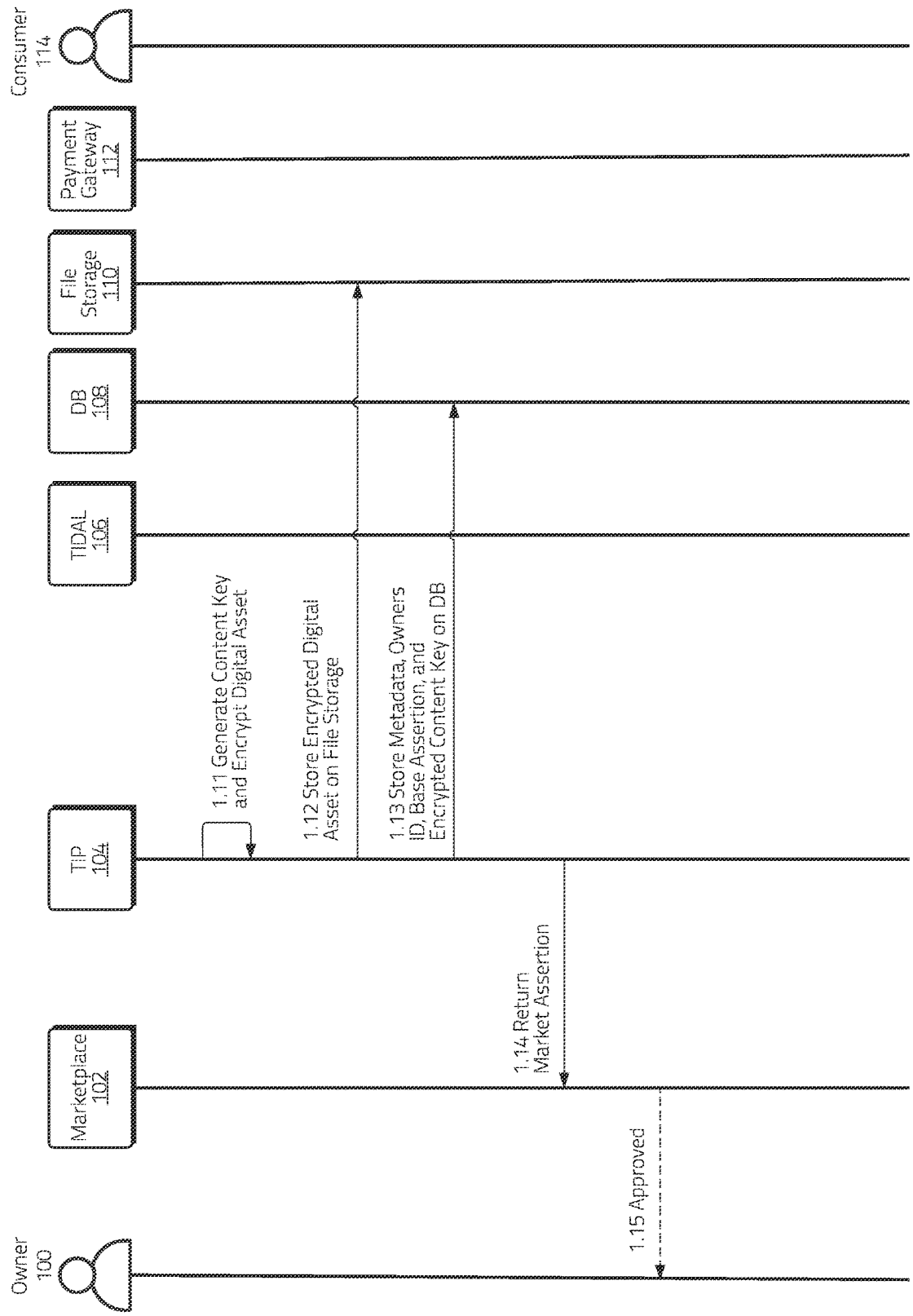
FIG. 1B illustrates a second part of a non-limiting example of a process for registering an NFT asset with a trusted service consistent with certain embodiments disclosed herein.

FIGS. 1A-1B illustrate a non-limiting example of a process for registering an NFT asset consistent with various embodiments of the present disclosure. A variety of entities, services, and/or systems participating in the ecosystem may engage in various aspects of the illustrated processes including, for example and without limitation, an owner 100 of an NFT and/or a digital asset, a marketplace service 102, a TIP service 104, a TIDAL 106, a DB 108 managed by a database service and/or the TIP service 104, a file storage service 110, a payment gateway 112, and/or a consumer 114. Various functionality of the systems, services, entities, and/or execution environments illustrated in FIGS. 1A-1B and elsewhere herein may be integrated into and/or otherwise performed by single systems and/or services and/or any suitable combination of multiple systems and/or services.

It will be appreciated that various aspects of the disclosed embodiments may be used in connection with a variety of types of digital assets, which may be represented by and/or otherwise associated with NFTs. For example, various disclosed embodiments may be used in managing audio, video, image, and/or written content and/or associated NFTs generated by and/or otherwise associated with a variety of content creators, distributors, managers, and/or other parties have interest and/or rights to content within a content ecosystem.

Various aspects of the disclosed NFT management processes are described below in reference to a number of constituent steps.

Account Initialization

A marketplace service 102 that would like to interact with and/or otherwise use a TIP service 104 may contact the TIP administrator to be provisioned with a TIP account. Once the account is set up, the marketplace administrator may connect their database to the TIP service 104. In some embodiments, the TIP administrator may create a dataset using data virtualization ("DV") services that points to a DB 108 managed by a database service and/or the TIP service 104.

The marketplace service 102 can have a user interface that may allow owners 100 and/or consumers 114 to sign up for services. In certain embodiments, this interaction may not necessarily create an account directly but may notify a marketplace administrator to request that an owner 100 and/or consumer 114 log in using a suitable user authentication method (e.g. Google login and/or any other suitable login protocol). Once the account is created and their e-mail verified, the owners 100 and/or consumers 114 may log in to the marketplace service 100 using their associated user authentication credentials. After logging into the marketplace service 100, the owner 100 and/or consumer 114 may be redirected to a user account interface. An owner 100 and/or consumer 114 can enter payment receiving details on this page.

Upload Phase

Steps 1.1-1.2:

The marketplace service 102 may comprise a third-party service using TIP services 104. The TIP service 104 may offer secure execution environment ("SEE") deployment services including, for example and without limitation:

Secure communication and key management for a TIDAL 106 by an SEE.

Controlling access to the DB 108 by multiple entities (e.g., owner 100, consumer 114, etc.) with DV and/or identity access management ("IAM") services.

Secure management of digital asset encryption and key management by an SEE.

An owner 100 may login to the marketplace service 102 using their associated authentication credentials (e.g., using a Google account via Open ID connect and/or another authentication protocol). The marketplace service 102 may authenticate the owner 100, potentially returning an indication of success if the owner 100 is authenticated.

Step 1.3:

The owner 100 may upload a digital asset (e.g., image, video, audio, text, etc. and/or combinations thereof) to the marketplace service 102. In some embodiments, the owner 100 may provide metadata with the uploaded digital asset. The metadata may comprise, for example and without limitation, one or more of:

A title.

A description.

One or more business conditions, which in some embodiments may comprise public and/or private conditions. For example, a public business condition may allow a consumer (e.g., consumer 114) to access (e.g., watch and/or listen to) a digital asset without engaging in an outright transaction (e.g., buy, rent, subscription). Public business conditions in this non-limiting example may comprise, for example, sellout and associated price information. A private business condition may allow, for example, a consumer (e.g., consumer 114) to access (e.g., watch and/or listen to) a digital asset after having completed a purchasing transaction (e.g., buy, rent, subscription). Private business conditions in this non-limiting example may comprise, for example, sellout and associated price information, rental and associated price information, and/or subscription and associated price information, and/or the like.

It will be appreciated that a variety of business conditions may be associated with digital assets and/or products via metadata in connection with various embodiments disclosed herein. Business conditions may express one or more granular conditions and/or permissions including, for example and without limitation, one or more of:

Do not allow for playback under certain conditions. For example and without limitation, playback for a digital asset and/or product may be restricted before a date and/or time and/or after a date and/or time (e.g., a playback period), within a certain country, location, and/or jurisdiction and/or combinations thereof.

Do not allow for rental/subscription to a digital asset and/or product under certain conditions. For example and without limitation, rental of and/or subscription to a digital asset and/or product may be restricted before a date and/or time and/or after a date and/or time (e.g., a rental period), within a certain country, location, and/or jurisdiction, for less than a minimum price, for more than a maximum price, and/or combinations thereof.

Do not allow for sale to a digital asset and/or product under certain conditions. For example and without limitation, sale of a digital asset and/or product may be restricted before a date and/or time and/or after a date and/or time (e.g., a sale period), within a certain country, location, and/or jurisdiction, for less than a minimum price, for more than a maximum price, and/or combinations thereof.

Do not allow for inviting a friend under certain conditions. For example and without limitation, invite permissions may be restricted before a date and/or time and/or after a date and/or time (e.g., an invite period), within a certain country, location, and/or jurisdiction, not to exceed a maximum quantity of invitations (e.g., simultaneous and/or total), and/or combinations thereof.

Limit the maximum quantity of rentals (e.g., simultaneous and/or total rentals)

Limiting the maximum number of sales allowed.

Business conditions articulated in metadata may further express an indication of fractional ownership and/or other rights held in connection with digital assets and/or associated products and/or NFTs. In certain embodiments, such fractional rights may be expressed in terms of ownership and/or rights holding shares, cuts, and/or percentages, although other methods and/or ways of implementing fractional ownership and/or rights holding are also envisioned. For example and without limitation, business conditions may express an indication of a name and/or other identity of rights holders and associated ownership rights and/or percentages of ownership rights for a digital asset, product, and/or associated NFT(s). In various embodiments, such fractional ownership and/or rights and/or rights may be traded and/or otherwise sold and/or exchanged using services enabled by embodiments of the disclosed ecosystem. Moreover, as discussed in more detail below, payment models and/or mechanisms between owners and/or rightsholders may be implemented based, at least in part, on fractional ownership and/or rights information detailed in business conditions.

Step 1.4:

The marketplace service 102 may add identity information associated with the owner 100 to a payload that may include the digital asset and may send the payload along with the associated metadata to the TIP service 104 (e.g., via a REST API). In some embodiments, the marketplace service 102 may receive and/or otherwise retrieve information stored in a user account associated with the owner 100 such as, for example, a name, address, email, contact information, payment receiving details, and/or the like, and may add this information to the metadata.

Steps 1.5-1.7:

The TIP service 104 may generate assertions, which may comprise a base assertion and/or account assertion, based, at least in part, on the uploaded digital asset. For example, in some embodiments, an assertion may comprise a hash generated based on the digital asset and/or associated information (e.g., marketplace and/or owner account information) and/or one or more hashes generated based on the same. In some embodiments, an assertion may comprise a signed hash value, allowing for a measure of authentication of a recorded assertion.

Assertions may be recorded in a trusted ledger, which may comprise a TIDAL 106, although other types of ledgers may also be used in connection with various disclosed embodiments. As detailed above, the base assertion may be generated based on the digital asset by, for example and without limitation, hashing the digital asset. The account assertion may be generated based on the base assertion and identity information associated with the owner 100. For example, the account assertion may comprise a hash of the base assertion concatenated with a token and/or other identification information associated with the owner 100 of the digital asset.

The TIP service 104 may check whether the base assertion (e.g., the hash) exists in the TIDAL 106 and/or a derivative ledger (e.g., a ledger, which may be a TIDAL, with entries derived and/or otherwise generated based on entries in one or more other ledgers and/or TIDALs). When the hash for the base assertion does not exist in the TIDAL 106 (e.g., based on an indication that no duplicates exist in the ledger), the TIP service 104 may ingest and/or otherwise store the base assertion and the account assertion in the TIDAL 106. In some embodiments, the base assertion and the account assertion may be cryptographically signed with a key securely associated with the TIP service 104. The TIDAL 106 and/or a service managing the TIDAL 106 may be managed in accordance with an ingestion policy configured to accept entries into the TIDAL 106 when an entry to be recorded in the TIDAL 106 is signed by the TIP service 104 and/or another authorized service and/or entity.

In some embodiments, when the hash for the base assertion already exists in the TIDAL 106, the TIP service 104 may check whether the account assertion also exists in the TIDAL 106. If the account assertion already exists in the TIDAL 106, this may indicate that the original owner of the digital asset has attempted to re-upload the digital asset. In this case, the process may proceed to Step 1.8. If the account assertion does not exist in the TIDAL 106, this may indicate that a different owner tried to upload a copied digital asset to the marketplace. In this case, an alert message may be returned to terminate further transactions.

Step 1.9-1.14:

Once the base assertion and/or account assertion checks are completed, the TIP service 104 may store market metadata for the digital assets in the DB 108. The TIP service 104 may also create a market assertion and ingest the generated market assertion into the TIDAL 106. In some embodiments, the market assertion may be generated based on the account assertion and the market metadata (which in some embodiments may be defined in Step 1.3). For example, the market assertion may comprise a signed hash of a concatenation of the account assertion and the market metadata. In certain implementations, market assertions may be cryptographically signed with a key associated with the TIP service 104, and the TIDAL's ingestion policy may be configured to accept entries only when they are signed by the TIP service 104.

To protect the uploaded digital asset, the TIP service 104 may generate a content key, which may comprise a symmetric cryptographic content key. The TIP service 104 may encrypt the digital asset with the generated content key, and then encrypt the content key with a key associated with the service (e.g., a secret symmetric key, a public key associated with a private key securely stored by the TIP service, etc.). The TIP service secret key may, in some embodiments, be stored in a secure storage and/or vault of the SEE. The TIP service 104 may store the encrypted content key in the DB 108 and the encrypted digital asset in the file storage service 110. After successful completion, the TIP service 104 may return the market assertion to the marketplace service 102. In some embodiments, an indication of the successful upload and/or registration of a digital asset may be provided to the owner 100 by the marketplace service 102.

Download Phase

Figure 2A:
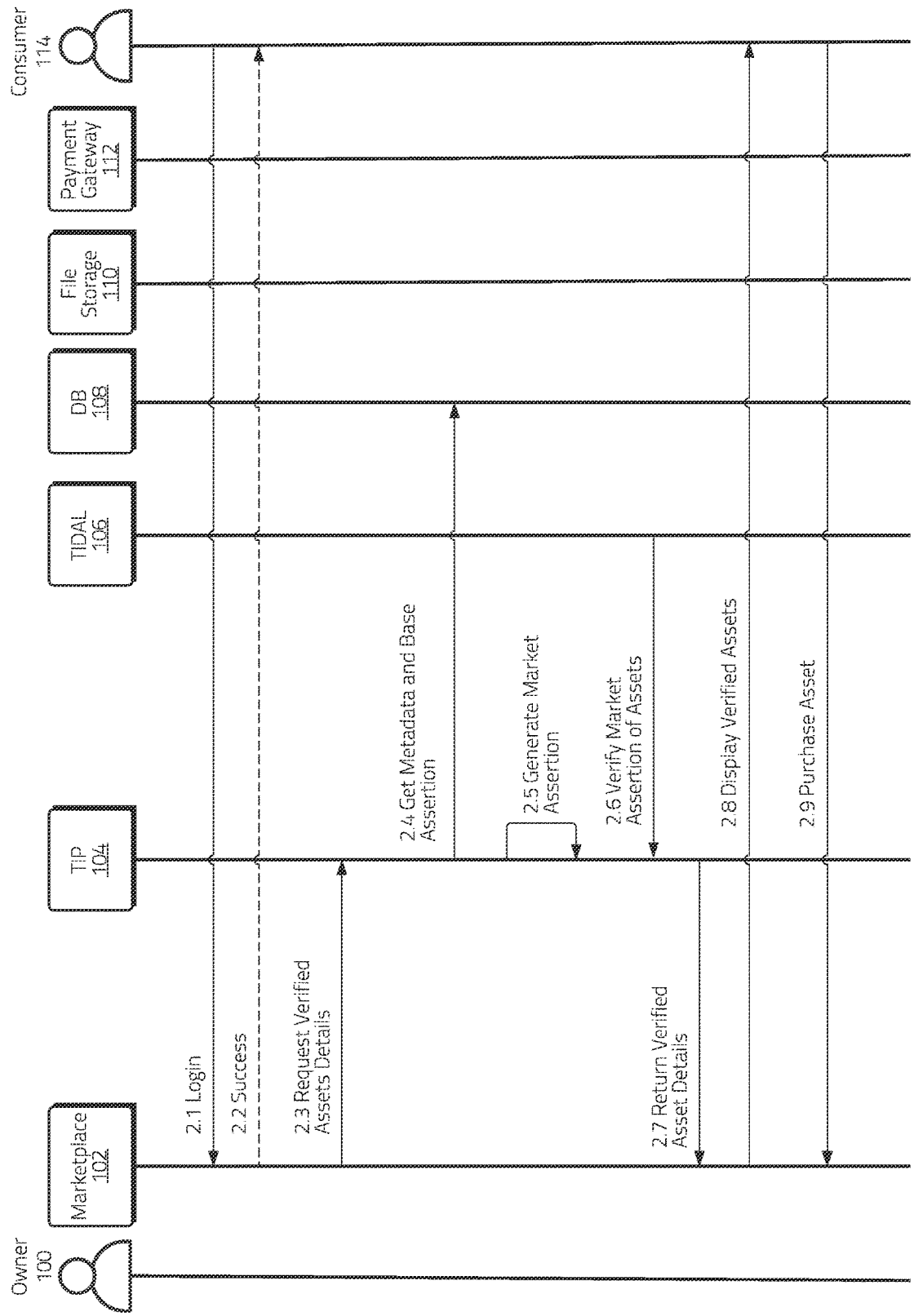
FIG. 2A illustrates a first part of a non-limiting example of a process for purchasing and accessing an NFT asset using a trusted service consistent with certain embodiments disclosed herein.
Figure 2B:
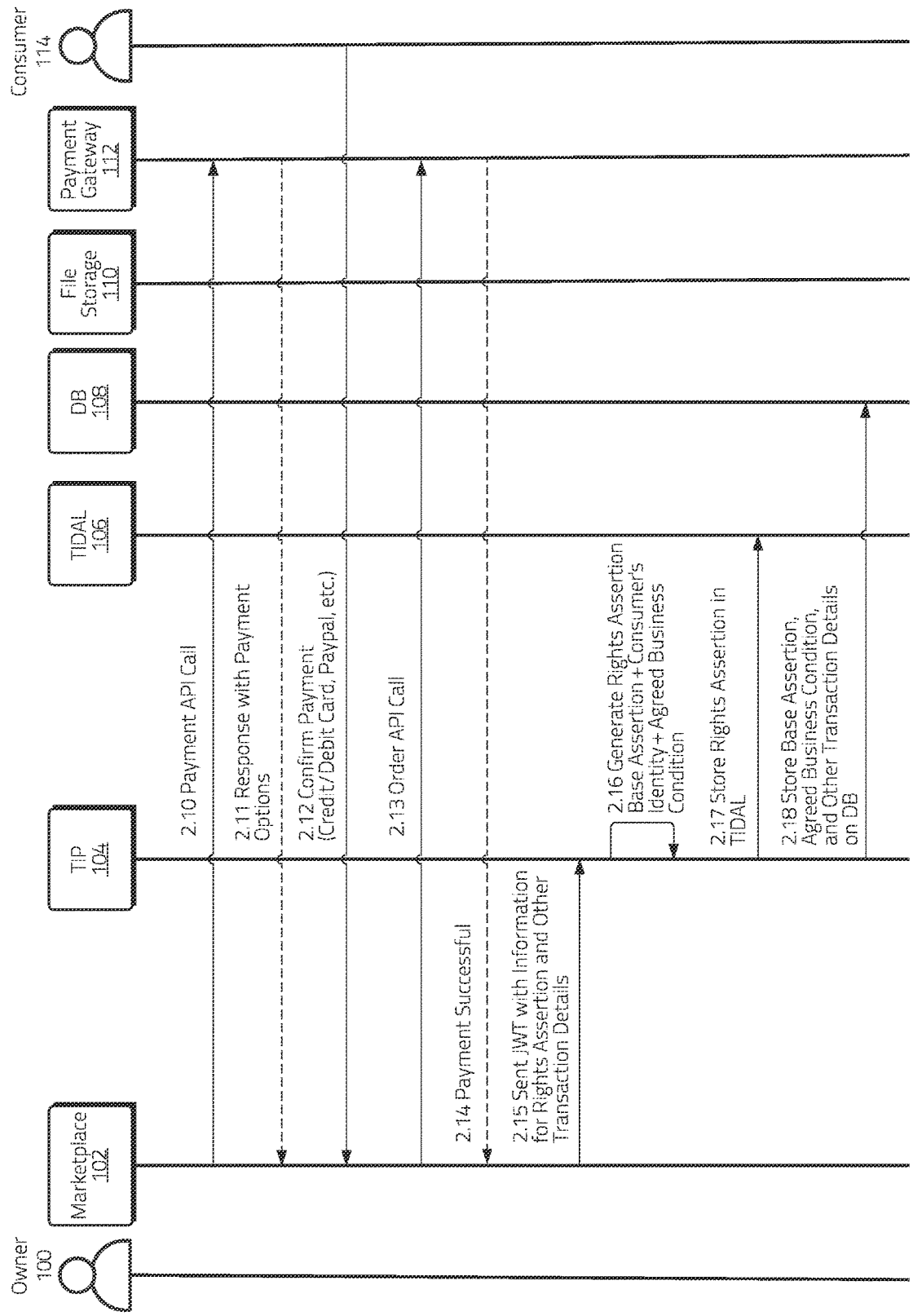
FIG. 2B illustrates a second part of a non-limiting example of a process for purchasing and accessing an NFT asset using a trusted service consistent with certain embodiments disclosed herein.

FIGS. 2A-2B illustrate a non-limiting example of a process for purchasing and accessing an NFT asset consistent with certain embodiments disclosed herein.

Steps 2.1-2.2:

A consumer 114 may login to the marketplace service 102 using their associated authentication credentials (e.g., using a Google account via Open ID connect and/or another authentication protocol). The marketplace service 102 may authenticate the consumer 114 based on the provided credentials and/or may return an indication of a successful authentication (or unsuccessful if the credentials are not authenticated).

Steps 2.3-2.8:

The marketplace service 102 may request the TIP service 104 to retrieve verified assets. In some embodiments, the TIP service 104 may obtain asset details from the DB 108 and may generate market assertions. The TIP service 104 may check market assertions against a TIDAL 106 to verify the latest status and/or integrity. The TIP service 104 may send back verified asset details to the marketplace service 102. The marketplace service 102 may then display market metadata (which may be defined by the owner 100 as detailed above) associated with verified digital assets to the consumer 114. The consumer 114 may then browse and purchase available digital assets from the marketplace service 102. Depending on business conditions for the digital asset, a consumers may, for example and without limitation, purchase (e.g., own), rent, and/or subscribe to the digital asset.

Figure 2C:
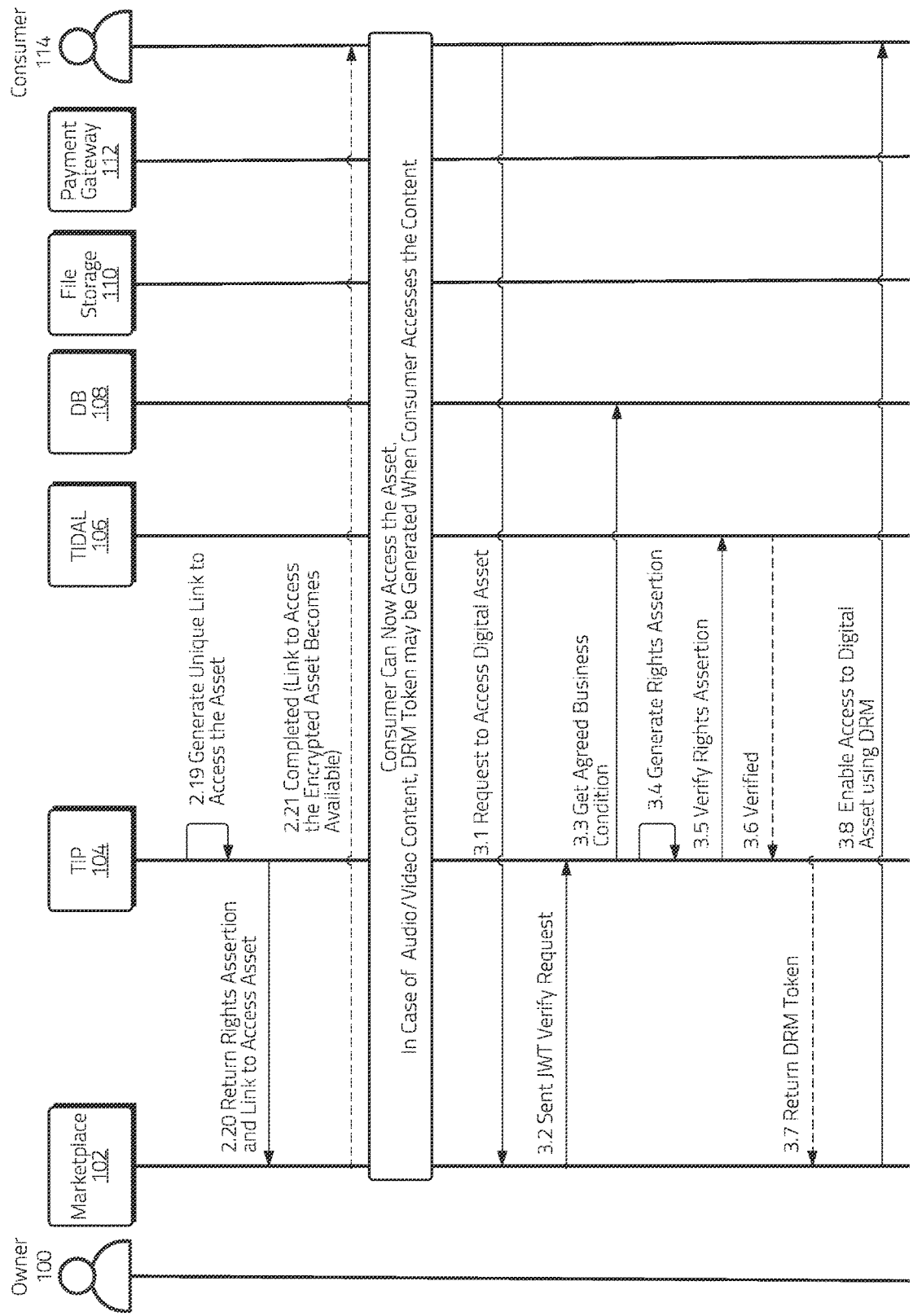
FIG. 2C illustrates a third part of a non-limiting example of a process for purchasing and accessing an NFT asset using a trusted service consistent with certain embodiments disclosed herein.

Steps 2.9-2.14:

A variety of consumer transactions may be supported by the marketplace service 102 including, for example and without limitation, purchase, rental, playback, and/or subscription transactions, although other types of transactions associated with digital assets are also contemplated. For example, when a consumer 114 requests to access a digital asset for watching and/or listening (e.g., playback), the process may proceed to Step 3.1 of FIG. 2C. In another example, when a consumer 114 requests to purchase public or private digital assets for sellout, rent, and subscription (e.g., Step 2.9), the marketplace service 102 may redirect the consumer 114 to a secure payment gateway service 112. In some embodiments, the secure payment gateway service 112 may comprise a third-party secure payment service such as, for example and without limitation, PayPal, although other payment services may also be used.

For example, as illustrated in FIG. 2B, the marketplace service 102 may call an API of the payment gateway service 112. The payment gateway service 112 may respond to the marketplace service 102 with one or more available payment options. The consumer 114 may select a suitable payment method supported by the marketplace service 102 such as, for example and without limitation, credit and/or debit card payment, PayPal, and/or the like. The consumer 114 may confirm payment details with the marketplace service 102.

The marketplace service 102 may call an API of the payment gateway service 112 with the requested order information and may receive an indication from the payment gateway service 112 indicating successful payment by the consumer 114. After successful payment, the marketplace service 102 may receive the amount from the consumer 114. The marketplace service 102 may then distribute the payment to respective owner 100 in accordance with one or more applicable business agreements (as discussed below in connection with FIG. 3).

Step 2.15:

The marketplace service 102 may create a signed JSON web token ("JWT") with the consumer's identity, agreed business condition(s), base assertion, and/or other transaction details. The marketplace service 102 may send the generated JWT to the TIP service 104. The marketplace service 102 may use its private key to sign the JWT.

Steps 2.16-2.18:

The TIP service 104 may verify the JWT signature using a public key associated with the marketplace service 102. For sale of the public and/or private digital assets, the TIP service 104 may create a new account assertion based on the base assertion and the new owner's identity (e.g., an identity of the consumer 114). For example, in some embodiments, the TIP service 104 may create a new account assertion by generating a cryptographic hash based on the base assertion and information associated with the new owner's identity (e.g., a hash calculated on a concatenation of the base assertion and the new owner's identity information). The TIP service 104 may register the new account assertion to the TIDAL 106. The TIP service 104 may further register any old account assertion to the TIDAL 106 and/or a derivative of the same as false and/or otherwise outdated.

For rent and/or subscription of private digital assets, the TIP service 104 may generate a rights assertion based on the account assertion and agreed business condition information. For example, in some embodiments, the TIP service 104 may create a new rights assertion by generating a cryptographic hash based on the account assertion and information associated with the agreed business condition information (e.g., a hash calculated on a concatenation of the account assertion and the agreed business condition information). The agreed business condition information may include, for example and without limitation, rental and/or subscription detail information and/or the identity information associated with the consumer 114. The rights assertion may be signed by the TIP service 104 (e.g., cryptographically signed by a private key securely associated with the TIP service 104).

The TIP service 104 may register the rights assertion in the TIDAL. The TIDAL's ingestion policy may be configured to accept assertions including signatures made by the TIP service 104. Based on the purchase transaction, the TIP service 104 may also store the transaction info in the DB 108 by correlating it to the purchased digital assets. This transaction information may comprise, for example and without limitation, an identity associated with the consumer 114 and the agreed business condition information. The TIP service 104 may use the rights assertion for verification purposes at Step 3.5, shown in connection with FIG. 2C, for rent of and/or subscription to private digital assets.

Steps 2.19-2.21:

For accessing public or private digital assets for watching, listening, reading, and/or the like, the TIP service 104 may generate a unique link to access the digital asset. This link may comprise the base assertion and may map to the original digital asset on an associated file storage service 110. The TIP service 104 may provide the marketplace service 102 with the generated link. A consumer 114 may then be provided the link by the marketplace service 102 for use in accessing the digital asset. For example and without limitation, in the case of rights managed audio and/or video content, the consumer 114 can streaming the content using the link. In certain embodiments, when a consumer 114 access the content, a DRM token may be generated (e.g., as may be the case in connection with audio, video, and/or other DRM managed content).

Steps 3.1-3.8:

When consumer 114 opens the link to access the digital asset, a request may be sent to the marketplace service 102. The marketplace service 102 may send a verification request to the TIP service 104. In some embodiments, the request may comprise a signed JWT with the base assertion and an identity of the consumer 114.

If the digital asset is marked as public in the market assertion and verified the TIDAL 106, the TIP service 104 may retrieve the base assertion from the JWT and the encrypted content key from the digital asset from the DB 108 by using the retrieved base assertion.

If the digital asset is marked as private in the market assertion and/or verified with TIDAL 106, the TIP service 104 may retrieve the base assertion and the identity information of the consumer 114 from the JWT. The agreed business condition and/or identity of the owner 100 may be retrieved from the DB 108 using the retrieved base assertion and consumer identity information. The TIP service 104 may generate a rights assertion and may check the rights assertion against the TIDAL 106 (which may be a derivative TIDAL). If the rights assertion exists in the TIDAL 106 (e.g., based on the TIDAL returning an indication that the assertion has been verified), then the TIP service 104 may check the content of the agreed business condition (e.g., check whether a rental period expires or not). If the agreed business condition is valid for the consumer 114, the TIP service 104 may retrieve the encrypted content key for the digital asset from the DB 108 using the retrieved base assertion.

In some embodiments where DRM methodologies are be applied in connection with various aspects of the disclosed systems and methods (for example, in connection with audio and/or video content), the TIP service 104 may decrypt the encrypted content key with its secret key. The TIP service 104 may then call the DRM service APIs to issue a token for a DRM license by providing the base assertion (e.g., content ID), the content key, and/or agreed business condition information (e.g., rental period, output control, etc.). Once a token has been issued by the DRM service, the TIP service 104 may return the token to the marketplace service 102. The marketplace service 102 may then initiate the playback of the digital asset.

In further embodiments, the TIP service 104 may decrypt the encrypted content key with its secret key. The TIP service 104 may then retrieve the encrypted digital asset from the file storage and decrypt it with the content key. The TIP service 104 may then make the decrypted digital asset to be available to the consumer 114 using a link. The consumer 114 may then access the digital asset via the link provided by the marketplace service 102.

Transaction Clearing Phase

Figure 3:
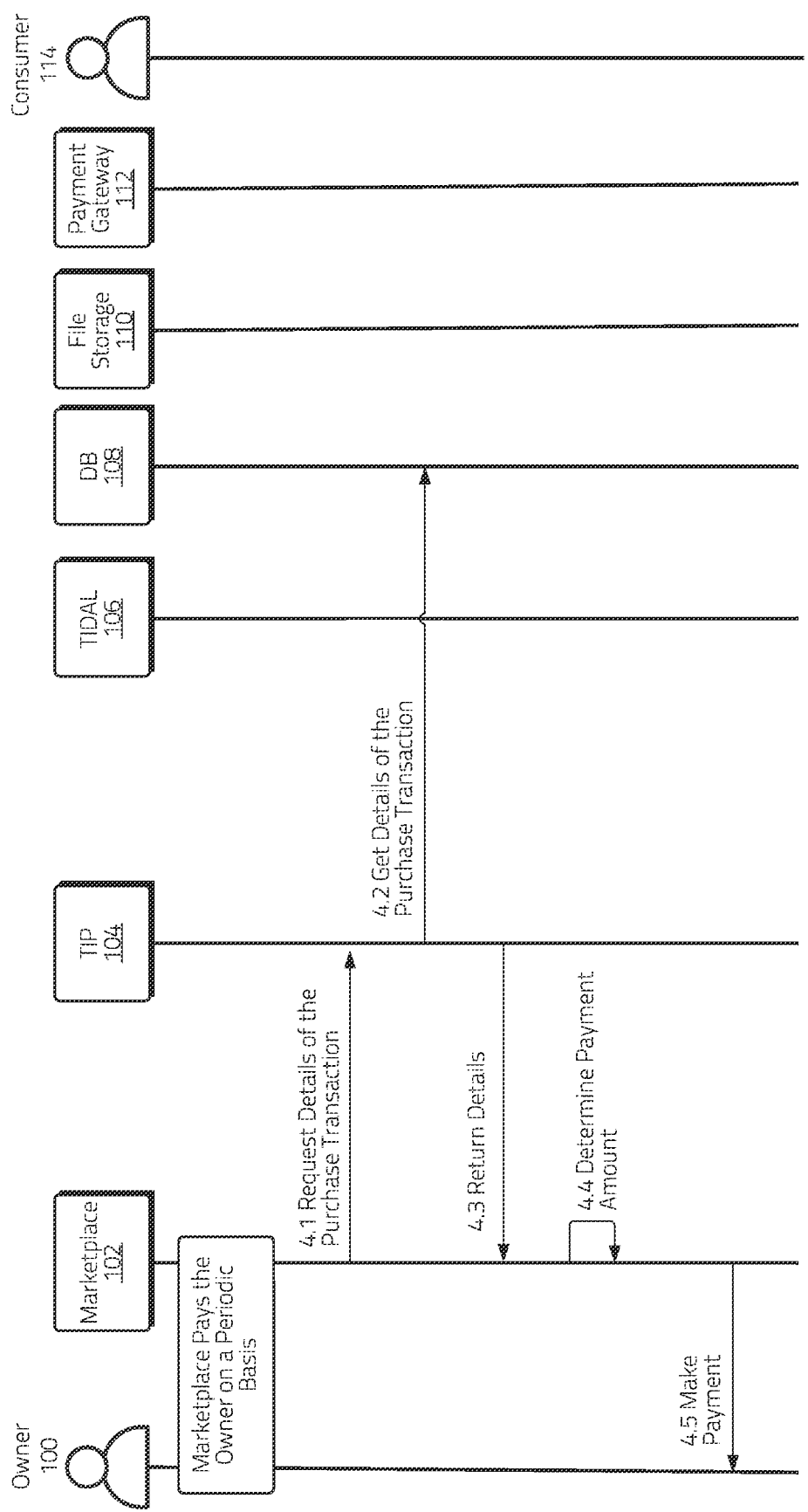
FIG. 3 illustrates a non-limiting example of aspects of a NFT transaction process consistent with certain embodiments disclosed herein.

FIG. 3 illustrates a non-limiting example of aspects of a NFT transaction process consistent with certain embodiments disclosed herein. As discussed in more detail below, in various embodiments, the marketplace service 102 may distribute payment to respective owners 100 in accordance with one or more applicable business agreements and/or conditions.

Steps 4.1-4.5:

The marketplace service 102 may request details of new transactions to the TIP service 104. For example, the marketplace service 102 may request details of new transactions to the TIP service 104 on a periodic basis (e.g., weekly). Based on the purchase amount, agreed business condition information, and/or associated marketplace service fees (which may be retrieved by the TIP service 104 from the DB 108), the marketplace service 102 may generate an amount payable to the owner 100 (or owners) of the digital assets. The marketplace service 102 may make payment to the owner 100 using available payment receiving details.

Token Rights Management Service Ecosystem

Consistent with embodiments disclosed herein, a token rights management ("TRM") service may be used in connection with managing NFTs and/or other digital assets. As discussed above, an NFT may comprise a cryptographic token recorded on a trusted ledger, such as a blockchain ledger, that may represent a digital asset. Application of NFTs may be broader, however, varying from simple media transactions to complex collateral loans. FIG. 4A-14B illustrate various conceptual diagrams showing various aspects of a process for managing NFTs using a TRM service in a TRM ecosystem consistent with certain embodiments disclosed herein.

TRM Ecosystem Entities, Services, and/or Systems

Certain aspects of the disclosed processes using TRM services may be performed by and/or otherwise in connection with one or more entities, services, and/or systems, which may be similar to the entities, services, and/or systems described above in connection with FIGS. 1A-FIG. 3. These entities, services, and/or systems may include, for example and without limitation, one or more of:

Marketplace services 102—An entity, which may comprise a third-party entity that uses TRM services 402 to implement various NFT management processes. In various embodiments, a TRM service 402 may trust the marketplace service 102 for TRM API calls. A marketplace service 102 may manipulate data for their own marketplace, but may not readily be able to, or in some implementations may be unable to manipulate data of another marketplace.

Marketplace administrator—An administrator that may set up and/or otherwise configure a marketplace service 102 with TRM APIs and TIP services 104. In some implementations, a TIP account ID of a marketplace administrator may be used as a marketplace ID.

Original Rights Holder ("ORH") 400—An ORH 400, which may be a content creator, distributor, and/or any other service, entity, and/or party that may hold original rights in a digital asset and may upload digital assets and/or create products.

Owner 100—A product owner 100, who may have created their own product (e.g., as an ORH 400) and/or may have purchased it through the marketplace service 102.

TIDAL 106—A distributed blockchain service and/or other suitable trusted ledger service that may be provided by the TIP and/or another service and/or entity. Although various examples described herein may use a TIDAL, it will be appreciated that various embodiments and aspects of the disclosed systems and methods may be implemented using a variety of other trusted databases and/or ledgers that may, or may not, have certain attributes associated with a TIDAL detailed herein. Moreover, although various examples are described herein in connection with a TIDAL, it will be appreciated that a derivative TIDAL may also be used in connection with various aspects of the disclosed embodiments.

DB 108—A database that may be created and/or otherwise managed by the marketplace service 102 and/or the TIP service 104 that may interact with data virtualization services.

File storage service 110—A file storage service 110 such as, for example and without limitation, Amazon S3 cloud, that may be used to store an encrypted digital asset.

TRM services 402—TRM services 402 may be implemented via an API for the marketplace service to access TIDAL 106, DB 108, and/or file storage services 110.

TIP service 104—The TIP service 104 used for various TRM implementations that may provide governance among different marketplace services 102. TIP services 104 may include for example and without limitation, one or more of: (1) TIP DV, which may comprise DV services of a TIP service 104 used for fetching digital assets, products, and/or transactions using an appropriate query (e.g., A SQL query); (2) TIP IAM services which may comprise IAM services of a TIP used for governance among different marketplace services 102; (3) TIP vault, which may comprise a TIP service 104 for securely storing protected data—Key Encryption Keys ("KEKs") stored in a TIP vault may be accessible to only TRM administrators in certain implementations (i.e., marketplace administrators may have limited access (if any)); and (4) TIP SEE, which may comprise a TIP service 104 that provides an SEE for running a TRM backend that, in some implementations, may be used for communication between TRM service 402, TIDAL 106, DB 108, and/or file storage services.

Consumer 114—A buyer of digital assets through the marketplace service.

Payment Gateway 112—A payment gateway service 112 may comprise a service facilitating payment between various services and entities in connection with certain transactions involving digital assets.

TRM administrator—An administrator that sets up marketplace services 102 TRM access including TIP account creation.

Key management services ("KMS") 114—A service configured to provide certain key management functionality including, for example and without limitation, key generation, content key storage and/or management, and/or the like. KMSs 104 may in some embodiments be offered by and/or included in a DRM services.

Invitee—A user invited by a product owner 100 to consume an owner's 100 product.

TRM Ecosystem Identifiers

Various embodiments disclosed herein may use a variety of identifiers in connection with digital assets, users, entities, services, and/or other aspects of the disclosed systems and methods. These identifiers may comprise, for example and without limitation, one or more of:

User ID—Users (e.g., owner 100, consumer 114, etc.) may be assigned a user ID and/or an associated identifier. User IDs may comprise, for example and without limitation, one or more of: (1) an owner ID, which may comprise a user ID of the owner 100 of a product; (2) an ORH ID, which may comprise a user ID of the ORH 400 of a product (e.g., a product creator), (3) a consumer ID, which may comprise a user ID of the consumer 114 of product (e.g., a user who purchases and/or rents a product); and an invitee ID, which may comprise the user ID for an invitee.

Asset ID—Assets may be assigned an asset ID after successful upload.

Product ID—When a product is created, a product ID may be generated (e.g., a "UUID") and may be assigned to copies of the new product.

Task ID—Tasks may be assigned a task ID.

Product serial ID—Each product copy may be assigned a unique identifier represented by a product serial ID.

Transaction ID—Transactions may be assigned a transaction ID. These transactions may include, for example and without limitation, buy, sellout, subscription, and/or other transactions that may be represented by business conditions.

Key ID ("KID")—A key ID may be generated as a key identifier for a KMS 404.

Stat ID—A stat ID may correspond to a stat row in a stats table.

Marketplace ID—A marketplace ID may correspond to a marketplace service 102. In some embodiments, a marketplace ID may be the same as an account ID of a marketplace service 102 on a TIP service 104.

TRM Ecosystem Tables

A variety of tables may be used in connection with managing NFTs in connection with various disclosed embodiments. These tables may comprise, for example and without limitation, one or more of:

Task table—A task table may comprise, for example and without limitation, one or more of a task ID, marketplace ID, creator ID, asset ID/product ID (potentially used for update), title, task timestamp, asset/product, status (e.g., processing, done, failed, deleted, etc.), a type of task (e.g., upload, update, delist, delete), etc.

Asset table—An asset table may comprise, for example and without limitation, one or more of an asset ID (which may be unique for each asset), marketplace ID, media type (e.g., audio, video, image, text, etc.), encrypted content key, KID, file location URL, title, asset assertion, fact (e.g., a hash of a file content), upload timestamp, ORH ID, metadata(JSON), initial supply, remaining supply, preview URL, etc.

Product table—A product table may comprise, for example and without limitation, one or more of a product ID, product serial ID, marketplace ID, name, assets (e.g., list of asset IDs included in bundle), serial number, type (e.g., public or private), preview URL, listed timestamp, owner ID, ORH ID, business-condition (e.g., an array of business conditions), sell price, rent price, rental period, metadata (e.g., JSON), product assertion, fact, delist, delete, invitees (e.g., list of invitee IDs), etc.

Transaction table—A transaction table may comprise, for example and without limitation, one or more of a transaction ID, marketplace ID, owner ID, consumer ID, product serial ID, timestamp, business condition, sell-price, rent-price, rental expiry date, asset ID, etc.

Marketplace user table—A marketplace user table may comprise, for example and without limitation, one or more of a user ID, e-mail, name, account creation timestamp, balance, role (e.g., a role supported by marketplace services 102), etc.

Marketplace table—A marketplace table may comprise, for example and without limitation, one or more of a marketplace ID, name, contact e-mail, and/or the like.

This table may be managed manually by a TRM administrator. When a new marketplace service 102 is provisioned, its TIP account may be created and an entry in this table may be created with marketplace ID set to the newly created TIP account ID.

TRM Ecosystem Physical Datasets

Physical datasets in embodiments of the disclosed TRM ecosystem may comprise TIP datasets that map to the TRM Tables described above. These datasets may be used to fetch assets, products, transactions from TIP using queries (e.g., directly from TIP using SQL queries).

A variety of datasets may be used in connection with managing NFTs in connection with various disclosed embodiments. These datasets may comprise, for example and without limitation, one or more of:

Task physical dataset—A TIP dataset that may map to the task table. The marketplace administrator may have view and/or query privileges on this dataset. The TRM administrator may have administrator privileges on this dataset.

Asset physical dataset—A TIP dataset that may map to the asset table. The marketplace administrator may have view and/or query privileges on this dataset. The TRM administrator may have administrator privileges on this dataset.

Product physical dataset—A TIP dataset that may map to the product table. The marketplace administrator may have view and/or query privileges on this dataset. The TRM administrator may have administrator privileges on this dataset.

Transaction physical dataset—A TIP dataset that may map to the transaction table. The marketplace administrator may have view and/or query privileges on this dataset. The TRM administrator may have administrator privileges on this dataset.

Marketplace user physical dataset—A TIP dataset that may map to the marketplace user table. This dataset may be created by each marketplace administrator and may be supported by a marketplace. The marketplace administrator may have administrator privileges on this dataset. The TRM administrator may have no privileges on this dataset.

TRM Ecosystem Asset Assertions

A variety of assertions may be used in connection with managing NFTs in connection with various disclosed embodiments. These assertions may comprise asset assertions and product assertions. Asset assertions may comprise, for example and without limitation, one or more of:

Asset assertion—An asset assertion may comprise a hash of file content, which may be used in some embodiments to detect copied content using a TIDAL 106. In some embodiments, an assert assertion may comprise a hash of a hash of file content, which may comprise a binary of an audio, video, and/or image file (e.g., hash(hash(file content)).

Asset ownership assertion—An asset ownership assertion may prove ownership of the asset and/or enable playback by the ORH 400. In some embodiments, the asset ownership assertion may comprise an asset assertion+ORH ID ("+" used here and elsewhere herein may denote a concatenation of values). In further embodiments, the asset ownership assertion serves as the proof of ownership of an asset via a TIDAL 106.

TRM Ecosystem Product Assertions

A variety of assertions may be used in connection with managing NFTs in connection with various disclosed embodiments. These assertions may comprise, for example and without limitation, one or more of:

Product Assertion—A product assertion may, in some embodiments, serve as a base for the subsequent assertions. Product assertions may be stored in a product table for each entry for quick assertion computations. In some embodiments, a product assertion may comprise a hash of a concatenation of asset assertions of individual assets and a serial number. Asset assertions may in some implementations be concatenated in alphabetical order.

Product ownership assertion—The product ownership assertion may serve as a proof of product ownership in a TIDAL 106. In some embodiments, the product ownership assertion may comprise a product assertion and an owner ID.

Market assertion—A market assertion may validate metadata in a DB 108. A market assertion may serve as a verification of product market metadata of product table entries in a TIDAL 106. A market assertion may comprise a product assertion and market metadata. In at least one non-limiting example, the market metadata may be determined according to: market metadata=product metadata (e.g., title+description)+business metadata (e.g., business condition+sell price+rent price+rental period).

Rights assertion—A rights assertion may validate transactions. The rights assertion may serve as a verification of a transaction date in a TIDAL 106. In at least one non-limiting example, the rights assertion may be calculated according to: rights assertion=product assertion+transaction price (e.g., amount paid by consumer 114)+business condition+consumer ID.

Product invite assertion—A product invite assertion may validate an invitee's access to a product. In at least one non-limiting example, the product invite assertion may be calculated according to: product invite assertion=product ownership assertion+invitee ID.

TRM Ecosystem APIs

A variety of APIs may be used in connection with managing NFTs in connection with various disclosed embodiments. These APIs may comprise, for example and without limitation a TRM verification API of a TRM service 402. This API may allow the marketplace service 102 to verify data using a TIDAL 106. In some embodiments, the input may comprise a list of asset IDs/product serial IDs/transaction IDs and the API may verify if the data on database corresponding to these IDs is valid. For assets, verification may use asset ownership assertions using a TIDAL 106; for products, verification may use product ownership assertions and market assertions using a TIDAL 106; for transactions, verification may use rights assertions using a TIDAL 106. In some embodiments, the API may accept as input one or more of a list of asset IDs, product serial IDs, and/or transaction IDs and/or type of IDs (e.g., asset, product, transaction, etc.). In certain embodiments, the API may return a list of IDs that failed the verification. A returned empty array may mean data for all IDs were valid.

TRM Ecosystem Business Conditions

A variety of business conditions may be used in connection with managing NFTs in connection with various disclosed embodiments. These business conditions may comprise, for example and without limitation, one or more of:

Sellout—The ownership of a product is transferred from one user to another. Associated business metadata may comprise, for example and without limitation, price information.

Rent—A user can access a product for a limited amount of time. The ownership may remain with the current owner. Associated business metadata may comprise, for example and without limitation, price and/or rental periods.

Subscription—A User can access a product if they pay the subscription fees. The ownership may remain with the current owner. Associated business metadata may comprise, for example and without limitation, price and/or rental period.

Rent-Ownership—The ownership may be transferred from ORH 400 to another user for a limited amount of time. A new owner can make this product available for rent-ownership/rent/subscription. However, after the rent-ownership time period, the ownership may revert back to the ORH 400. Associated business metadata may comprise price and/or rental period. A new owner in some implementations may not set rental period (for rent or subscription) beyond the original rental period (for rent-ownership) set by the ORH 400. When a product is sold, a scheduled job may be created. This job may transfer the ownership back to ORH 400 after the rent-ownership rental period. The scheduled job may be a thread in a program that runs after the rental period expires. In some embodiments, changing the time period for the rent-ownership may be restricted to the ORH 400. Subsequent rent-ownership transactions from new owners may have the original rental-ownership period. The business condition for rent-ownership may, in some embodiments, be restricted to the ORH 400. In some implementations, the business condition may not be changed to rent-ownership if existing rent/subscription transactions exist for the product.

TRM Ecosystem Metadata

A variety of metadata definitions may be used in connection with managing NFTs in connection with various disclosed embodiments. These metadata definitions may comprise, for example and without limitation, one or more of:

Asset metadata—Asset metadata may in some embodiments comprise a title.

Product metadata—Product metadata may in some embodiments comprise one or more of a title, a description, and/or any additional metadata decided by the marketplace administrator.

Business Metadata—Business metadata may in some embodiments comprise one or more business conditions, sell prices, rent prices, rent periods, subscription prices, subscription periods, rent-ownership prices, and/or rent-ownership periods.

Delisting a Product

In various embodiments, any product may at any point be delisted from the marketplace service 102 by the owner, which may be the ORH 400. This means that the product may no longer be available on the marketplace service 102 for consumers 114 to purchase, rent, and/or subscribe. In some embodiments, product table entries may have a field called "delist" which may take on the values "0" or "1". A delist value of "0", signifying false, may mean that the product is currently available on the marketplace service 102. On the other hand, a delist value of "1", indicating true, may mean that the product is currently delisted and so not currently available on the marketplace service 102.

Asset Supply and Product Copies

When a digital asset is uploaded to the marketplace service 102, the ORH 400 may indicate its initial supply. In some implementations, once selected, the initial supply of the asset may not be changed by the ORH 400 (although this may not be the case in every implementation). A digital asset's initial supply may set an upper limit on the number of times the asset may be bundled in different products, so that the ORH 400 may not indefinitely add the digital asset to new products.

When a product is created, the ORH 400 may select the number of copies of the new product to mint. Each copy may have a unique product serial ID, but a uniform product ID to correlate the different copies. Each such copy may be referred to as a product copy. In at least one non-limiting example, suppose a new Product A is created with 5 copies—in the backend, this may result in 5 new entries in the Product table, say A0 (Serial #0), A1 (Serial #1), A2 (Serial #2), A3 (Serial #3), A4 (Serial #4). Each entry, or product copy, may have a unique product serial ID, the UUID that serves as the primary key of the product table. However, the product copies may have the same product ID, a UUID that is used to correlate the copies of Product A.

In some embodiments, when a digital asset is bundled into a product, its remaining supply may decrease by the total copies of the Product. For example and without limitation, consider Asset A with an initial supply of 100. The ORH 400 may decide to create Product X, including Asset A, with 10 copies. The remaining supply of A may now be 90. Now, the ORH 400 may create another Product Y, which bundles A, and the ORH 400 may decide there will be 50 copies of Product Y. The remaining supply of A may now be reduced to 40. If the ORH 400 decides to delete Product X, the remaining supply of A may increase by the number of unsold copies of X (e.g., remaining supply of A will become 50 if Product X remains unsold entirely). In some embodiments, the number of versions of a product may be limited by the minimum remaining supply across the bundled assets in that product.

Marketplace Preparations

In some embodiments, a marketplace service 102 that would like to use a TRM service 402 consistent with various aspects of the disclosed embodiments may contact the TRM administrator to be provisioned a TIP account. The TRM administrator 402 may create an API key and client, which may be used by the marketplace service 102 for obtaining access tokens to authenticate the TRM API calls.

The asset, product, and transaction tables may be common for different marketplace services 102 and may be under the TRM TIP instance. Marketplaces may query these tables via TIP DV services, as the dataset restrictions may be set up by the TRM administrator such that each marketplace service 102 may view those entries matching their marketplace ID (e.g., TIP account ID). In some embodiments, the marketplace service 102 may manage their own user authentication and marketplace user table.

In some embodiments, the marketplace can have an interface that allows ORH 400, owners 100, and/or consumers 114 to 'sign up', which may not create an account directly but may notify the marketplace administrator to let the ORH 400, owners 100, and/or consumers 114 log in using a user authentication (e.g., Google login). Once the Account is created and their email verified, the ORH 400, owners 100, and/or consumers 114 may log in to the marketplace service 102 using their user authentication credentials. After login to the marketplace service 102, the ORH 400, owners 100, and/or consumers 114 may be redirected to a user account page. The ORH 400, owners 100, and/or consumers 114 can enter payment receiving details on this page.

Asset Upload

Figure 4A:
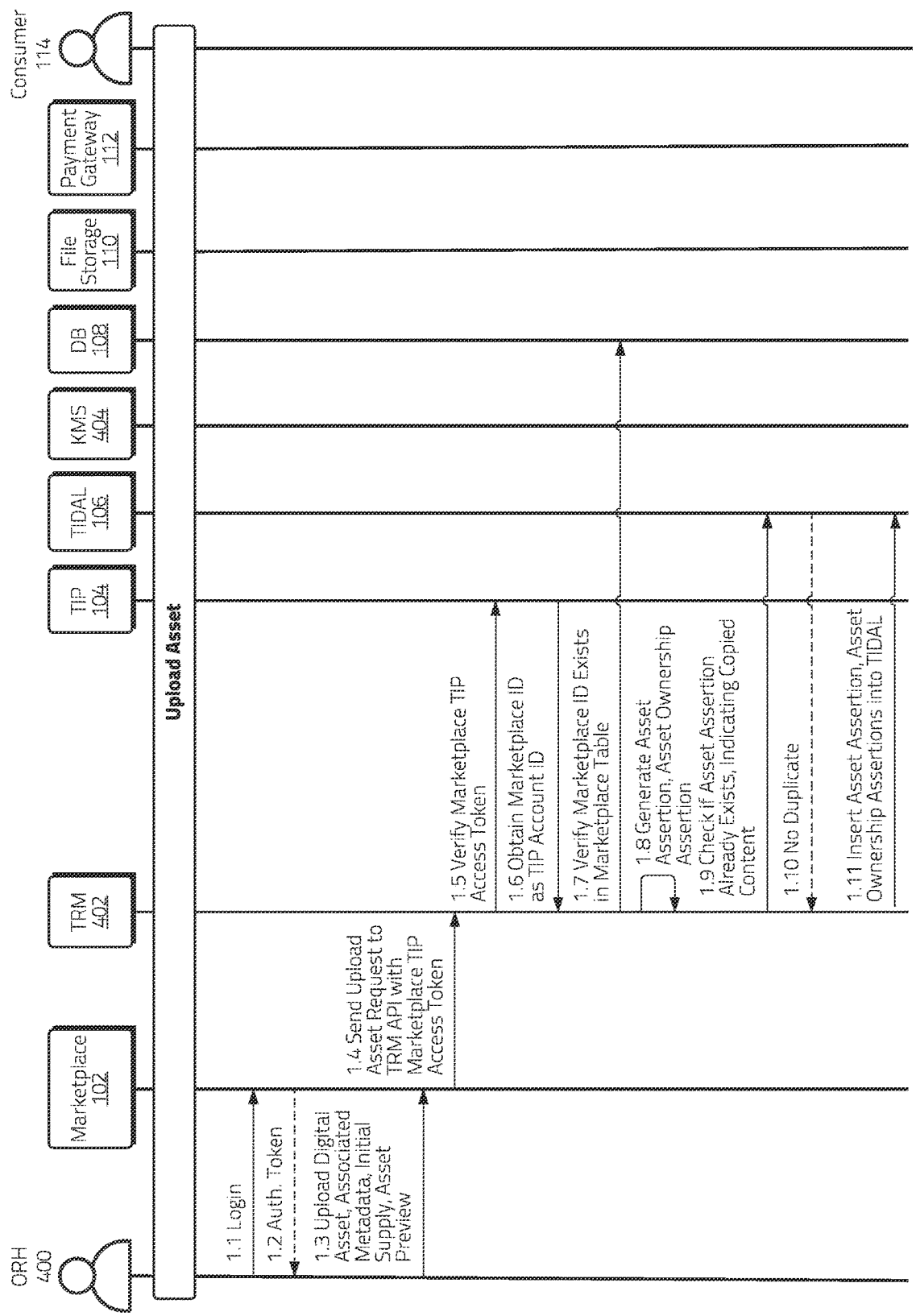
FIG. 4A illustrates a first part of a non-limiting example of an asset upload process consistent with certain embodiments disclosed herein
Figure 4B:
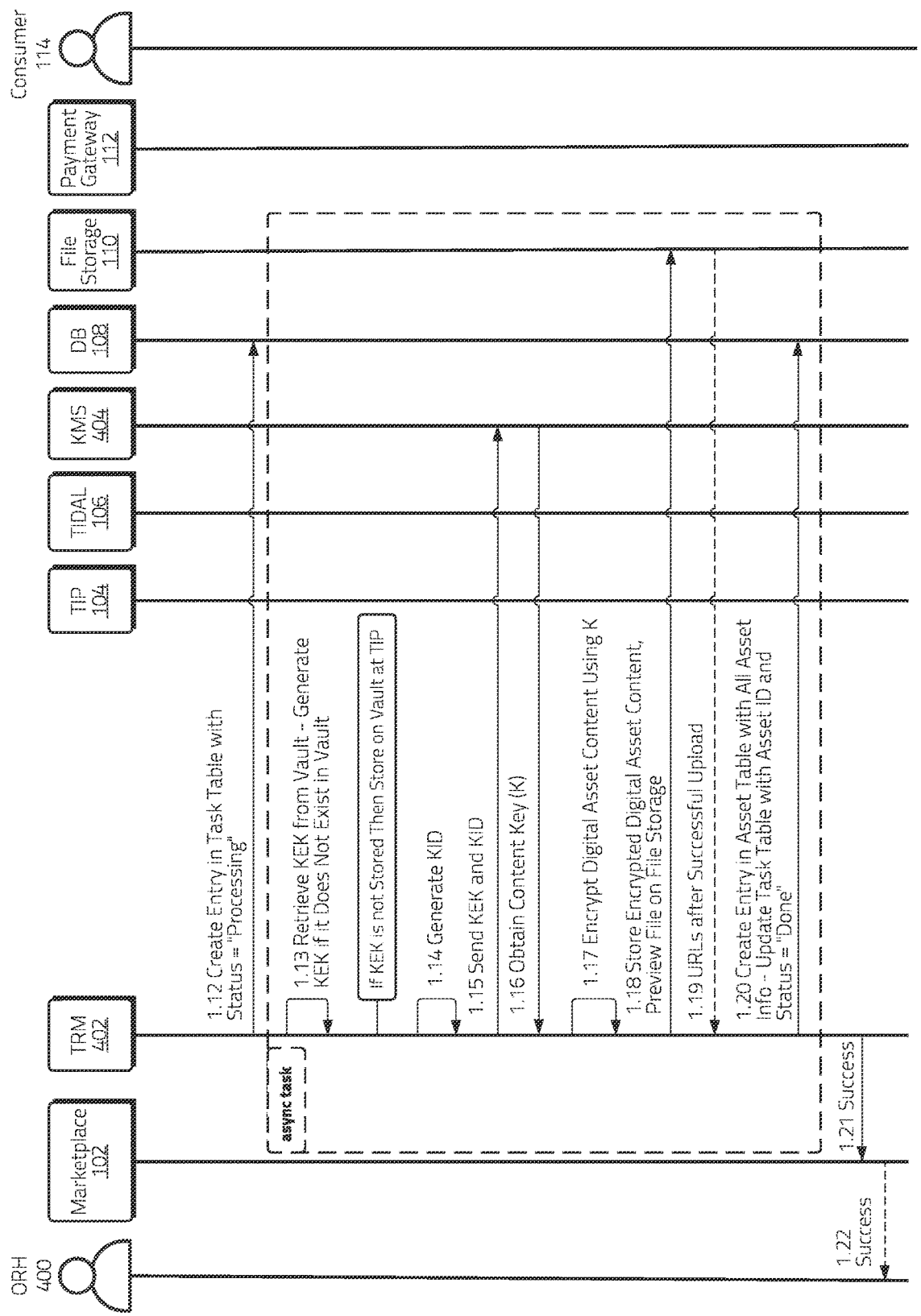
FIG. 4B illustrates a second part of a non-limiting example of an asset upload process consistent with certain embodiments disclosed herein

FIGS. 4A-4B illustrate a non-limiting example of an asset upload process consistent with certain embodiments disclosed herein Steps 1.1-1.2: User Login In some embodiments, the ORH 400 may login to the marketplace service 102. In certain embodiments, a Google account (e.g., Open ID connect) may be used for login, although other methods of login may also be employed. The marketplace service 102 may authenticate the ORH 400, issuing the ORH 400 an authentication token if successfully authenticated.

Steps 1.3-1.4: Upload Asset

The ORH 400 may upload the digital asset (e.g., image, video, text, audio, etc.) to the marketplace service 102. The ORH 400 may specify the initial supply for the digital asset, which may an upper limit on the number of times the asset may be bundled in different products. The ORH 400 may upload a preview file to serve as a thumbnail for the asset on the marketplace portal. The ORH 400 may also provide asset title, description and any other metadata, which may be determined and/or otherwise set by the marketplace service 102.

The marketplace service 102 may obtain a TIP access token from TIP IAM services using its API key and secret. The marketplace services may provide this access token along with the request data (e.g., digital asset file, preview file, initial supply, metadata) to the TRM API of the TRM service 402.

Steps 1.5-1.7: Verify Marketplace

The marketplace TIP access token may be verified via the TIP IAM service. The marketplace ID may be obtained from the IAM service and/or user information endpoint. The marketplace service 102 may then be verified by interacting with the DB 108 (e.g., it may be determined that the marketplace ID exists in the marketplace table in the DB 108, as the marketplace table stores the list of verified marketplace services 102).

Steps 1.8-1.11: Asset Assertions

The TRM service 402 may generate the asset assertion. In some embodiments, the asset assertion may comprise a hash of the file content of the digital asset. An asset ownership assertion may also be generated by the TRM service 402. In certain embodiments, the asset ownership assertion may be generated by concatenating the ORH ID to the asset assertion.

The TRM service 402 may query a TIDAL 106 to check if the asset assertion already exists—if it does, it may indicate that the digital asset has already been uploaded to the TRM service 402, and so the copied content may be rejected. If not, the new asset and asset ownership assertions may be inserted into the TIDAL 106.

Steps 1.12-1.20: Asset Encryption

A task entry may be created in the task table with status "processing" while the digital asset encryption takes place. In various embodiments, one or more steps of an asset encryption process may be performed as an asynchronous task. To protect the digital asset, the KEK may be retrieved from the TIP vault and/or a new KEK may be generated and stored in the TIP vault if it does not exist already. The KID may be generated. The KEK and KID may be sent to a KMS 404 where a content key—K—may be generated and returned to TRM service 402. The digital asset file may be encrypted using the content key using K. An encrypted digital asset and/or preview may be stored in the file storage service 110, and an associated location (e.g., URL) that may be used to access the encrypted digital asset and/or preview may be returned to the TRM service 402. The entry may be created in the asset table including the asset information. The entry may be updated at the task table with status set to "done" and the asset ID may also be updated in the task table.

In some embodiments, to protect the digital asset, the secret key may be obtained from TIP vault. A new secret key may be generated and stored in the TIP vault if it does not already exist. In some embodiments, the content key may be encrypted using the secret key. The entry may be created at the asset table including the associated asset information. The entry may be updated in the task table with status set to "done" and the asset ID may also be updated in the task table.

In some embodiments, an indication of the successful uploading of the digital asset may be communicated to the marketplace service 102 and/or the ORH 400 from the TRM 402.

Product Creation

Figure 5A:
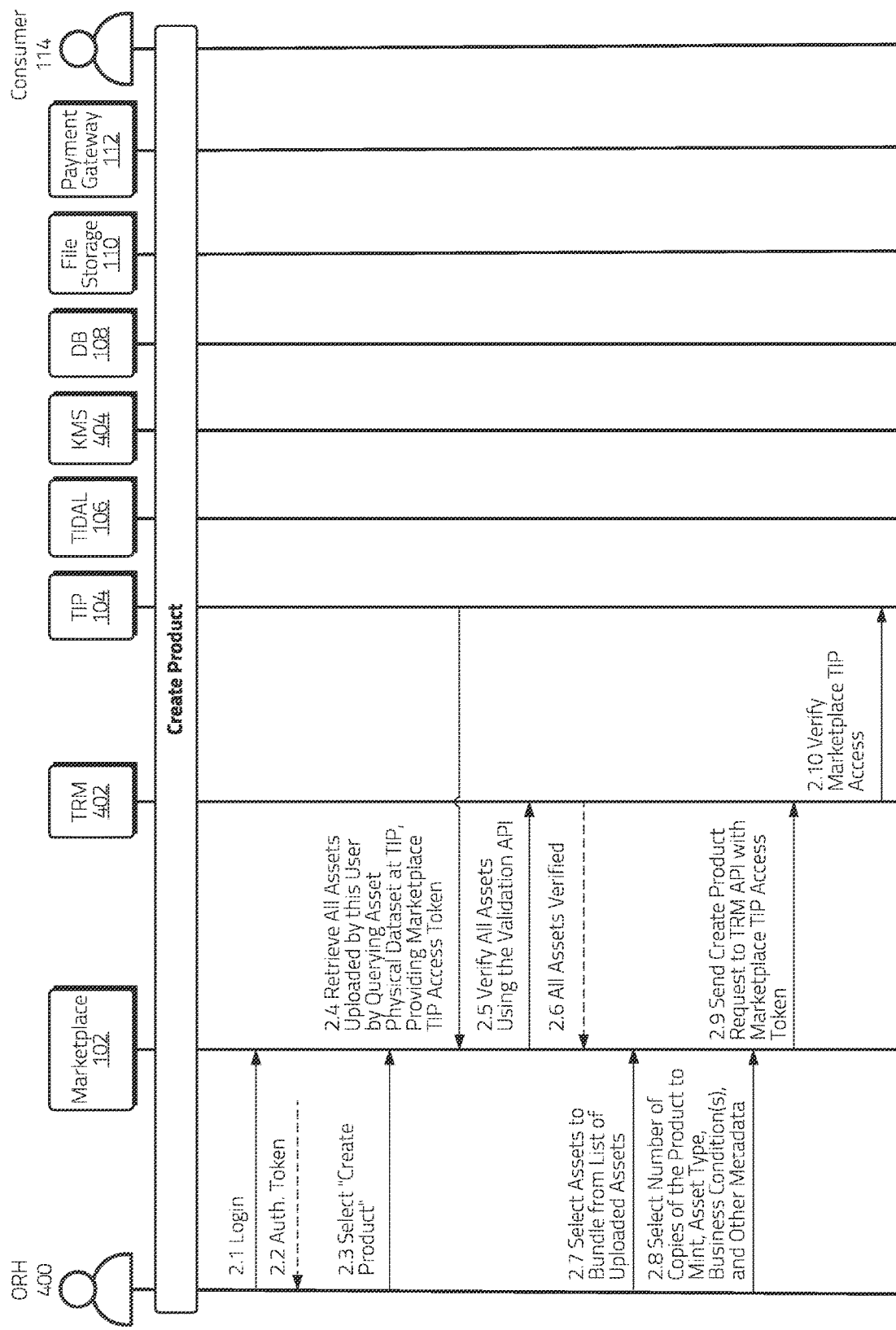
FIG. 5A illustrates a first part of a non-limiting example of a product creation process consistent with certain embodiments disclosed herein
Figure 5B:
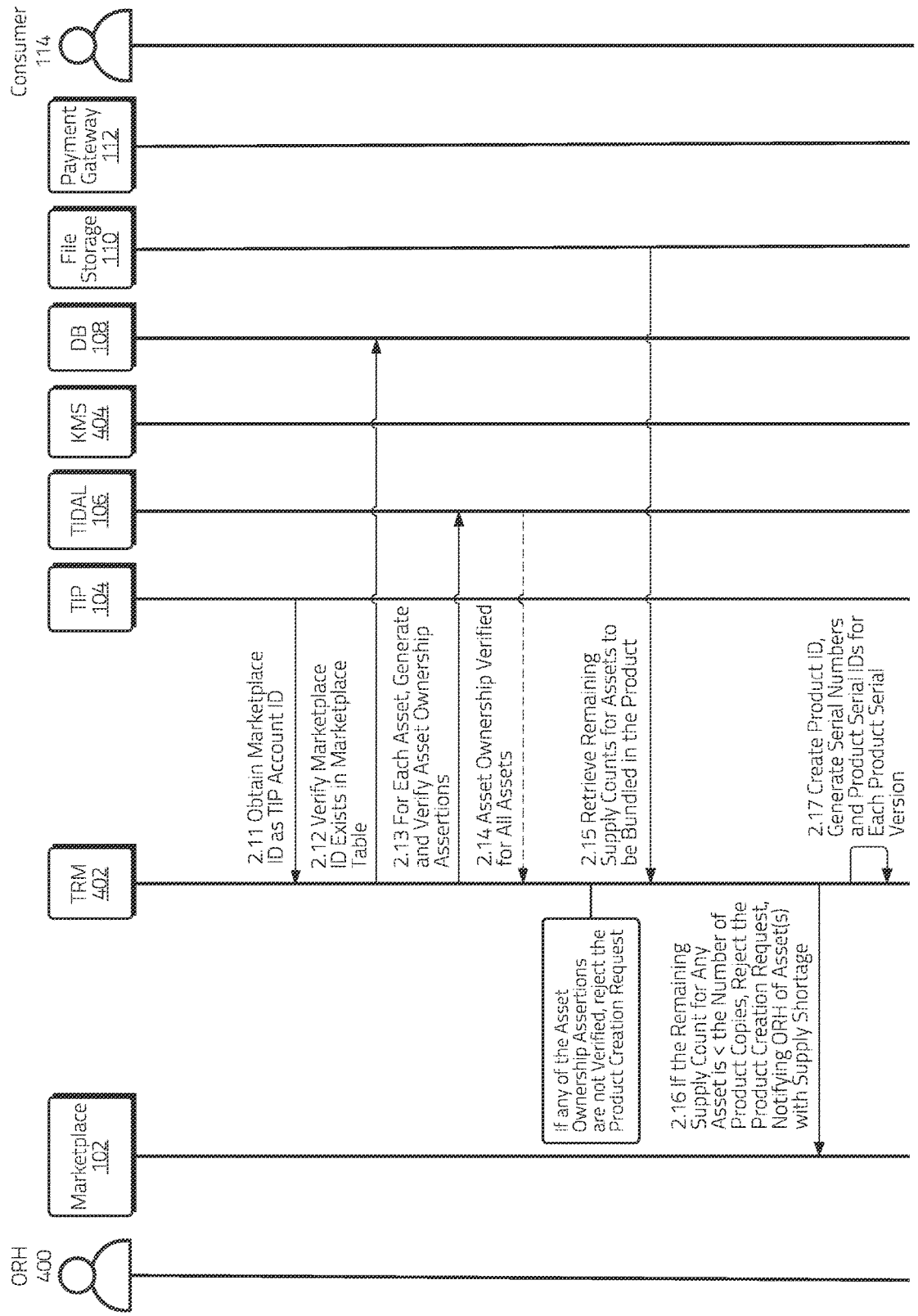
FIG. 5B illustrates a second part of a non-limiting example of a product creation process consistent with certain embodiments disclosed herein
Figure 5C:
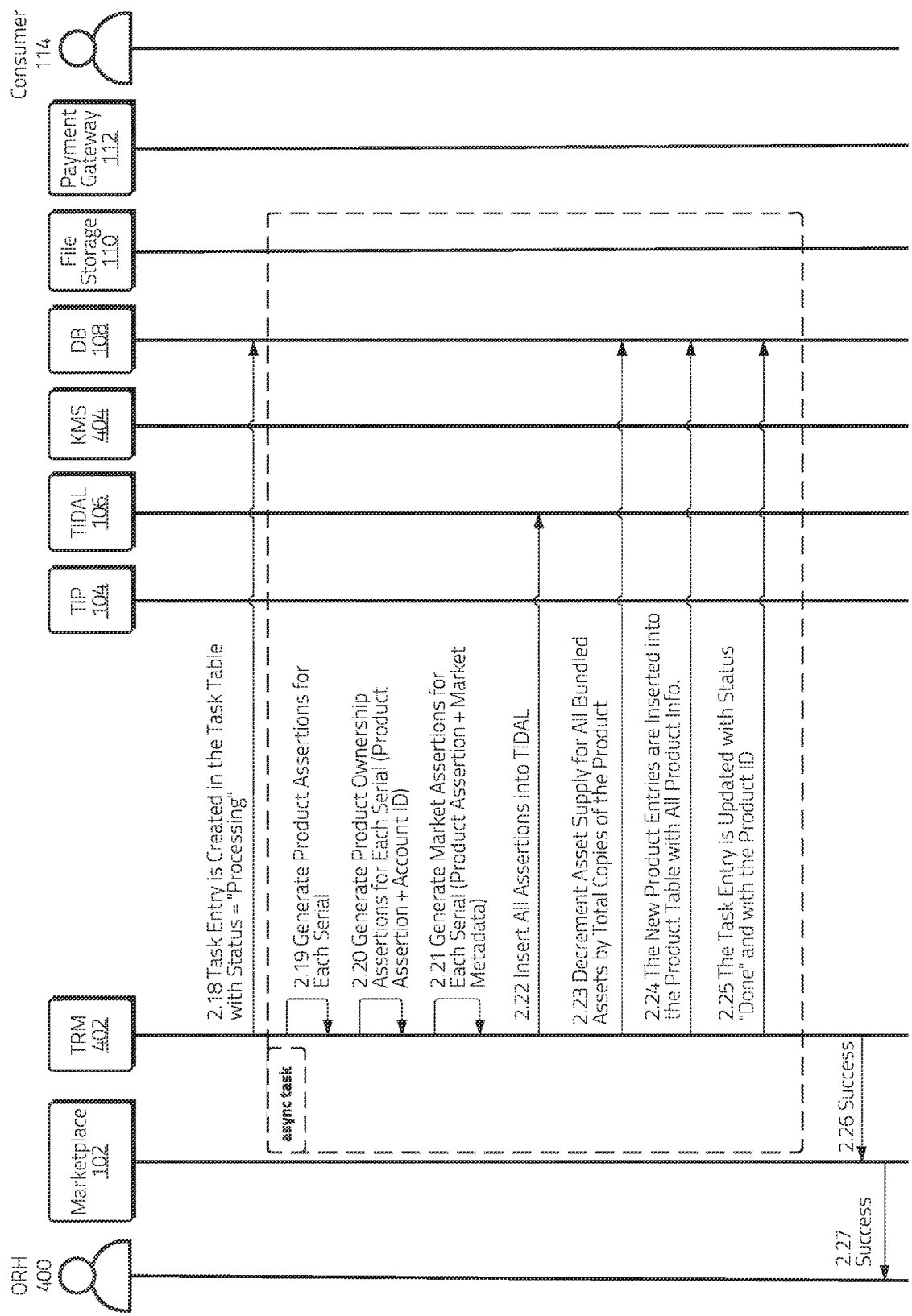
FIG. 5C illustrates a third part of a non-limiting example of a product creation process consistent with certain embodiments disclosed herein

FIGS. 5A-5C illustrates a non-limiting example of a product creation process consistent with certain embodiments disclosed herein Step 2.1-2.2: User Login In some embodiments, the ORH 400 may login to the marketplace service 102. In certain embodiments, a Google account (e.g., Open ID connect) may be used for login, although other methods of login may also be employed. The marketplace service 102 may authenticate the ORH 400, issuing the ORH 400 an authentication token if successfully authenticated.

Step 2.3-2.9: Create Product

Once the ORH 400 decides to create a new product, the marketplace service 102 may fetch the list of assets created by the ORH 400 from the asset physical dataset via a DV offered by the TIP service 104 using its TIP access token. The ORH 400 may use the TRM verification API to validate if the fetched assets are valid. Once assets are verified, the ORH 400 may decide which of their assets to bundle in this new product, and provide the supporting product information that may include, for example and without limitation, one or more of:

Number of copies to mint.

Title.

Preview file (e.g., thumbnail, etc).

Product type—In some embodiments a product type may be public or private. Public products may be accessed by any consumers (e.g. rendered for viewing and/or listening, etc.). Private products may be accessed by consumers after a purchasing transaction.

Business condition—Business conditions may comprise, for example and without limitation, sellout, rent, subscription, rent-ownership, and/or the like.

Business metadata—Business metadata may, in certain embodiments, comprise price (e.g., for sellout, rental, subscription, rent-ownership) and/or rental period (e.g., for rental, subscription, rent-ownership, etc.).

Product description and/or any other metadata, which may be defined by the marketplace service 102.

The marketplace service 102 may generate and issue a product creation request to an API of the TRM service. In some embodiments, the product creation request may comprise the marketplace TIP access token.

Steps 2.10-2.12: Verify Marketplace

The marketplace TIP access token included in the product creation request may be verified via an IAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Steps 2.13-2.14: Verify Ownership of Underlying Assets

For each asset bundled in the product, the TRM service 402 may generate the asset ownership assertion and may verify it with the TIDAL 106 (e.g., checking whether the assertion exists in the TIDAL 106). If any of the asset ownership assertions are unverified, the product creation request may be rejected, as the ownership of underlying assets may not be verified.

Steps 2.15-2.16: Check Asset Supply Counts

The remaining supply counts for underlying assets in the product may be retrieved from the asset table. If the remaining supply counts are less than the specified total copies of the product, the product creation request may be rejected. In such a case, the TRM API may notify the marketplace service 102 of the maximum number of copies of the product that would be possible and indicate the digital asset(s) that have supply shortage for this request.

Step 2.17-2.18: Start Processing

The TRM service 402 may generate one or more of the following:

Product ID: uniform UUID for products in this set
Product Serial IDs: Unique UUID for each individual product copy
Serial Numbers: Sequential numbers assigned to each product serial ID (e.g., 0, 1, 2, . . . (total copies−1))

A task entry may be created by the TRM service 402 in the task table with status "Processing."

Steps 2.19-2.25: Create Assertions, Complete Processing

The TRM service 402 may generate one or more of the following assertions for each product serial ID:

Product assertion: hash(concatenation of underlying asset assertions)+serial number.
Product ownership assertion: product assertion+ORH ID.
Market assertion: product assertion+market metadata.

Once the assertions are inserted into the TIDAL 106, the TRM service 402 may decrement the remaining supply of underlying assets at the asset table in the DB 108 by the total copies of the product. The new product entries may be inserted into the product table in the DB 108 with associated product information. The task entry may be updated with status "done" and with the product ID. In various embodiments, one or more steps of an assertion creation process consistent with various aspects of the disclosed embodiments may be performed as an asynchronous task In some embodiments, an indication of the successful uploading of the digital asset may be communicated to the marketplace service 102 and/or the ORH 400 from the TRM 402.

Download Phase

FIGS. 6A-6D illustrate a non-limiting example of a download process consistent with certain embodiments disclosed herein.

Steps 1.1-1.2: Login

In some embodiments, the consumer 114 may login to the marketplace service 102. In certain embodiments, a Google account (e.g., Open ID connect) may be used for login, although other methods of login may also be employed. The marketplace service 102 may authenticate the consumer 114, issuing the consumer an authentication token if successfully authenticated.

Step 1.3-1.9: Get Verified Marketplace Products

The marketplace service 102 may use the TIP service 104 DV services to fetch products. In some embodiments, the marketplace service 102 may use the TIP access token to access the DV services of the TIP service 104. A query (e.g., an SQL query) may be used to fetch the information. This query can include any filter, offset, and/or limit parameters. The requested information may be returned from the DB 108 to the marketplace service 104 via the TRM service 402. Once the marketplace service 102 receives the data, the marketplace service 102 may verify the data on the DB 108 using a TRM verification API. For example, the marketplace service may send a list of product IDs to the TRM service 402 for verification. The TRM service 102 may generate market assertions and check the assertions against the TIDAL 106, returning verified product details to the marketplace service 102. The marketplace service 102 may display verified products to consumers 114, and consumers 114 can browse and purchase available digital products from the marketplace service 102. Depending on the business condition for the product, the consumer may have the right to purchase, rent, and/or subscribe to the product.

Steps 1.10-1.11: Create Transaction

The marketplace service 102 may receive a request to purchase a product (e.g., for sale, for rent, etc.) from the consumer 114. The marketplace service 102 may make a request to the API of the TRM service 104 to record the transaction, which may include various details relating to the transaction along with a TIP access token of the marketplace service 102.

Steps 1.12-1.14: Verify Marketplace

The marketplace TIP access token may be verified via an IAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Steps 1.15-1.19: Create Assertions

For sellout of public or private products, the TRM service 402 may create a new product ownership assertion, which may comprise the product assertion and the new owner's ID (e.g., the consumer's 114 ID). The TRM service 402 may register the new product ownership assertion to the TIDAL 106. In some embodiments, the prior product ownership assertion at TIDAL 106 may be set to false, reflecting the update in the ownership of the product. For rent or subscription of private products, the TRM service 402 may create a rights assertion, which may comprise the product assertion, an indication of a transaction process, a business condition, and the consumer ID. The rights assertion may be signed by TRM service 402, which may register the rights assertion to the TIDAL 106. Consistent with various embodiments disclosed herein, the TIDAL's ingestion policy may be configured to accept assertions signed by the TRM service 402. The TRM service 402 may use the rights assertion for verification purposes for rent and/or subscription of private digital assets.

Steps 1.20-1.22: Update DB

The transaction TD may be generated (e.g., as a UUID), and the data may be recorded in the transaction table in the DB 108. If the product is purchased, the owner ID of the product may also be updated in the product table in the DB 108.

Steps 1.24-1.28: Process Payment

The marketplace service 102 may redirect the consumer 114 to a third-party secure payment gateway 112 (e.g., PayPal). The consumer 114 may select the payment method, and after successful payment, the marketplace service 102 may distribute the payment to the respective owner(s) (e.g., owner 100) as per any applicable business agreement(s).

Figure 6A:
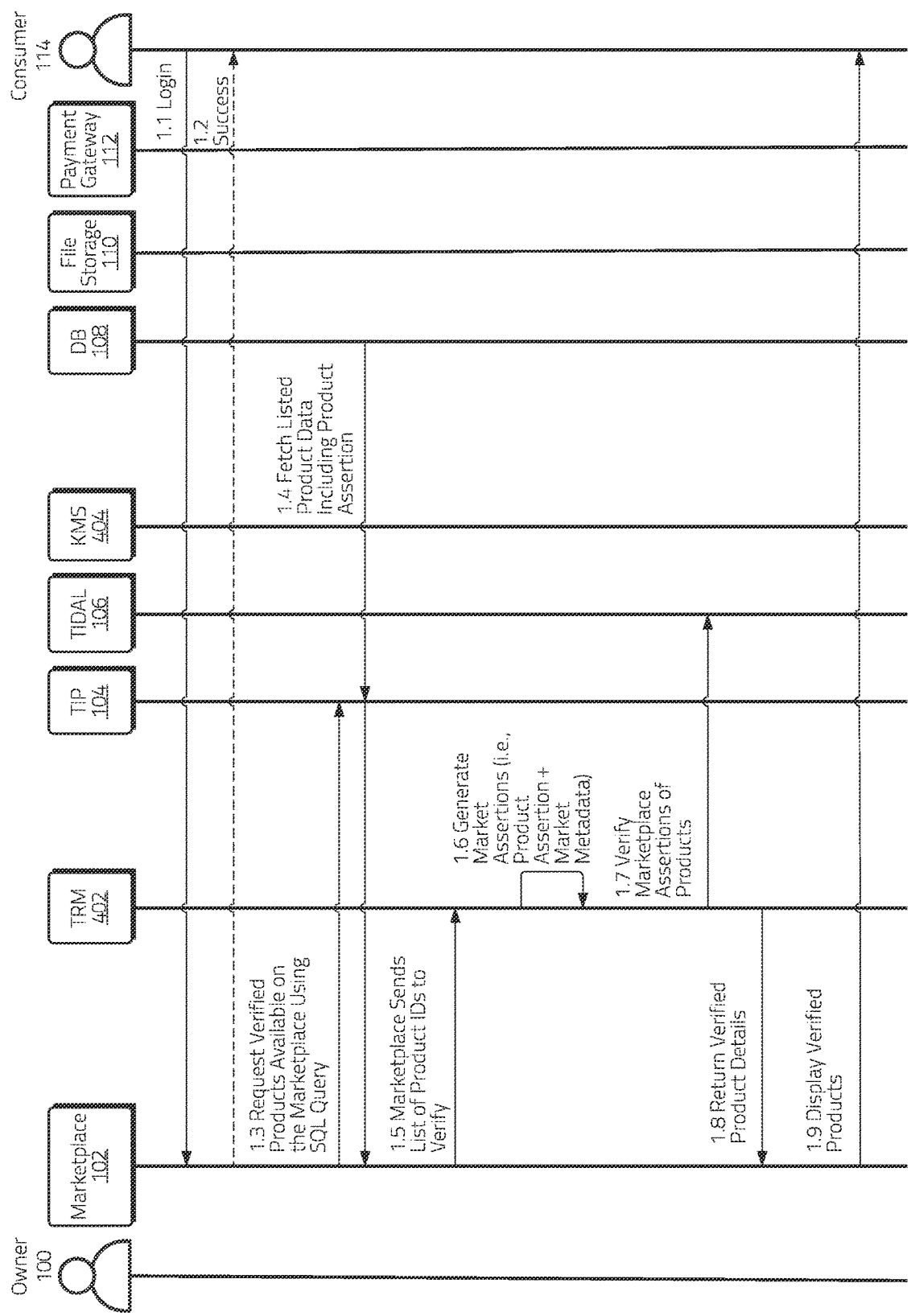
FIG. 6A illustrates a first part of a non-limiting example of a download process consistent with certain embodiments disclosed herein.
Figure 6B:
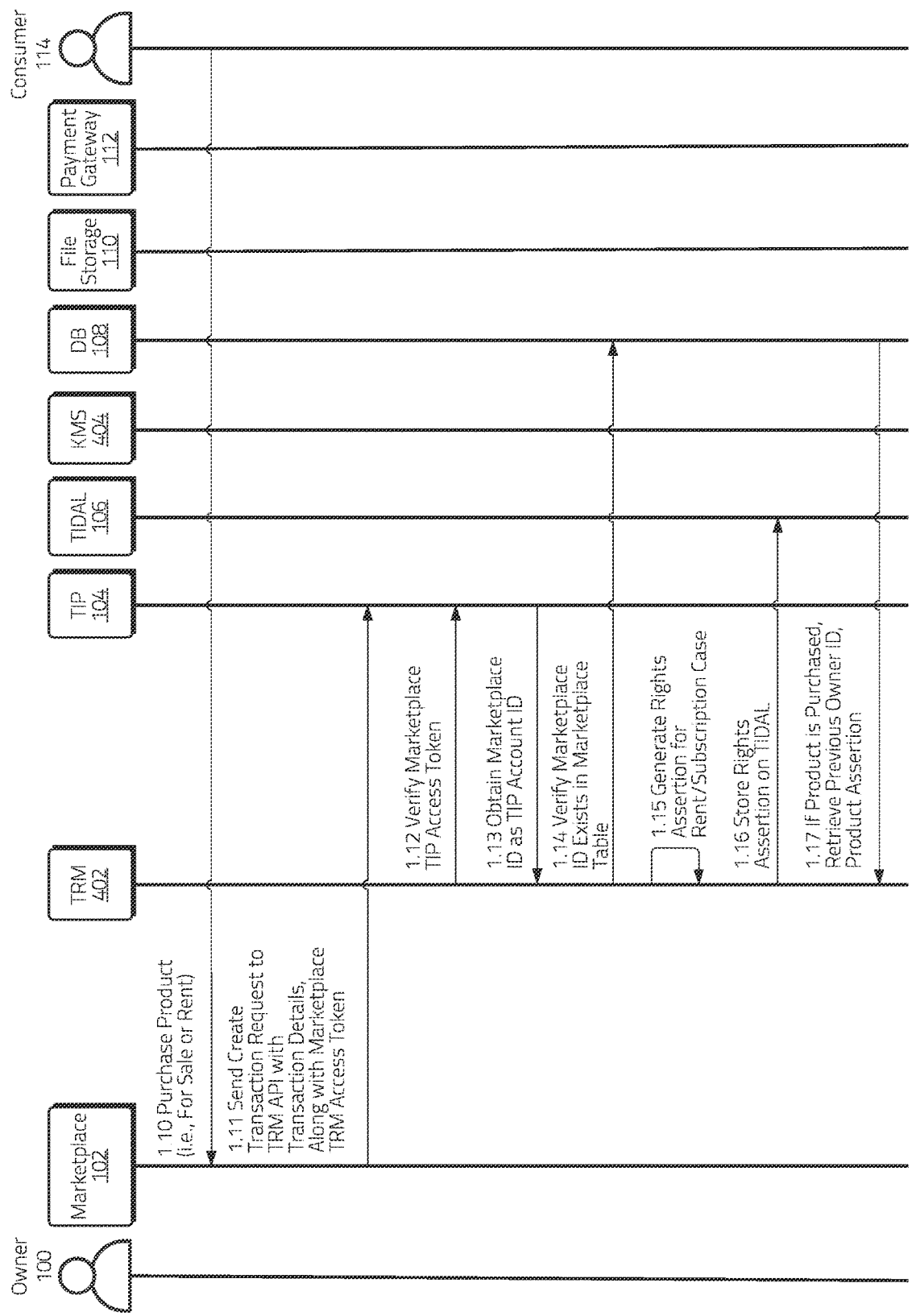
FIG. 6B illustrates a second part of a non-limiting example of a download process consistent with certain embodiments disclosed herein.
Figure 6C:
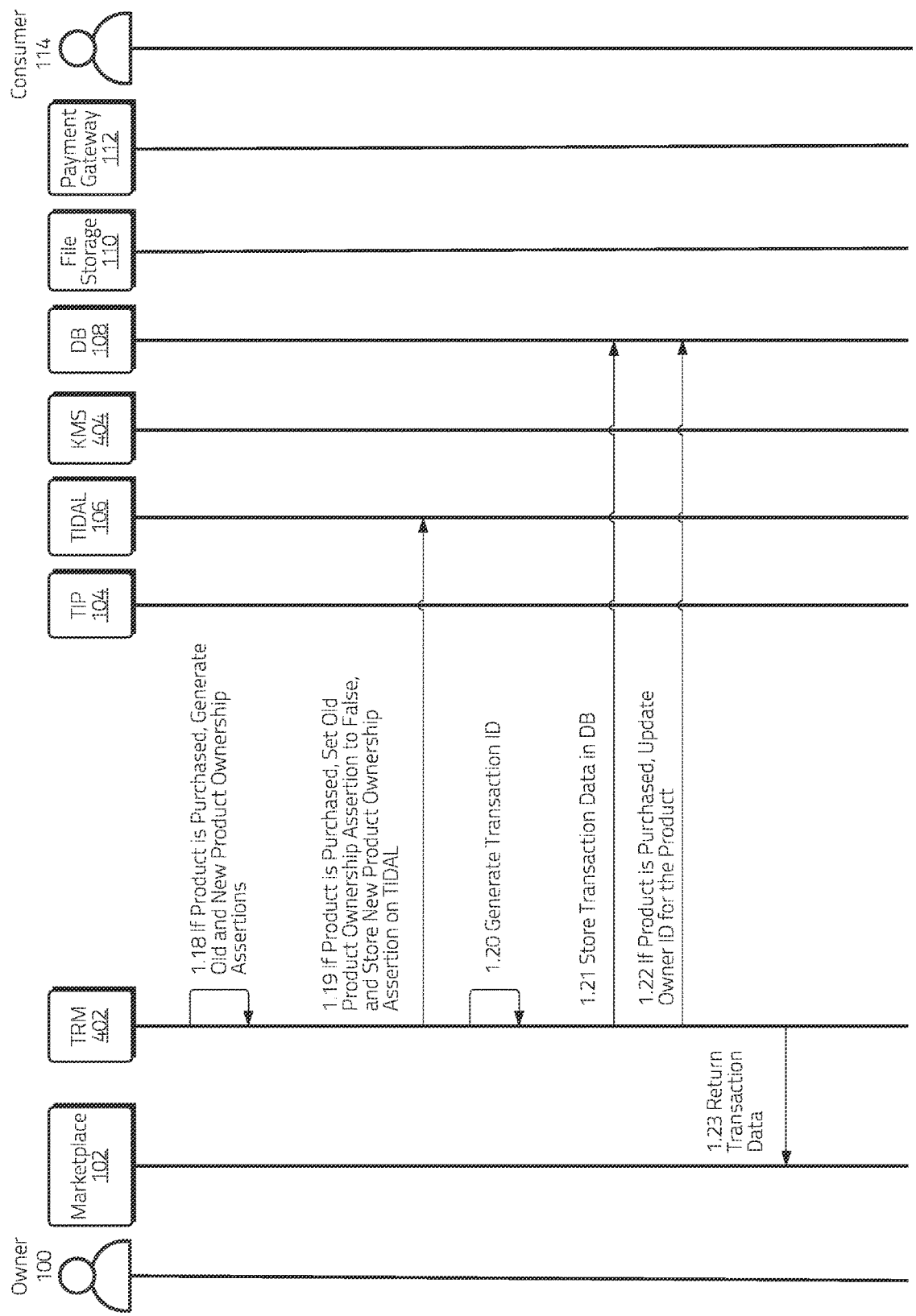
FIG. 6C illustrates a third part of a non-limiting example of a download process consistent with certain embodiments disclosed herein.
Figure 6D:
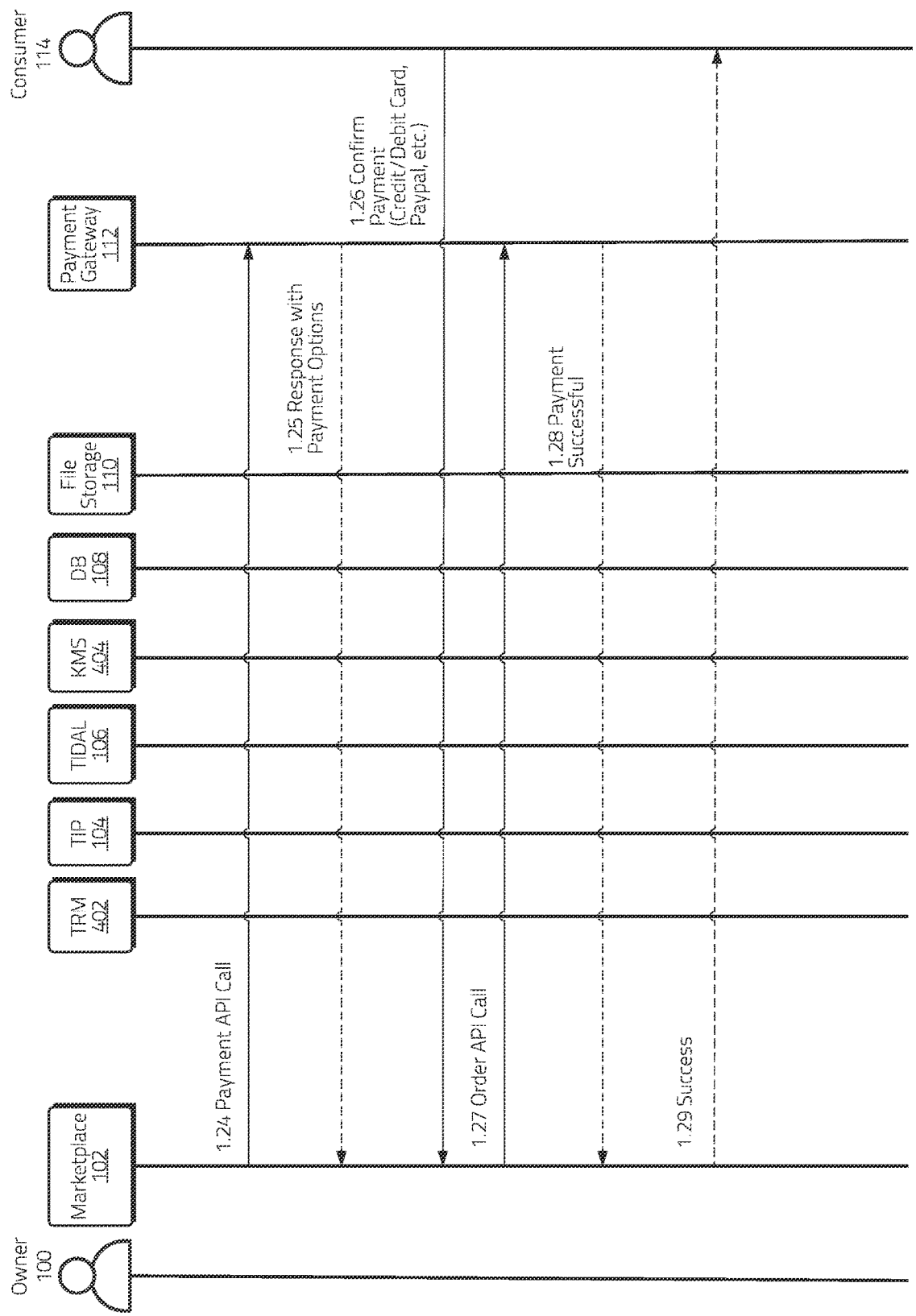
FIG. 6D illustrates a fourth part of a non-limiting example of a download process consistent with certain embodiments disclosed herein.

For example, as illustrated in FIG. 6D, the marketplace service 102 may call an API of the payment gateway service 112. The payment gateway service 112 may respond to the marketplace service 102 with one or more available payment options. The consumer 114 may select a suitable payment method supported by the marketplace service 102 such as, for example and without limitation, credit and/or debit card payment, PayPal, and/or the like. The consumer 114 may confirm payment details with the marketplace service 102.

The marketplace service 102 may call an API of the payment gateway service 112 with the requested order information and may receive an indication from the payment gateway service 112 indicating successful payment by the consumer 114. The marketplace service 102 may indicate to the consumer 114 the payment was a success. After successful payment, the marketplace service 102 may receive the amount from the consumer 114. The marketplace service 102 may then distribute the payment to respective owner(s) 100 in accordance with one or more applicable business agreements.

Asset Playback Within a Product

Figure 7A:
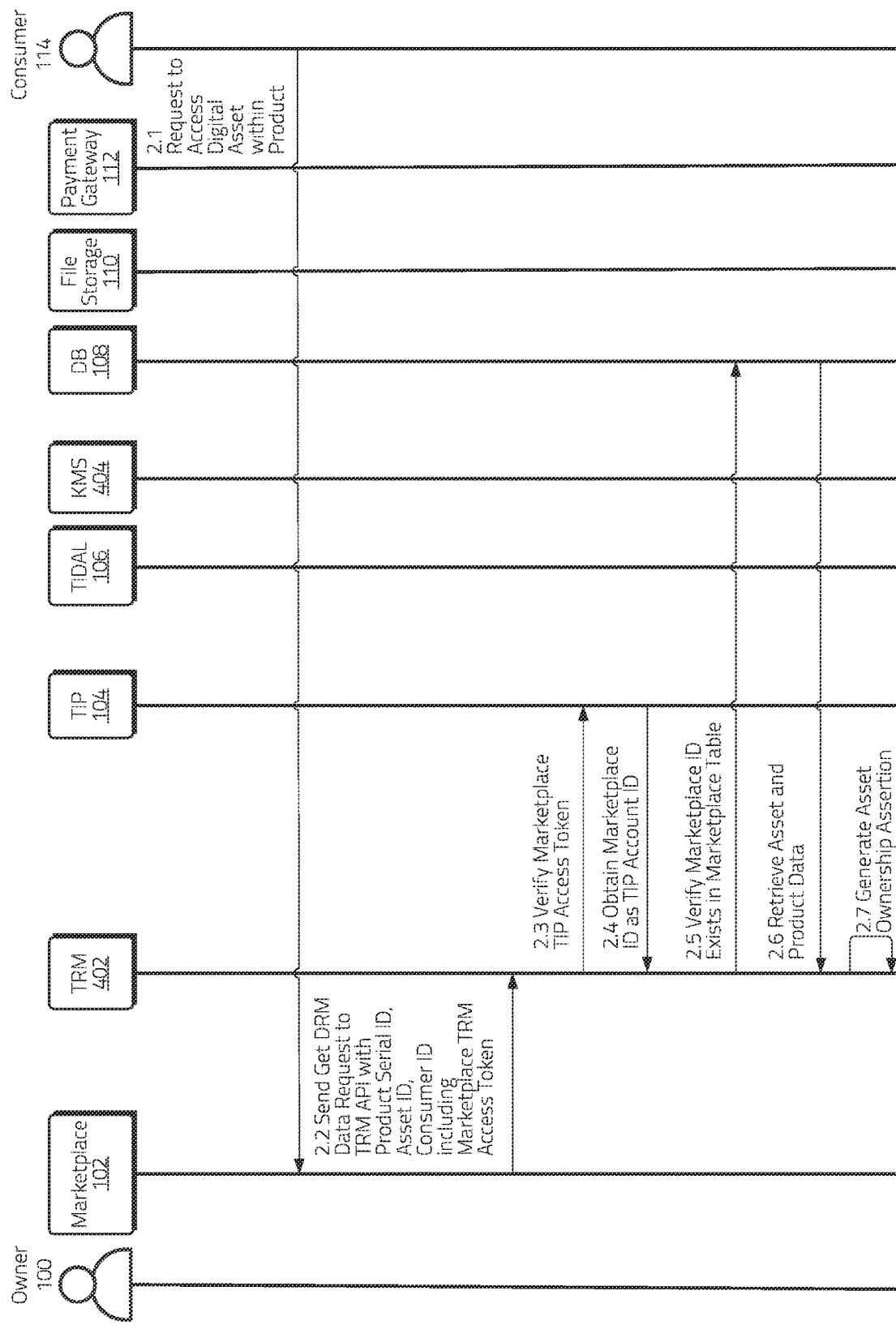
FIG. 7A illustrates a first part of a non-limiting example of an asset playback process consistent with certain embodiments disclosed herein.
Figure 7B:
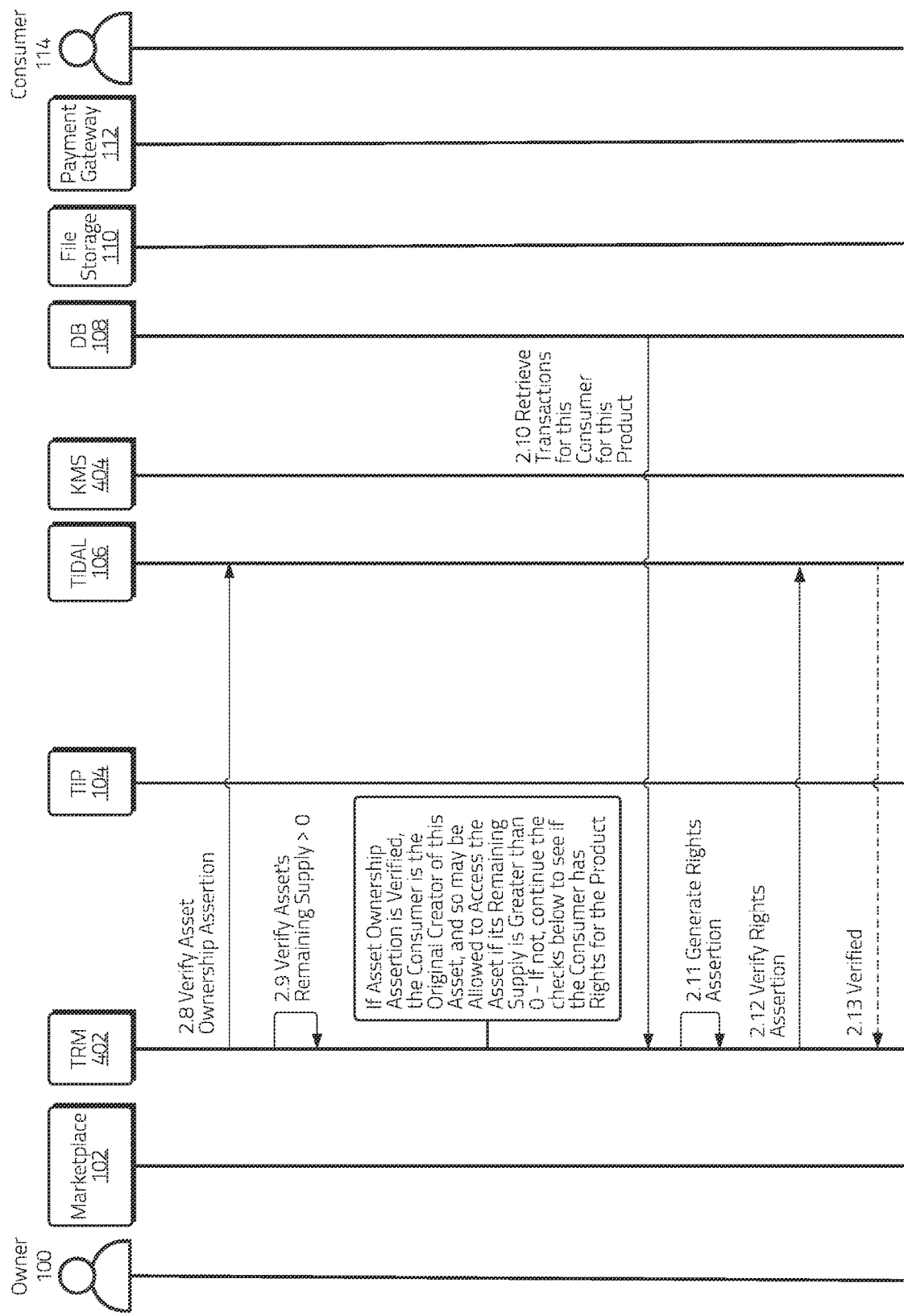
FIG. 7B illustrates a second part of a non-limiting example of an asset playback process consistent with certain embodiments disclosed herein.
Figure 7C:
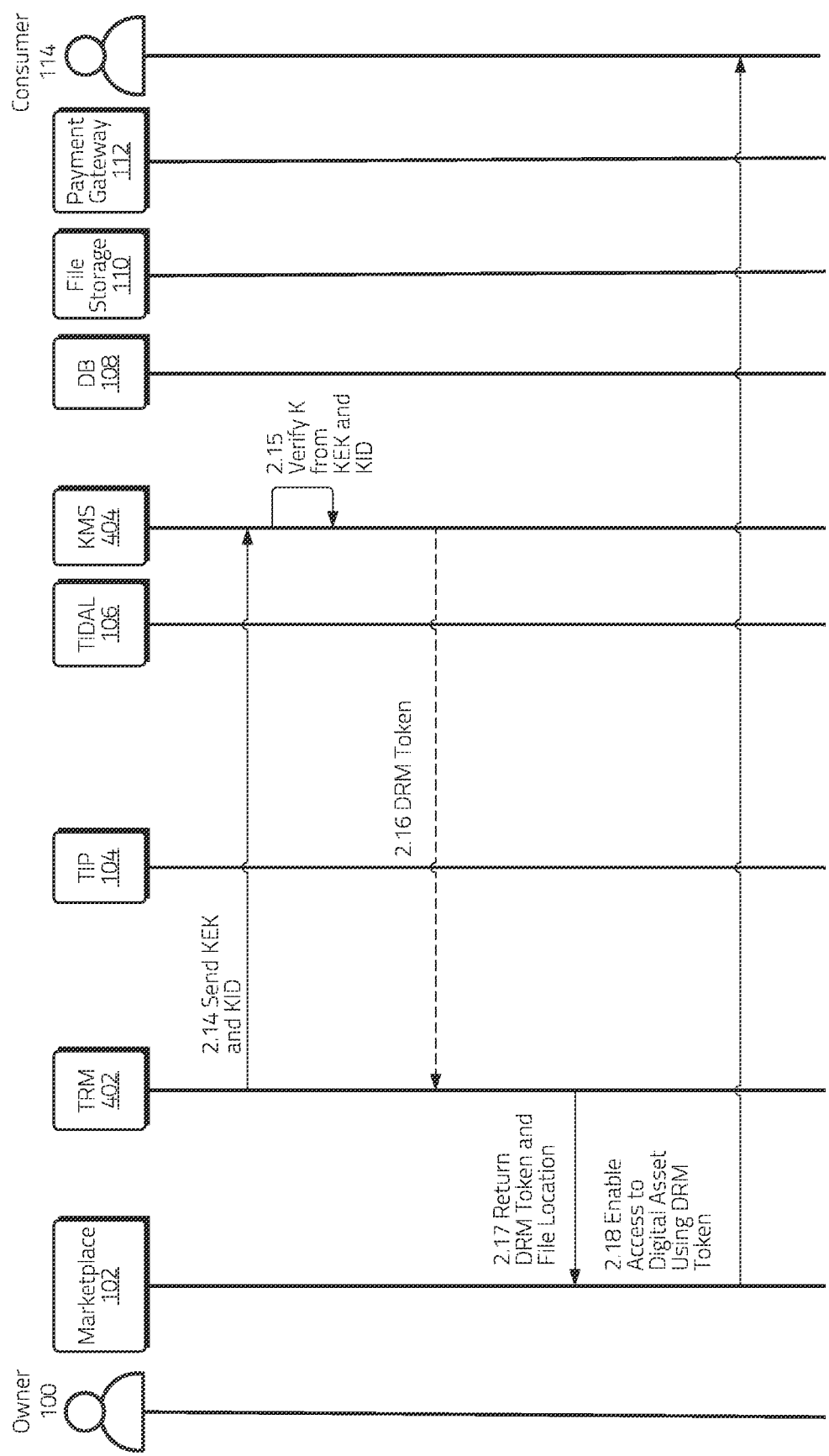
FIG. 7C illustrates a third part of a non-limiting example of an asset playback process consistent with certain embodiments disclosed herein.

FIGS. 7A-7C illustrate a non-limiting example of an asset playback process consistent with certain embodiments disclosed herein.

Steps 2.1-2.2: Request Playback

When a consumer 114 opens a link to access a product, initiating a request to access a digital asset within a product, the marketplace service 102 may send a verification request to the TRM service 402. The request may include, for example and without limitation, a TIP access token (e.g., a marketplace TRM access token), a product serial ID, asset ID(s), and/or a consumer ID.

Steps 2.3-2.5: Verify Marketplace

The marketplace TIP access token included in the access request may be verified via an IAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Steps 2.6-2.9: Check if User is ORH of Asset

The product and/or asset data may be retrieved from the product table and asset tables included in the DB 108 respectively. A corresponding asset ownership assertion may be generated by the TRM 402 and checked against the TIDAL 106. For example, if the asset's ORH ID matches the consumer ID, the consumer may be allowed to playback the content, pending asset ownership assertion verification with the TIDAL 106. However, if the remaining supply of the asset is 0, the ORH may not be allowed to playback the asset, as copies of the asset may now have been bundled into products (if the ORH owns any of these products, the ORH may still be able to playback the asset, as these checks may be performed in the subsequent steps).

Steps 2.10-2.13: Check if User Has Rights for the Product

Transaction data associated with the consumer 114 and/or product may be retrieved from the DB 108 and provided to the TRM service 402. The TRM service 402 may generate associated rights assertion and verify the rights assertion against the TIDAL 106.

For example and without limitation, if the product type is 'public', consumers may be allowed to playback the assets within the product. However, if the product type is 'private', the TRM service 402 may check if consumer ID matches an owner ID of the product. If it does, the consumer 114 is allowed to playback the asset, pending product ownership assertion verification in the TIDAL 106.

The TRM service 402 may further check if the consumer ID is in the invitee's column of the product table. If it is, the consumer 114 may be allowed to playback the asset, pending product invitee assertion verification in a TIDAL 106.

In addition, the TRM service 402 may check if there is a valid transaction granting the consumer 114 to access the product in the transaction table in DB 108. If there is, the consumer may be allowed to playback the asset, pending rights assertion verification in the TIDAL 106.

Steps 2.14-2.18: Prepare Asset Playback

In a DRM application (e.g., for audio content, video content, and/or the like), the TRM service 402 may retrieve the KEK stored in the TIP vault and the KID from the asset table. The TRM service 402 may call DRM service APIs associated with a KMS 404 to issue a token for DRM license by providing the KEK and KID. Once the DRM token is issued by the KMS 404 of the DRM service, the TRM service 402 may distribute the token, and file location URL (e.g., from asset table) to the marketplace services 102. The marketplace service 102 may fetch data from file storage 110 and initiate the DRM playback of the digital asset to the consumer 114 (for example, via a media player application integrating DRM functionality).

In a non-DRM case, the TRM service 402 may retrieve its secret key from the TIP vault and encrypted content key from the asset table. The TRM service 402 may decrypt the encrypted content key with its secret key. The TRM service 402 may retrieve the encrypted digital asset from the file storage 110 and decrypt it with the content key. The TRM service 402 may make the decrypted digital asset available to the marketplace service 102, where it may be accessed by the consumer 114.

Update/Delist Phase

Asset Update

Figure 8A:
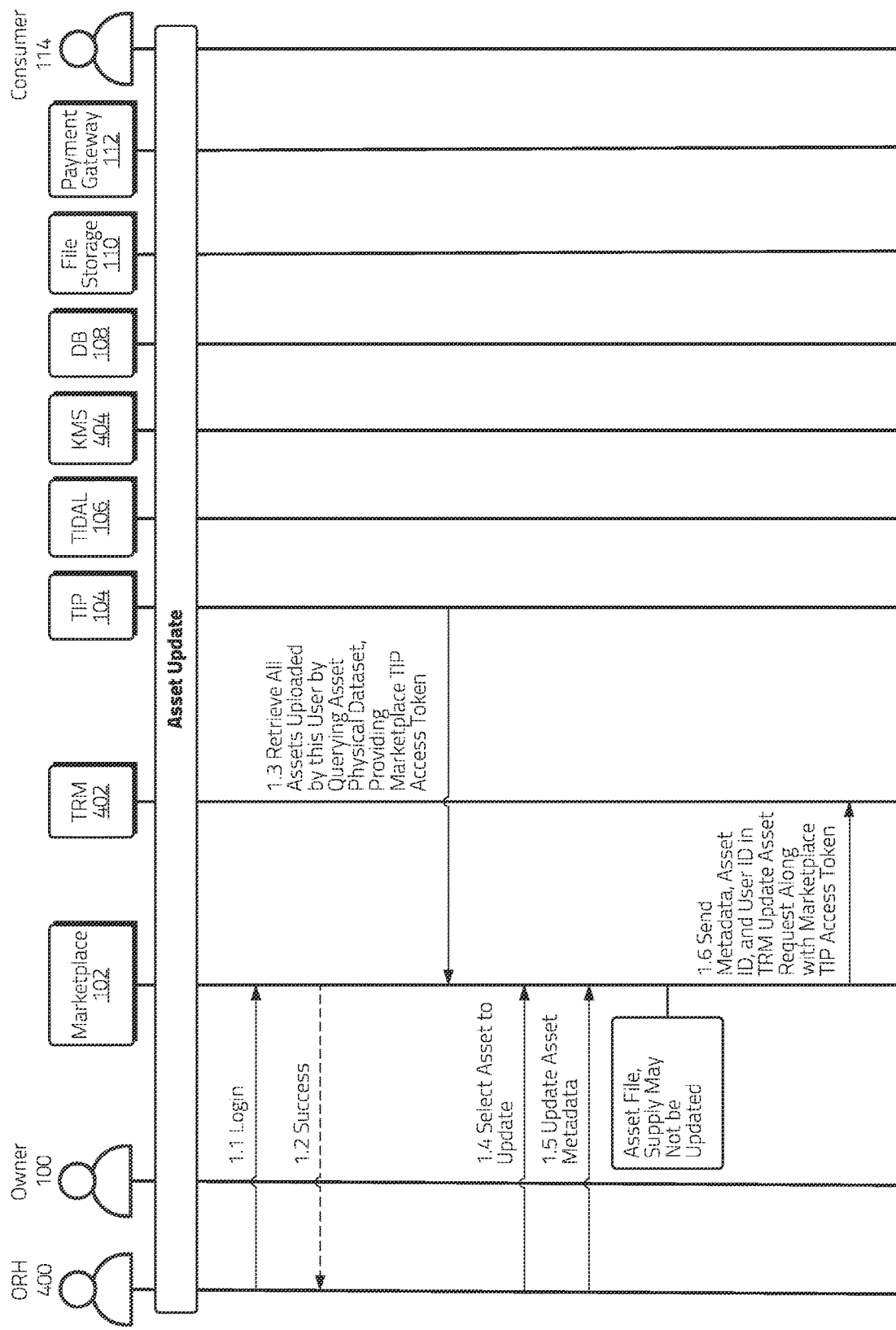
FIG. 8A illustrates a first part of a non-limiting example of an asset update process consistent with certain embodiments disclosed herein.
Figure 8B:
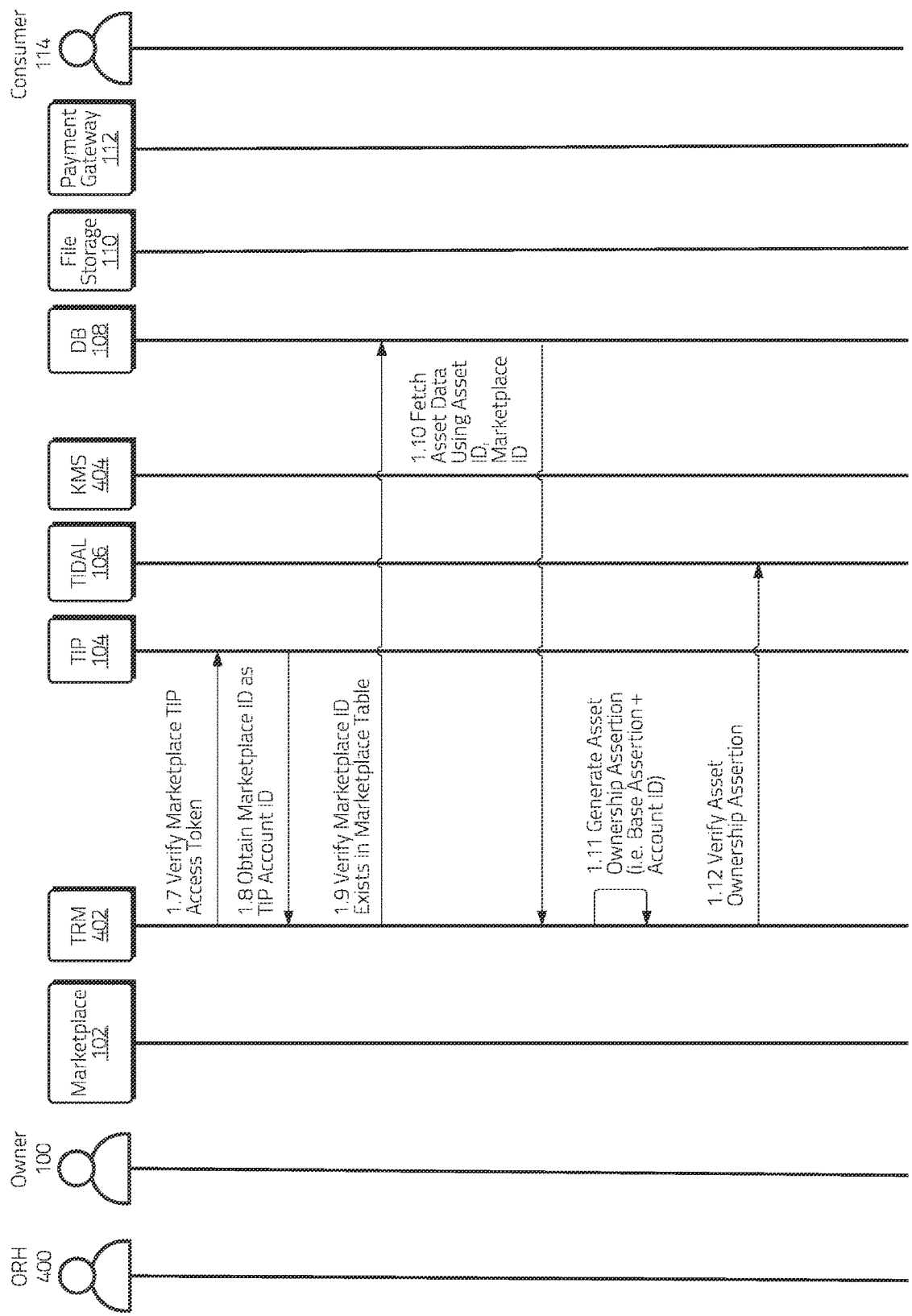
FIG. 8B illustrates a second part of a non-limiting example of an asset update process consistent with certain embodiments disclosed herein.
Figure 8C:
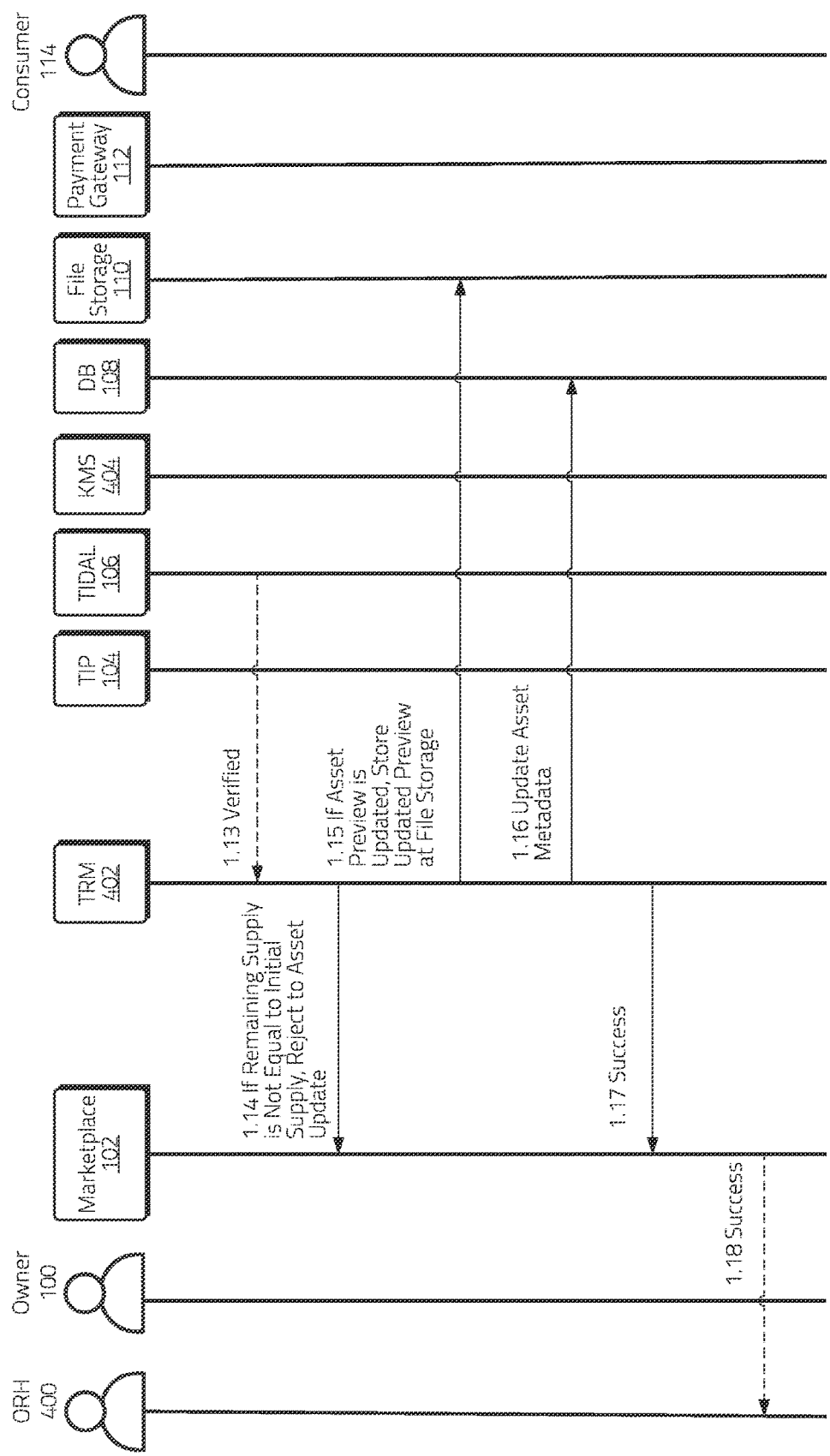
FIG. 8C illustrates a third part of a non-limiting example of an asset update process consistent with certain embodiments disclosed herein.

FIGS. 8A-8C illustrate a non-limiting example of an asset update process consistent with certain embodiments disclosed herein.

Steps 1.1-1.2: Login

In some embodiments, the ORH 400 may login to the marketplace service 102. In certain embodiments, a Google account (e.g., Open ID connect) may be used for login, although other methods of login may also be employed. The marketplace service 102 may authenticate the ORH 400, issuing the consumer an authentication token if successfully authenticated.

Steps 1.3-1.6: Update Asset Request

The marketplace service 102 may retrieve the list of assets uploaded by the ORH 400 from the asset physical dataset at the TIP service 104 using its marketplace TIP access token. The ORH 400 may select one from the list of assets and may update its metadata. For example, the ORH 400 may update the title and/or preview information included in the asset metadata. In some embodiments, an asset file and/or its associated supply may not be updated (although certain implementations may allow such updates). The marketplace service 102 may send a request to the TRM service 402 with the updated asset metadata, asset ID, and/or user ID, along with its TIP access token.

Steps 1.7-1.9: Verify Marketplace

The marketplace TIP access token may be verified via an IAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Steps 1.10-1.13: Verify Asset Ownership

The asset data may be retrieved from the DB 108 using, for example, the asset ID and/or the marketplace ID. An asset ownership assertion may be generated with the provided user ID and checked against the TIDAL 106. If the asset ownership assertion is not verified by TIDAL 106, the asset update request may be rejected by the TRM service 402.

Step 1.14: Verify Asset in Not Bundled into Any Product

The TRM service 402 may check whether the asset's remaining supply is less than its initial supply. This may be a proxy for checking whether the asset has been bundled into any products or not. If the asset has been bundled into a product that may have been sold already, the ORH 400 may not be allowed to update the asset metadata, as the owner of such a product had purchased the product with the original asset metadata. Thus, if the asset's remaining supply is less than its initial supply, the update operation may be rejected.

Steps 1.15-1.18: Update Asset

If a preview file is provided as part of the update, the preview file may be updated in the file storage 110. The asset metadata and preview file URL may be updated in the asset table in DB 108. In some embodiments, an indication of the successful uploading of the digital asset may be communicated to the marketplace service 102 and/or the ORH 400 from the TRM 402.

Product Update

Figure 9A:
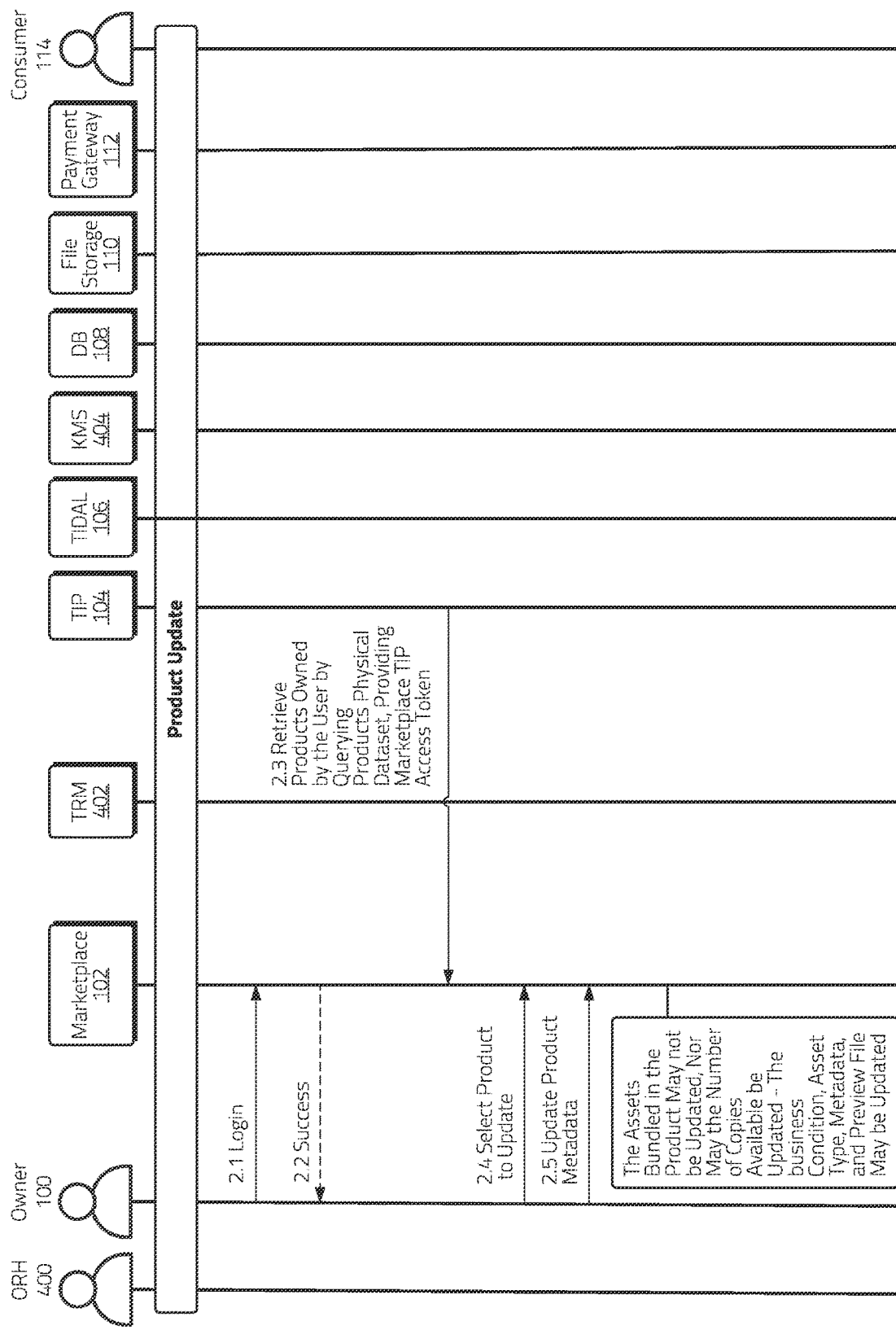
FIG. 9A illustrates a first part of a non-limiting example of a product update process consistent with certain embodiments disclosed herein.
Figure 9B:
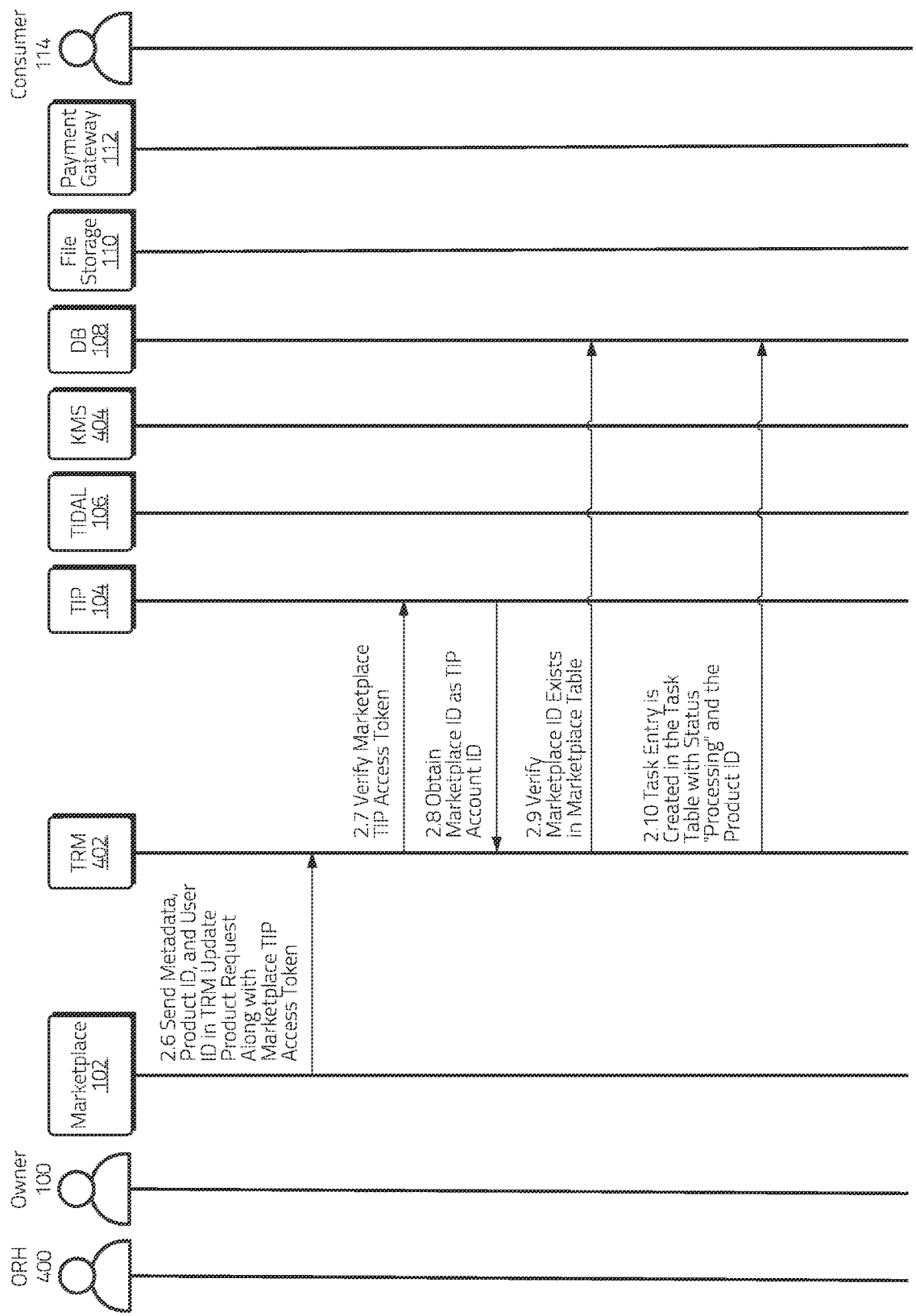
FIG. 9B illustrates a second part of a non-limiting example of a product update process consistent with certain embodiments disclosed herein.
Figure 9C:
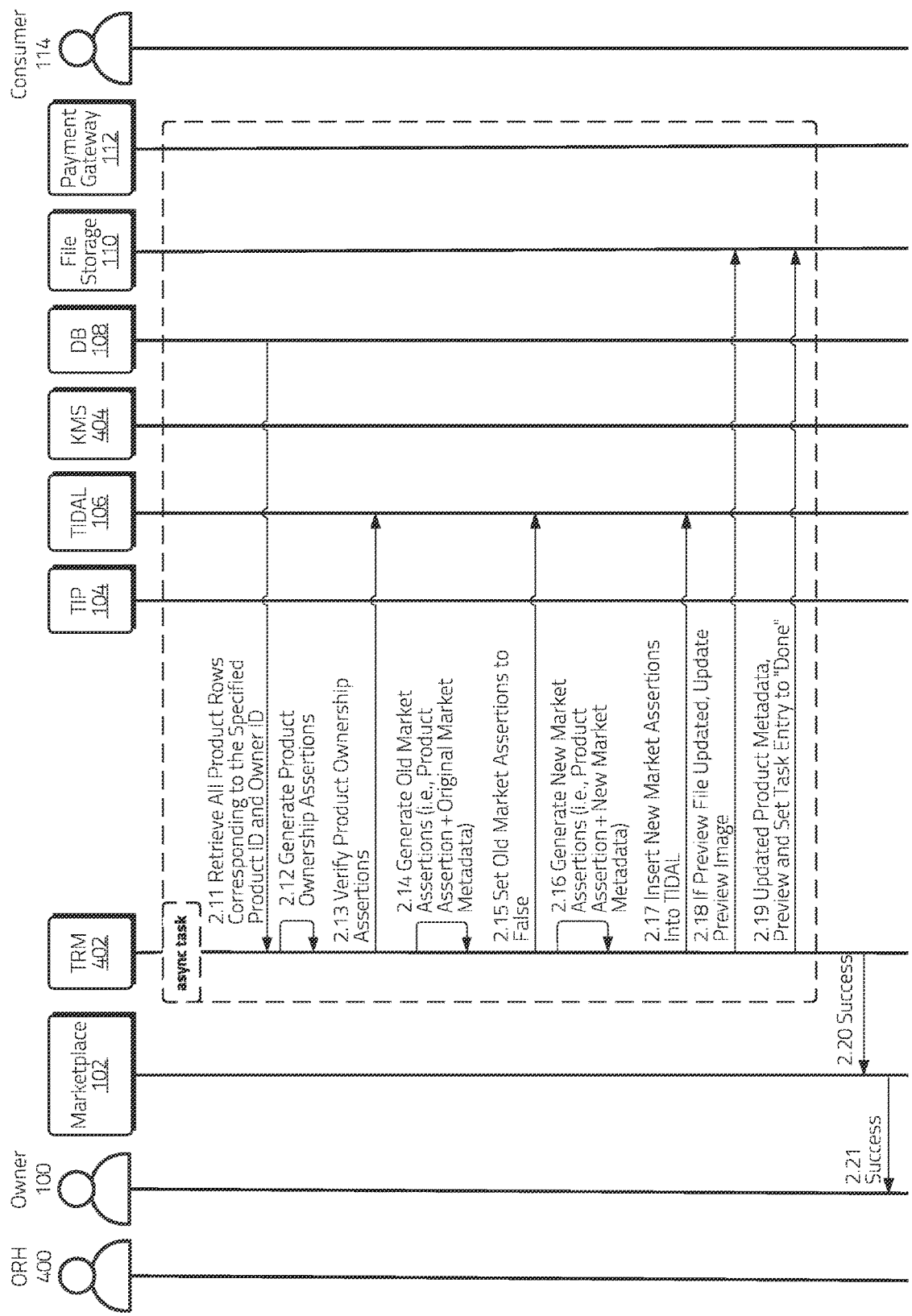
FIG. 9C illustrates a third part of a non-limiting example of a product update process consistent with certain embodiments disclosed herein.

In some implementations, certain assets may be limited in their ability to be updated. For example, in certain embodiments, assets bundled in a product may not be updated, nor may the number of copies available be updated. In some business metadata (e.g., business conditions, sell price, rent price, etc.), product type (e.g., public/private), product metadata (e.g., title, description, etc.), and/or preview file may be updated for all copies of the product owned by the owner 100 performing the update request. FIGS. 9A-9C illustrate a non-limiting example of a product update process consistent with certain embodiments disclosed herein.

Steps 2.1-2.2: Login

In some embodiments, the owner 100 may login to the marketplace service 102. In certain embodiments, a Google account (e.g., Open ID connect) may be used for login, although other methods of login may also be employed. The marketplace service 102 may authenticate the owner 100, issuing the consumer an authentication token if successfully authenticated.

Steps 2.3-2.6: Update Product Request

The marketplace service 102 may retrieve the list of products owned by the owner 100 from the products physical dataset at the TIP service 104 using its marketplace TIP access token. The owner 100 may select one from the list of products and may update it. For example, the owner 100 may update product metadata (e.g., title, description, etc.), preview, asset type, business metadata (e.g., business conditions, sell price, rent price and/or period, subscription price and/or period, rent-ownership price and/or period, and/or the like. In certain embodiments, the assets bundled in a product may not be updated, nor may the number of copies be updated, although other alternatively implementations are also contemplated. The marketplace service 102 may send a request to the TRM service 402 with the updated fields, product ID, owner ID, along with its TIP access token.

Steps 2.7-2.9: Verify Marketplace

The marketplace TIP access token included in the product creation request may be verified via an IAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Step 2.10: Start Processing Update

In some embodiments, a task entry may be created in the task table with status "processing" and the product ID.

Step 2.11-2.19: Process Product Update

In various embodiments, one or more steps of a product update process may be performed as an asynchronous task. The product data corresponding to product ID and owner ID may be retrieved from the product table in the DB 108. For each such product serial ID, a product ownership assertion may be generated and verified with the TIDAL 106. If one or more product ownership assertions are not verified, the product update operation may be rejected. An old market assertion (e.g., product assertion+original market metadata) may be generated and set to false in the TIDAL 106. A new market assertion (e.g., product assertion+new market metadata) may be generated. The new market assertion may be inserted into the TIDAL 106. If the preview file is supplied by the owner 100, the preview may be updated in file storage service 110. The product data and preview may be updated in the DB 108, and the task entry may be set to "done."

In some embodiments, an indication of the successful uploading of the digital asset may be communicated to the marketplace service 102 and/or the owner 100 from the TRM 402.

Delist Product

Figure 10A:
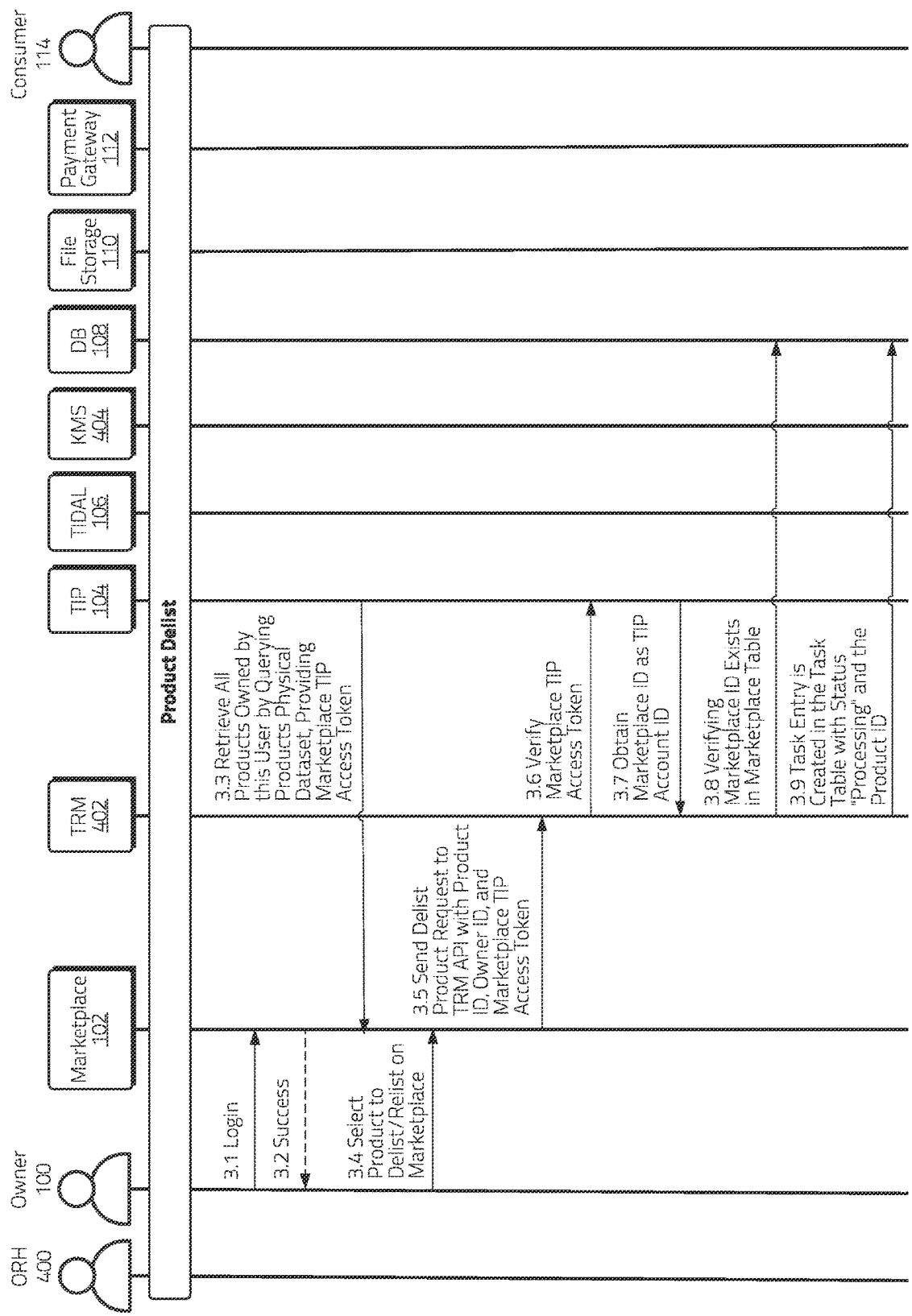
FIG. 10A illustrates a first part of a non-limiting example of a product delisting process consistent with certain embodiments disclosed herein.
Figure 10B:
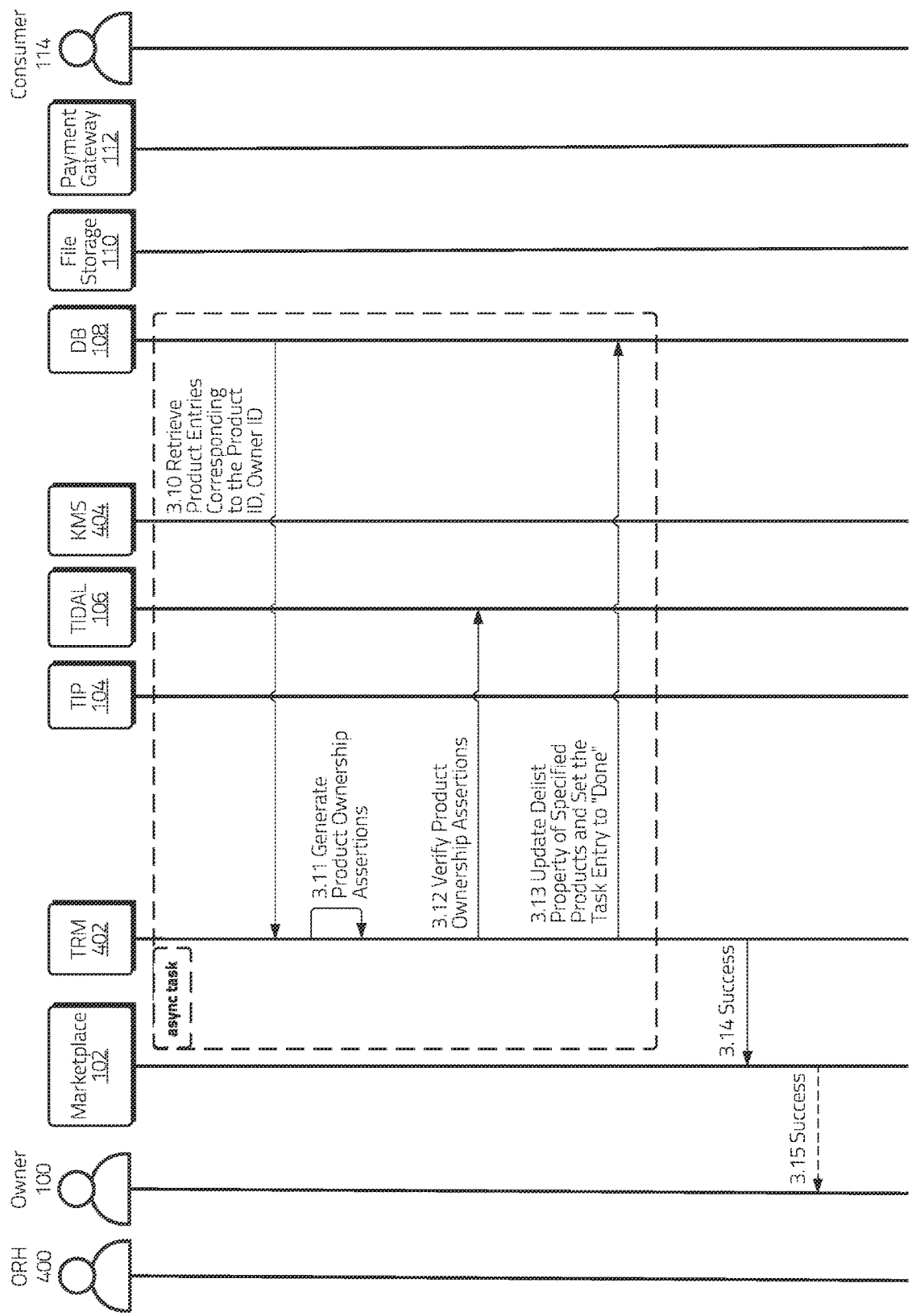
FIG. 10B illustrates a second part of a non-limiting example of a product delist process consistent with certain embodiments disclosed herein.

FIG. 10A-10B illustrates a non-limiting example of a product delist process consistent with certain embodiments disclosed herein.

Step 3.1-3.2: Login

In some embodiments, the owner 100 may login to the marketplace service 102. In certain embodiments, a Google account (e.g., Open ID connect) may be used for login, although other methods of login may also be employed. The marketplace service 102 may authenticate the owner 100, issuing the consumer an authentication token if successfully authenticated.

Steps 3.3-3.5: Delist Product Request

The marketplace service 102 may retrieve the list of products owned by the owner 100 from the products physical dataset at the TIP service 104 using its marketplace TIP access token. The owner 100 may select one from the list of products. The owner 100 may delist the product if it is currently available on the marketplace service 100 (e.g., set delist value to "1" indicating true), and relist it on the marketplace service 102 if it is not (e.g., set delist value to "0" indicating false). The marketplace service 102 may send a request to the TRM service 402 with the updated delist value, product ID, owner ID, along with its TIP access token.

Steps 3.6-3.8: Verify Marketplace

The marketplace TIP access token may be verified via an IAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Step 3.9: Create Task Entry

A task entry may be created in the task table in the DB 108 with status "processing" and the product ID.

Steps 3.10-3.12: Verify Product Ownership

In various embodiments, one or more steps of a product ownership verification process may be performed as an asynchronous task. The TRM service 104 may retrieve entries in the product table in DB 108 corresponding to a specified product ID and/or owner ID. The TRM service 104 may generate the product ownership assertions for the specified owner ID and verify the generated assertions with the TIDAL 106. If any of the product ownership assertions are unverified, the TRM service 402 may reject the delist request.

Steps 3.13-3.15: Update Products

The delist property of the corresponding entries in the product table in the DB 108 may be updated to the specified delist value and the task entry may be set to "done". In some embodiments, an indication of the successful delisting may be communicated to the marketplace service 102 and/or the owner 100 from the TRM 402.

Delete Phase

Delete Asset

Figure 11A:
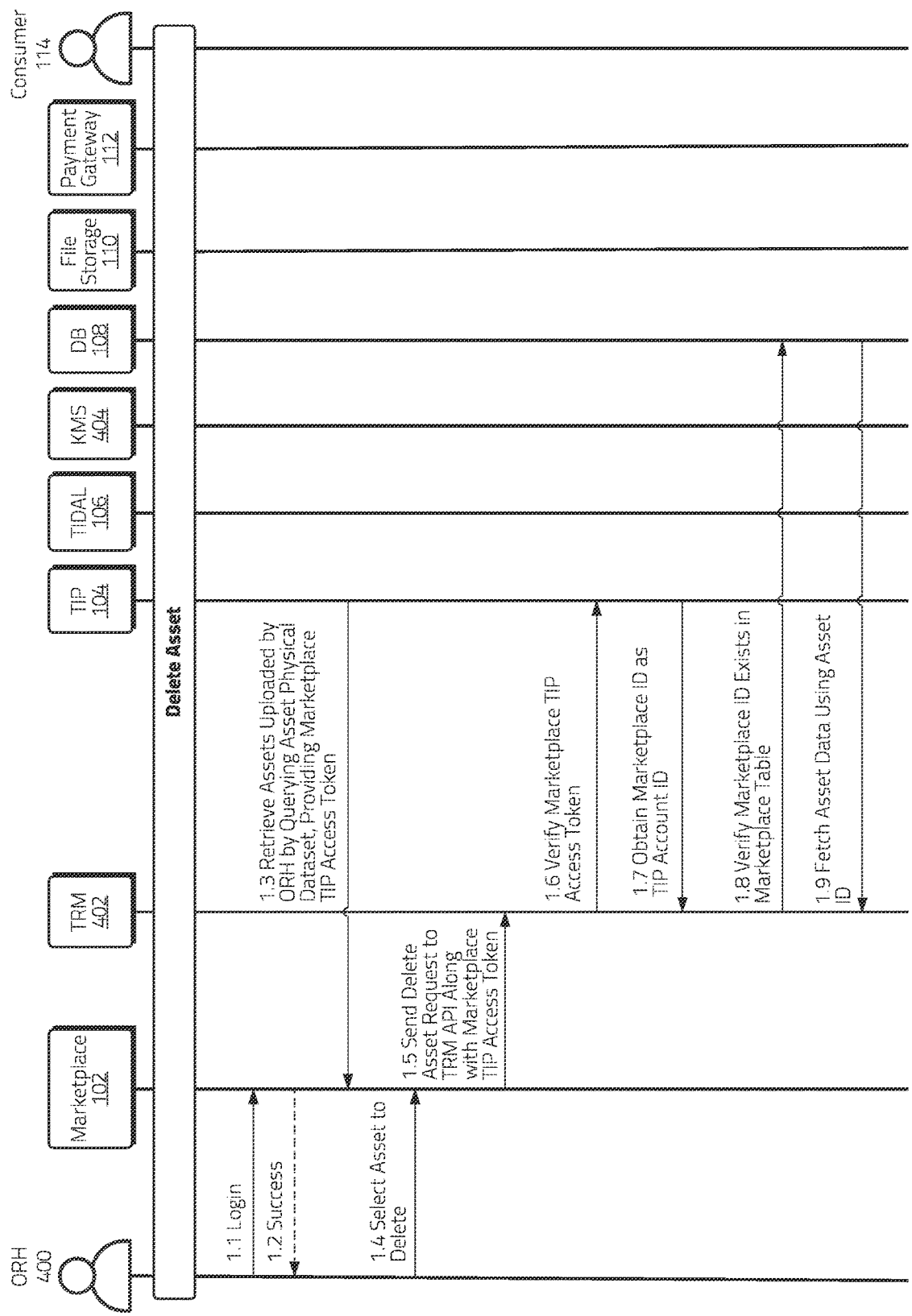
FIG. 11A illustrates a first part of a non-limiting example of an asset delete process consistent with certain embodiments disclosed herein.
Figure 11B:
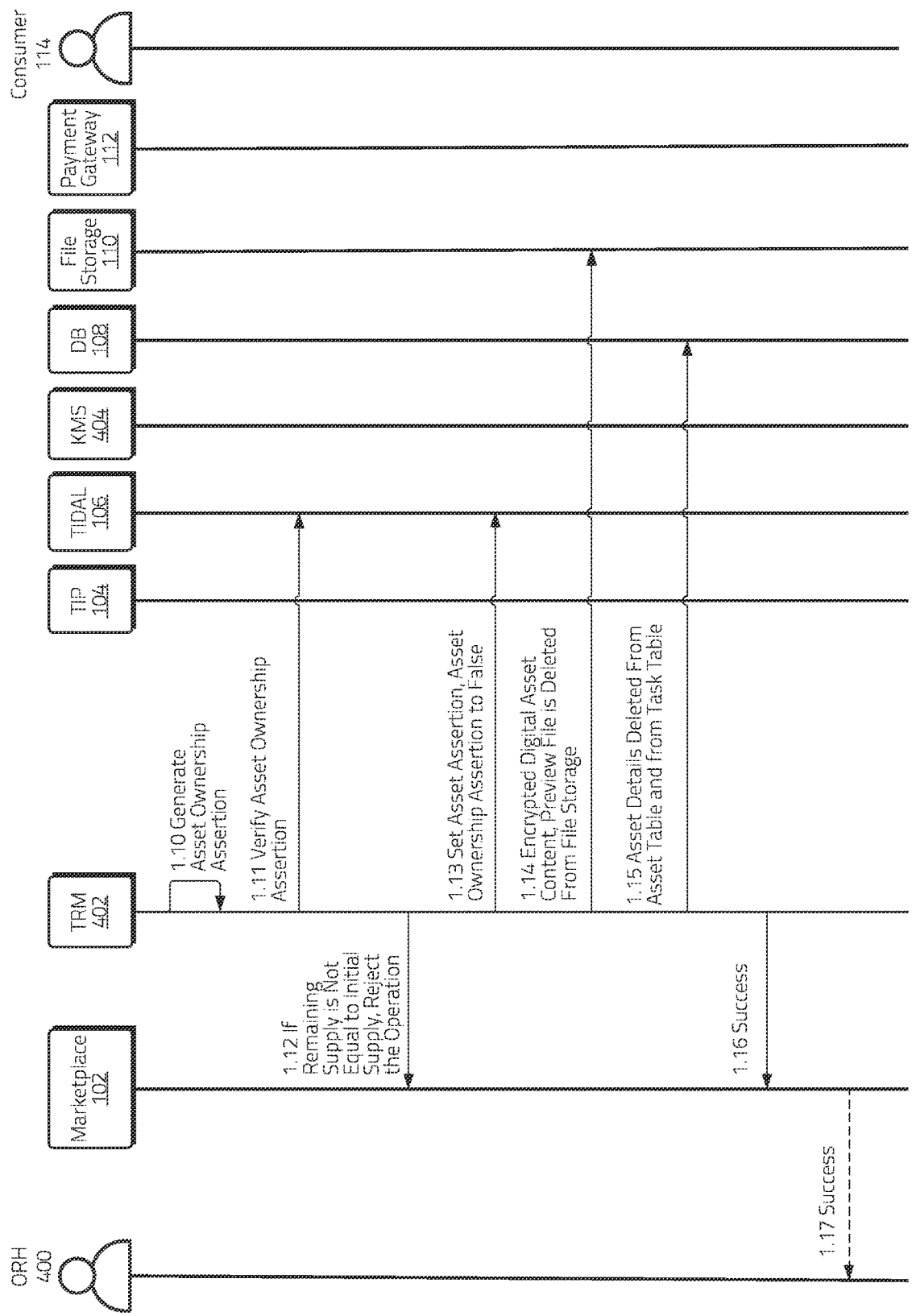
FIG. 11B illustrates a second part of a non-limiting example of an asset delete process consistent with certain embodiments disclosed herein.

FIGS. 11A-11B illustrate a non-limiting example of an asset delete process consistent with certain embodiments disclosed herein. In certain embodiments, an ORH 400 that creates an asset may delete it, as long as it is not bundled into existing products.

Steps 1.1-1.2: Login

In some embodiments, the ORH 400 may login to the marketplace service 102. In certain embodiments, a Google account (e.g., Open ID connect) may be used for login, although other methods of login may also be employed. The marketplace service 102 may authenticate the ORH 400, issuing the consumer an authentication token if successfully authenticated.

Steps 1.3-1.5: Delete Asset Request

The marketplace service 102 may retrieve the list of assets uploaded by the ORH 400 from the asset physical dataset at the TIP service 104 using its marketplace TIP access token. The ORH 400 may select one from the list of assets to delete. The marketplace service 102 may send a delete request to TRM service 104 with the asset ID, ORH ID, along with its TIP access token.

Steps 1.6-1.8: Verify Marketplace

The marketplace TIP access token included in the product creation request may be verified via an IAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Steps 1.9-1.11: Verify Asset Ownership

The asset data may be retrieved from the asset table in the DB 108. The asset ownership assertion may be generated with the provided ORH ID. If the asset ownership assertion is not verified by the TIDAL 106, the asset delete request may be rejected by the TRM service 104 as, in some implementations, only the ORH 400 may delete their assets.

Step 1.12: Verify Asset is not Bundled into any Product

The TRM service 402 may check whether the asset's remaining supply is less than its initial supply. This may be a proxy for checking whether the asset has been bundled into any products or not. If the asset has been bundled into a product that may have been sold already, the ORH 400 may not be allowed to delete the asset. Thus, if asset's remaining supply is less than its initial supply, the delete operation may be rejected.

Steps 1.13-1.17: Delete Asset

The TRM service 104 may set the asset and asset ownership assertions to false in the TIDAL 106. The encrypted digital asset file and preview file may be deleted from the file storage service 110. Finally, the asset may be deleted from the asset table and related tasks may be deleted from the task table in the TB 108. In some embodiments, an indication of the successful delisting may be communicated to the marketplace service 102 and/or the owner 100 from the ORH 400.

Delete Product

Figure 12A:
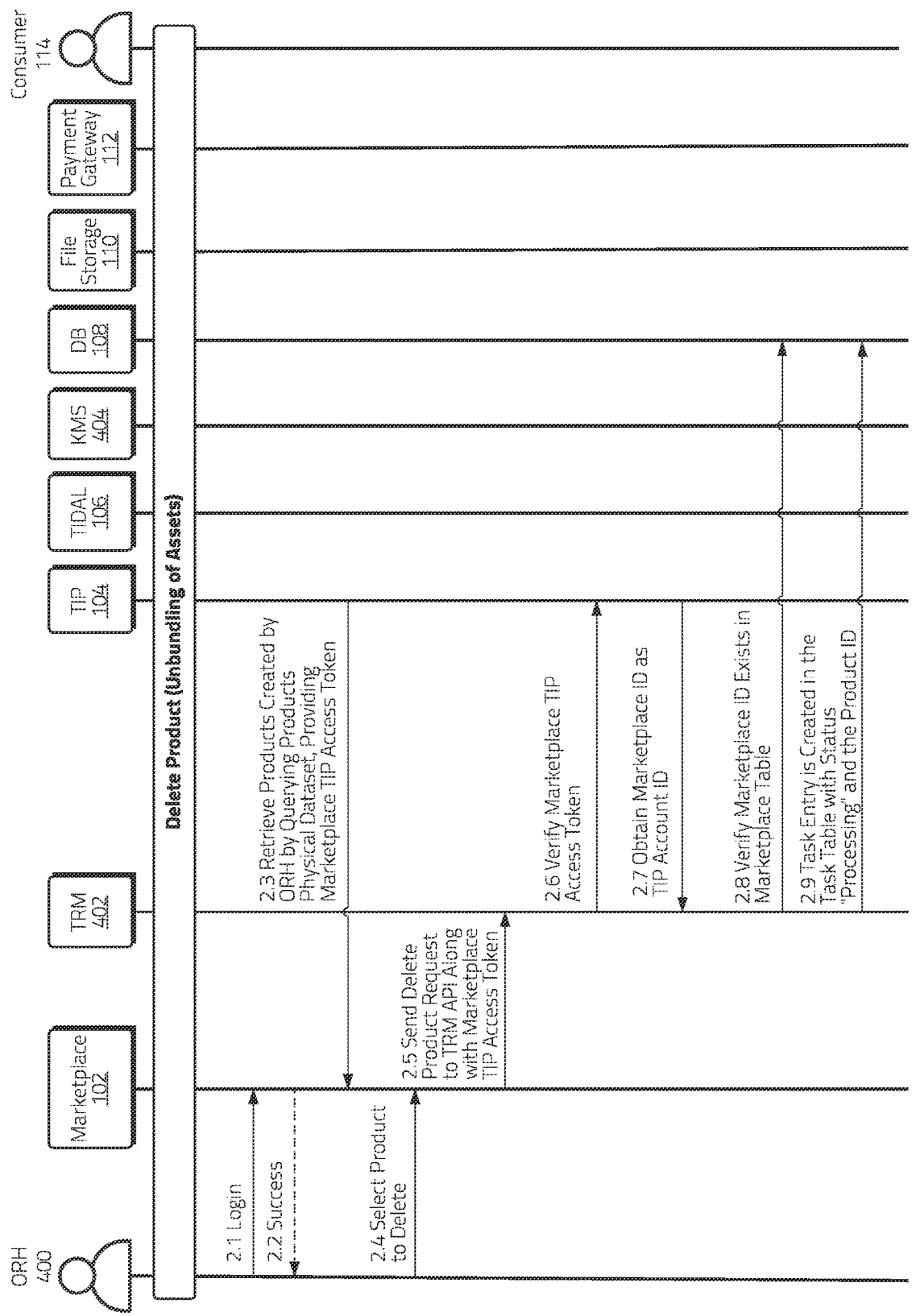
FIG. 12A illustrates a first part of a non-limiting example of an asset unbundling process consistent with certain embodiments disclosed herein.
Figure 12B:
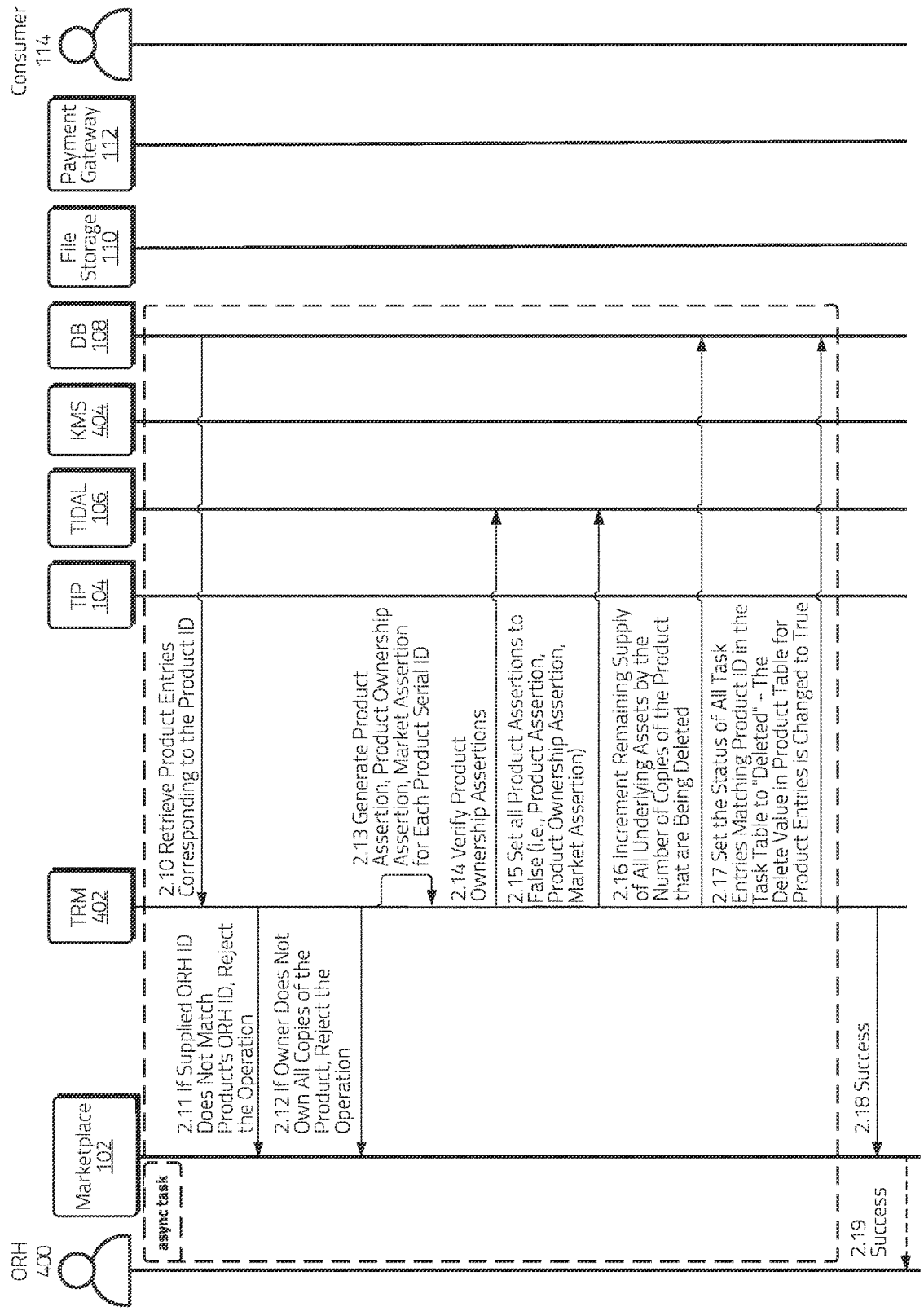
FIG. 12B illustrates a second part of a non-limiting example of an asset unbundling process consistent with certain embodiments disclosed herein.

FIGS. 12A-12B illustrate a non-limiting example of an asset unbundling process consistent with certain embodiments disclosed herein. In certain embodiments, deleting a product may unbundle the assets that are bundled within that product. For example, the supply of each asset bundled in the product to be deleted may be incremented by the total supply of the product. In some implementations, deletion of products may be limited to the ORH 400 that created the products and owns the copies of the product.

Steps 2.1-2.2: Login

In some embodiments, the ORH 400 may login to the marketplace service 102. In certain embodiments, a Google account (e.g., Open ID connect) may be used for login, although other methods of login may also be employed. The marketplace service 102 may authenticate the ORH 400, issuing the consumer an authentication token if successfully authenticated.

Steps 2.3-2.5: Delete Product Request

The marketplace service 102 may retrieve the list of products created by the ORH 400 from the products physical dataset at the TIP service 104 using its marketplace TIP access token. The ORH 400 may select at least one product from the list of products to delete. The ORH 400 may decide to delete one of their products uploaded to the marketplace service 102. The marketplace service 102 may send a request to TRM service 104 with the product ID, ORH ID, along with the marketplace TIP access token.

Steps 2.6-2.8: Verify Marketplace

The marketplace TIP access token may be verified via an JAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Step 2.9: Create Task Entry

The task entry may be created in the task table in the DB 108 with status "processing" and the product ID.

Steps 2.10-2.14: Verify ORH

In various embodiments, one or more steps of an ORH verification and/or a product deletion process may be performed as an asynchronous task. The TRM service 402 may retrieve entries in product table corresponding to the specified product ID from the DB 108. If the ORH ID of the product entries does not match the supplied ORH ID, the operation may be rejected. If the owner ID of any product entry does not match the supplied ORH ID, the operation may be rejected. In some embodiments, the ORH 400 may need to own all copies of the product to be deleted, although other implementations where this is not the case are also contemplated.

Product ownership assertions may be generated by the TRM service 402 for each product serial ID and checked against the TIDAL 106. If any of the product ownership assertions are unverified by the TIDAL 106, the delete request may be rejected.

Steps 2.15-2.19: Delete Product

The product assertion, product ownership assertion, and market assertion may be generated for each product serial ID and set to false in the TIDAL 106. The remaining supply of each underlying asset in the product may be incremented in the DB 108 by the total copies of the product to be deleted. The asset table may be updated in the DB 108 to reflect the new remaining supply counts for the underlying assets. The status of the entries in the task table in the DB 108 may be set to "deleted" and the delete value in the product table in the DB 108 for the product entries may be changed to true.

In some embodiments, an indication of the successful deletion may be communicated to the marketplace service 102 and/or the owner 100 from the ORH 400.

Invite/Disinvite Friend for Product

Invite Process

Figure 13A:
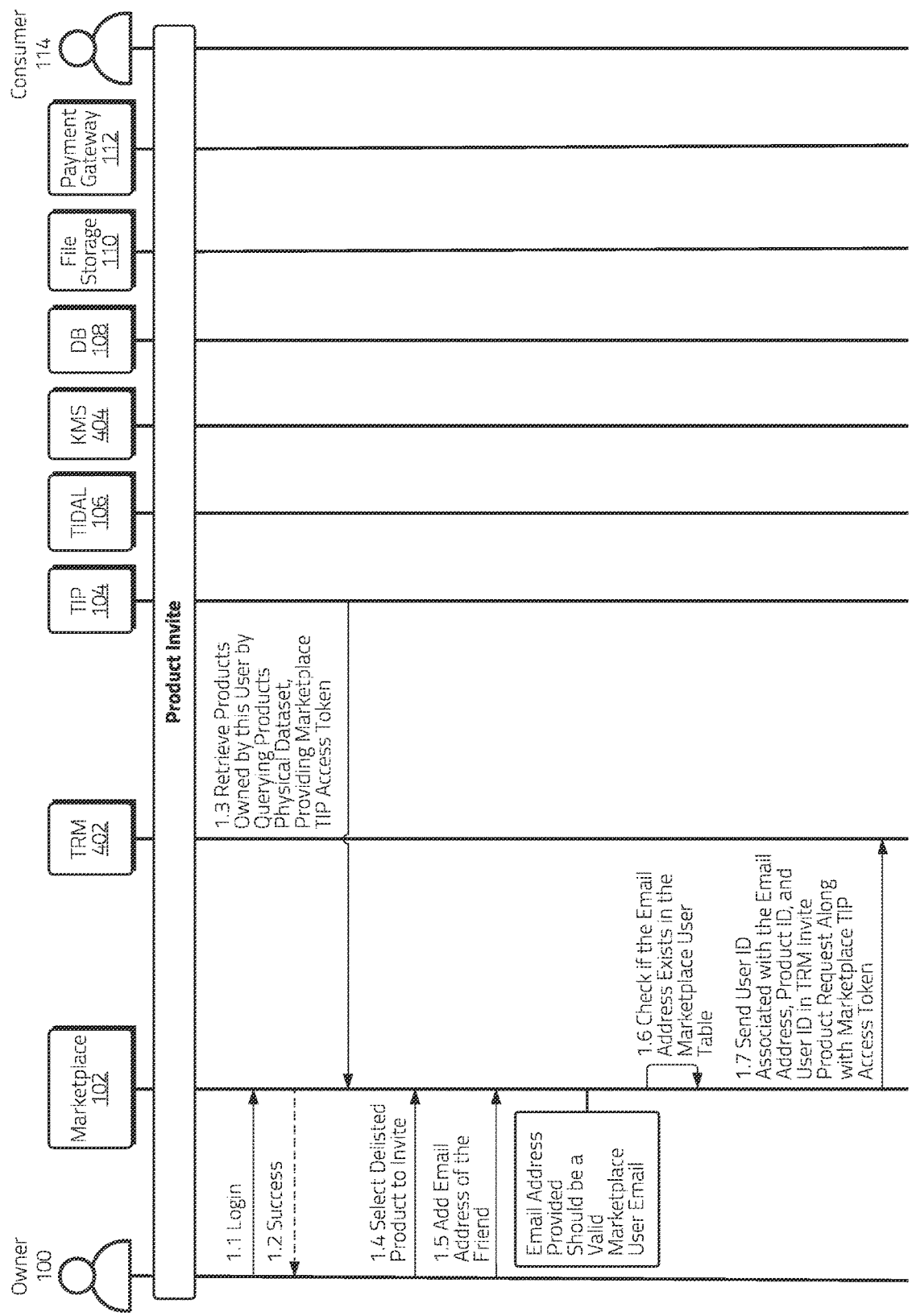
FIG. 13A illustrates a first part of a non-limiting example of a product invite process consistent with certain embodiments disclosed herein.
Figure 13B:
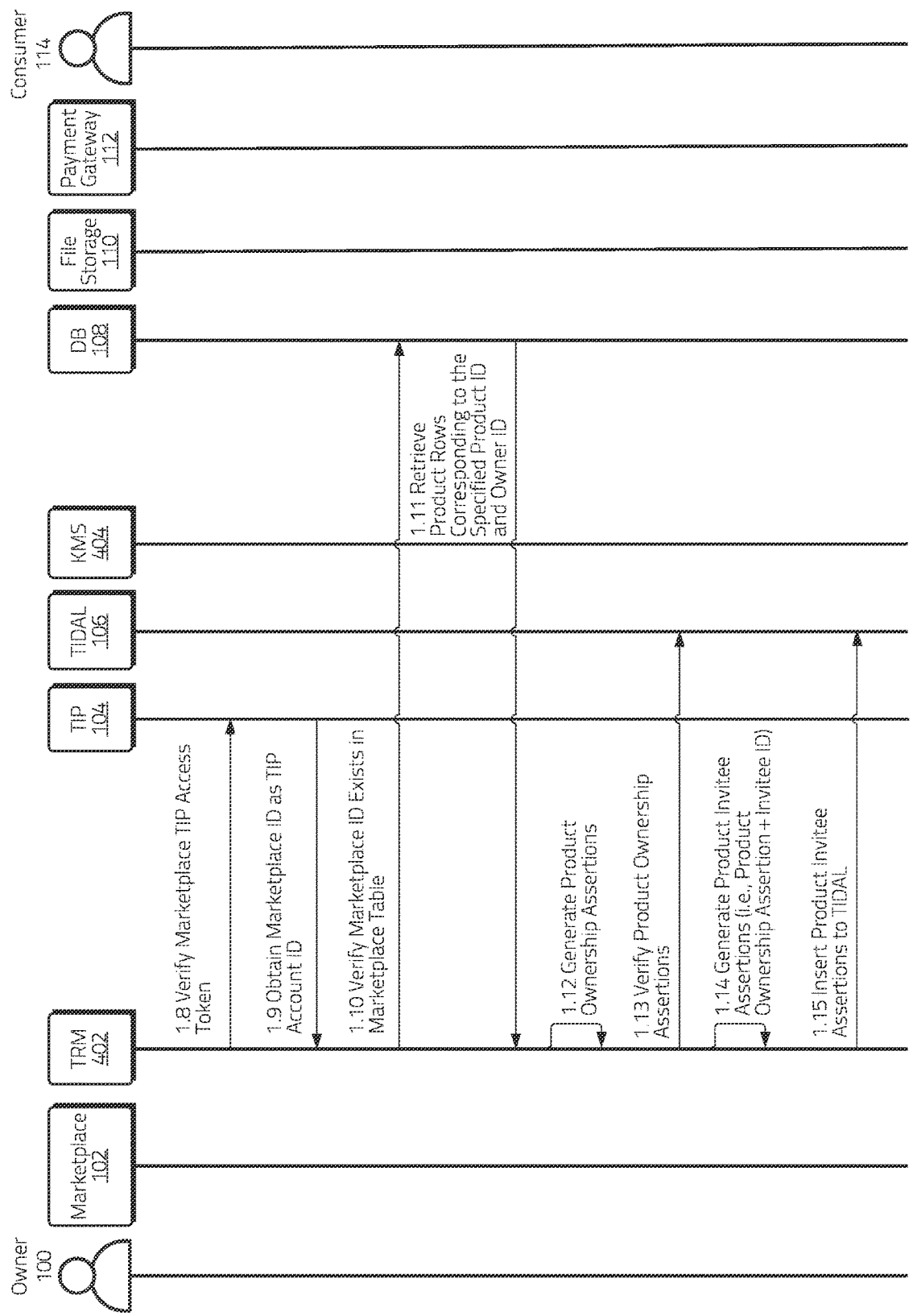
FIG. 13B illustrates a second part of a non-limiting example of a product invite process consistent with certain embodiments disclosed herein.
Figure 13C:
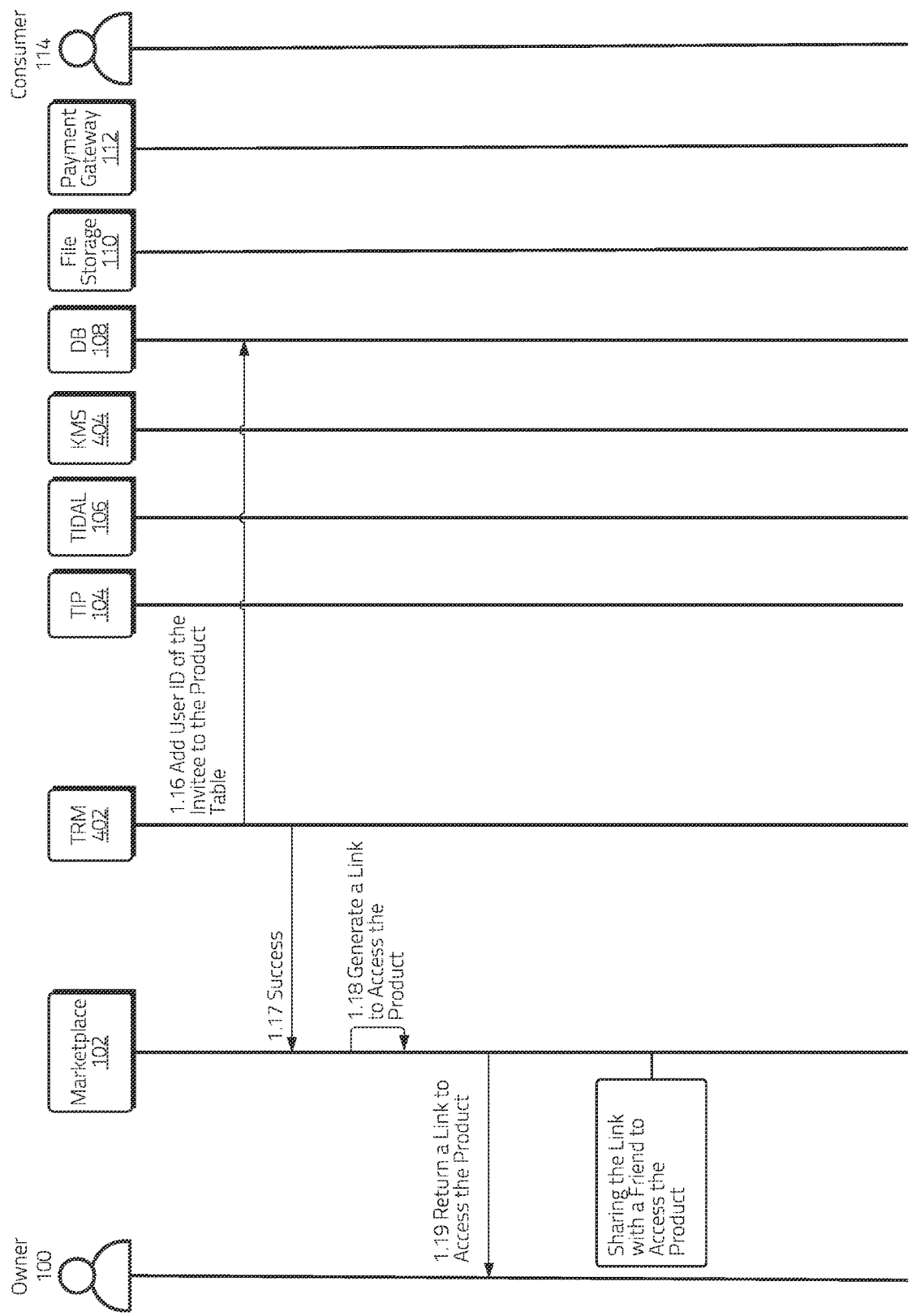
FIG. 13C illustrates a third part of a non-limiting example of a product invite process consistent with certain embodiments disclosed herein.

FIGS. 13A-13C illustrates a non-limiting example of a product invite process consistent with certain embodiments disclosed herein.

Steps 1.1-1.2: Login

In some embodiments, an owner 100 may login to the marketplace service 102. In certain embodiments, a Google account (e.g., Open ID connect) may be used for login, although other methods of login may also be employed. The marketplace service 102 may authenticate the owner 100, issuing the owner 100 an authentication token if successfully authenticated.

Steps 1.3-1.7: Invite Friend to Product

The marketplace service may retrieve a list of products owned by the owner 100 from the products physical dataset at TIP service 104 using its marketplace TIP access token. The owner 100 may select one from the list of products to invite another user to use, who may be generally referred to herein as a "friend." The owner 100 may add the e-mail address of the friend to invite them to access the product. The marketplace service 102 may check whether the e-mail address exists in the marketplace user table and may retrieve the associated user ID. If it doesn't, the marketplace service 102 may reject the request. The marketplace service 102 may send a request to the TRM service 402 with the user ID, product ID, owner ID, along with its TIP access token.

Steps 1.8-1.10: Verify Marketplace

The marketplace TIP access token may be verified via an IAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Steps 1.11-1.17: Process Product Invite request

The product data corresponding to the product ID and/or owner ID may be retrieved from the product table in the DB 108. For each such product serial ID, a product ownership assertion may be generated and verified with TIDAL 106. If one or more product ownership assertions are not verified, the product invite operation may be rejected. A product invite assertion (e.g., product ownership assertion+invitee ID) may be generated and inserted into the TIDAL 106. The invitee ID may be added to the invitees column in the product table in DB 108. A success message may be communicated from the TRM service 402 to the marketplace service 102.

Steps 1.18-1.19: Generate Link

The marketplace service 102 may generate a link to access the asset and send it to the owner 100. The owner 100 can share the link to the friend via e-mail or any other suitable communication method. When someone clicks on the link, it may take them to the marketplace service 102 login screen. After the login that person may play and/or view the asset.

Disinvite Process

Figure 14A:
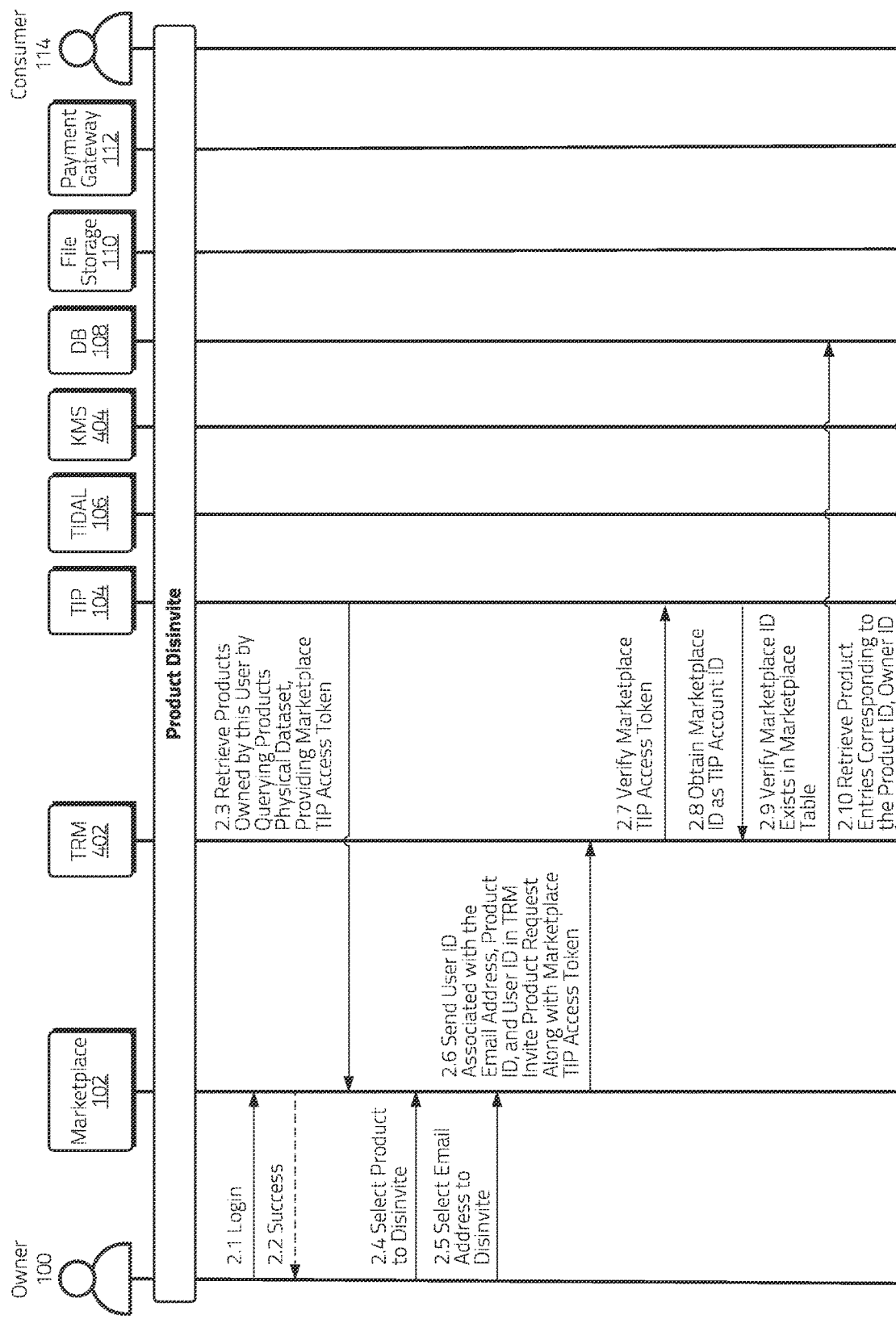
FIG. 14A illustrates a first part of a non-limiting example of a product disinvite process consistent with certain embodiments disclosed herein.
Figure 14B:
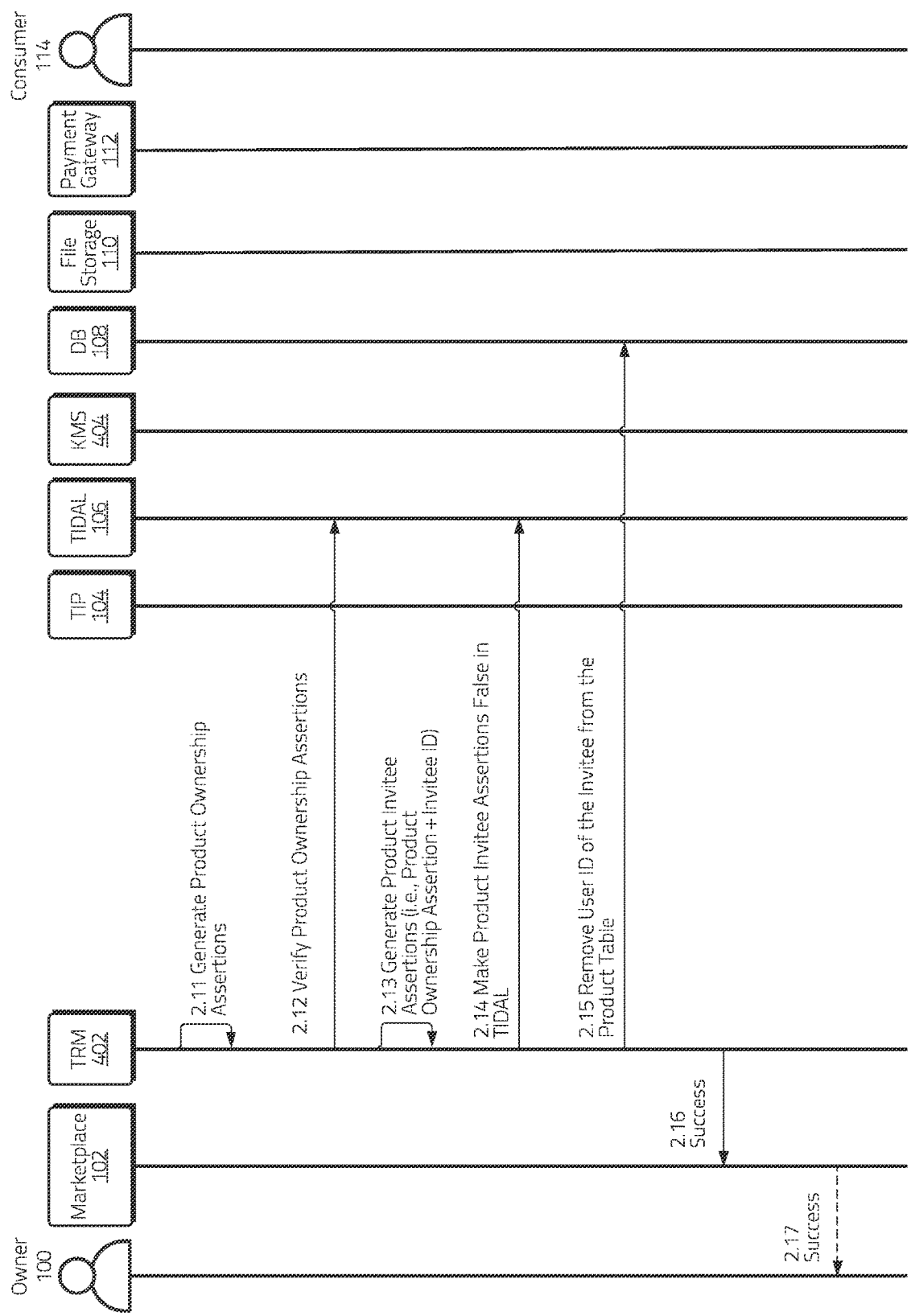
FIG. 14B illustrates a second part of a non-limiting example of a product disinvite process consistent with certain embodiments disclosed herein.
Figure 15A:
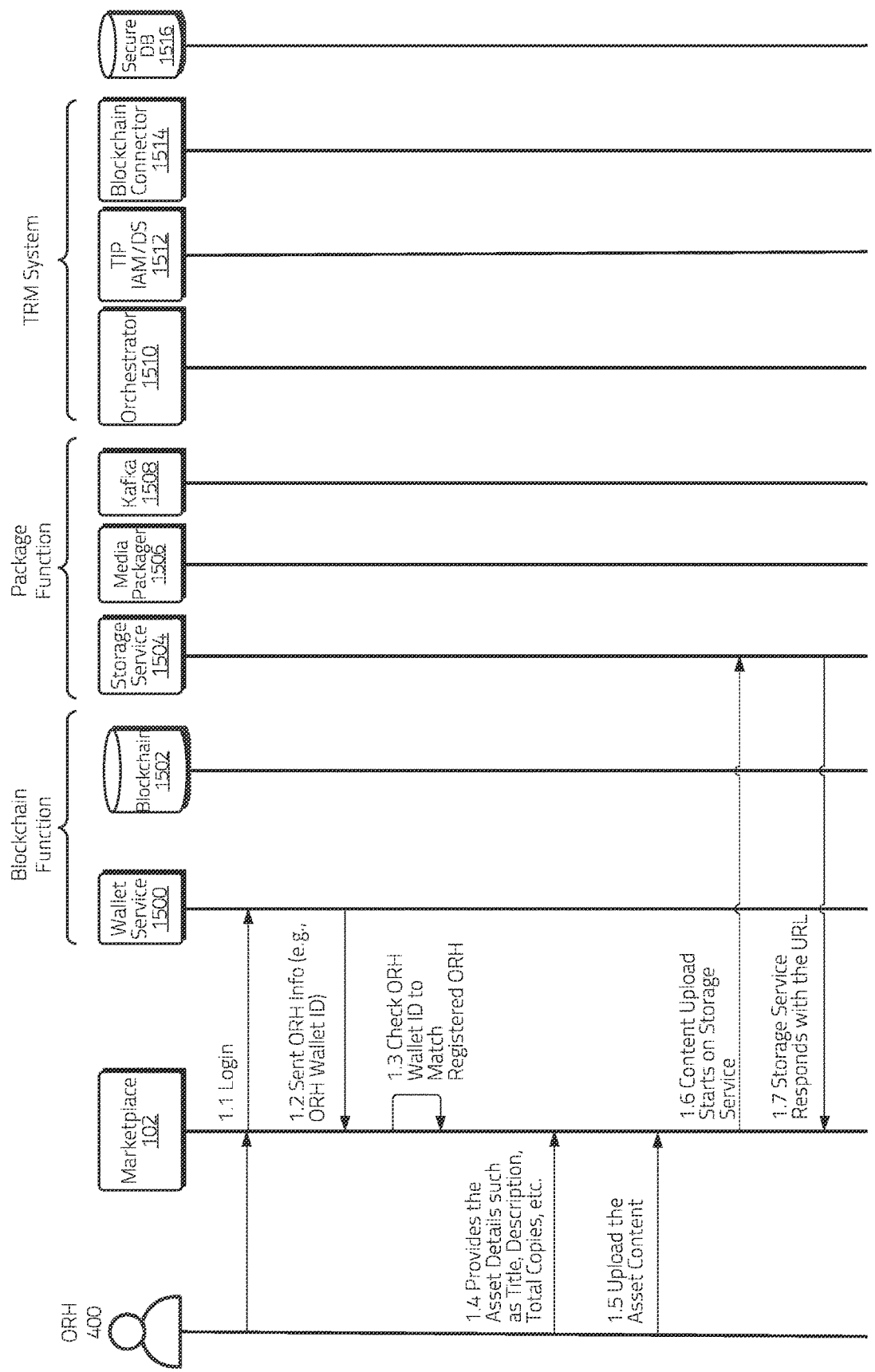
FIG. 15A illustrates a first part of a non-limiting example of an asset creation process using a blockchain ledger consistent with certain embodiments disclosed herein.
Figure 15C:
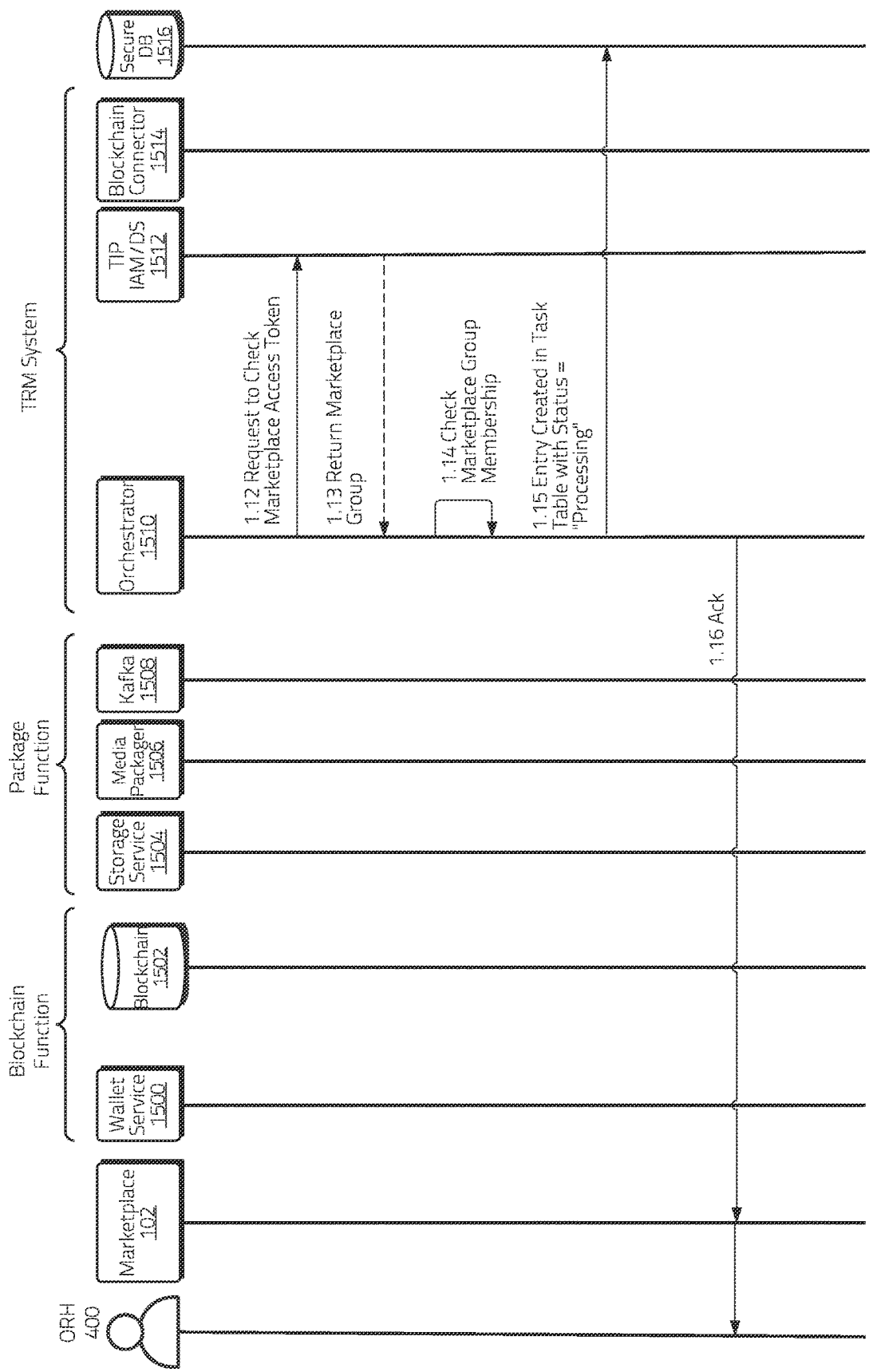
FIG. 15C illustrates a third part of a non-limiting example of an asset creation process using a blockchain ledger consistent with certain embodiments disclosed herein.
Figure 15D:
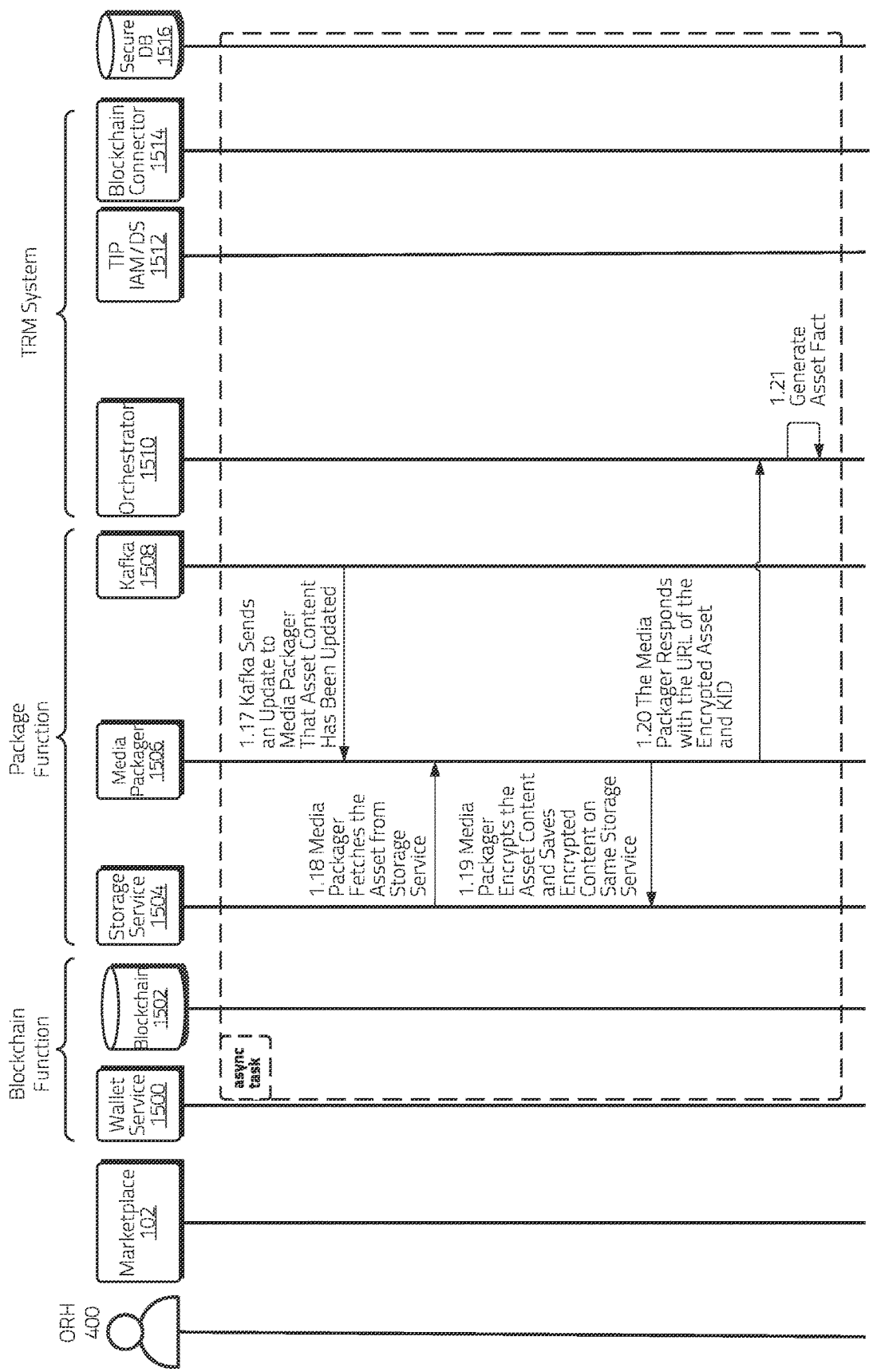
FIG. 15D illustrates a fourth part of a non-limiting example of an asset creation process using a blockchain ledger consistent with certain embodiments disclosed herein.
Figure 15E:
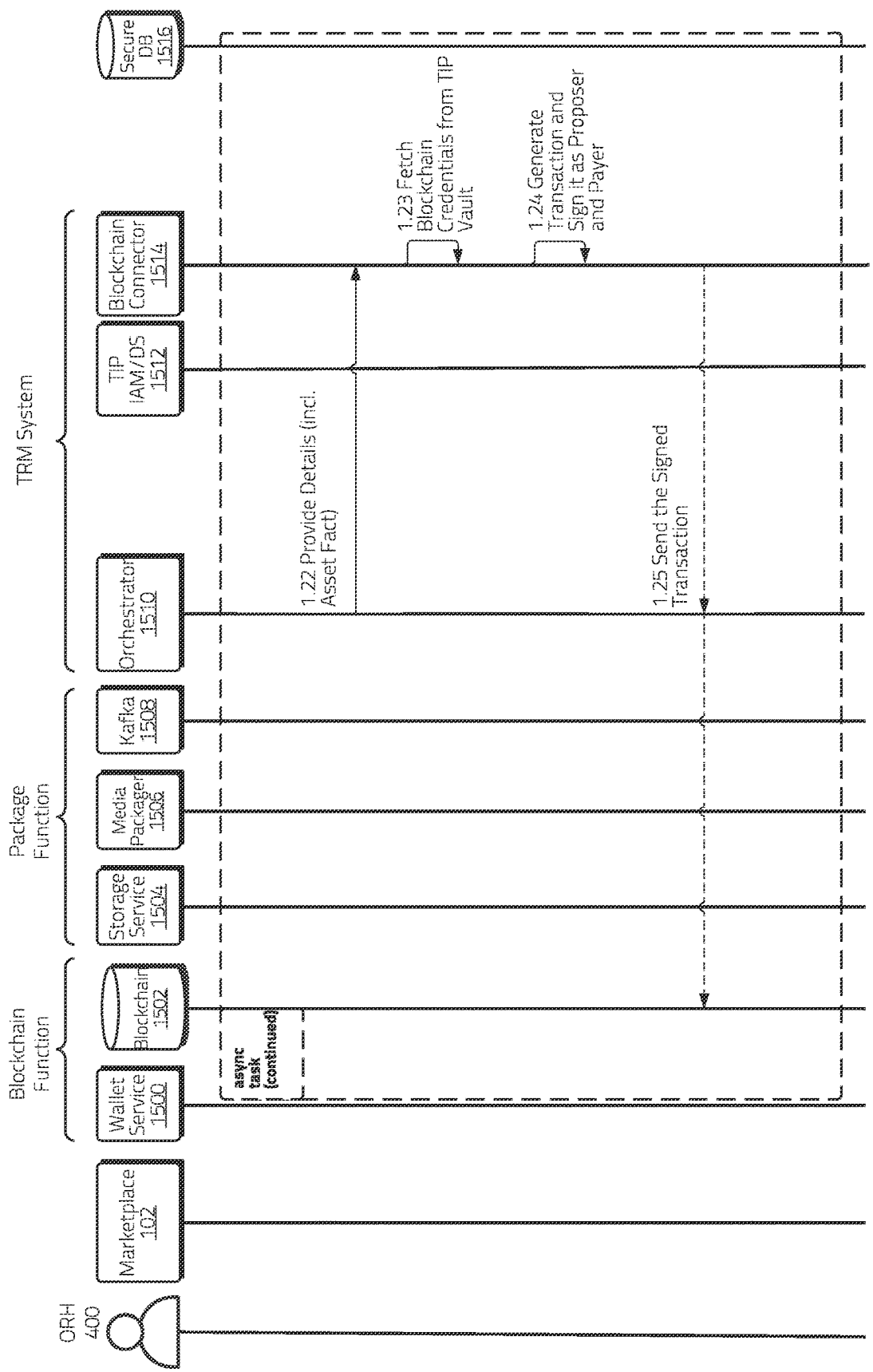
FIG. 15E illustrates a fifth part of a non-limiting example of an asset creation process using a blockchain ledger consistent with certain embodiments disclosed herein.
Figure 15F:
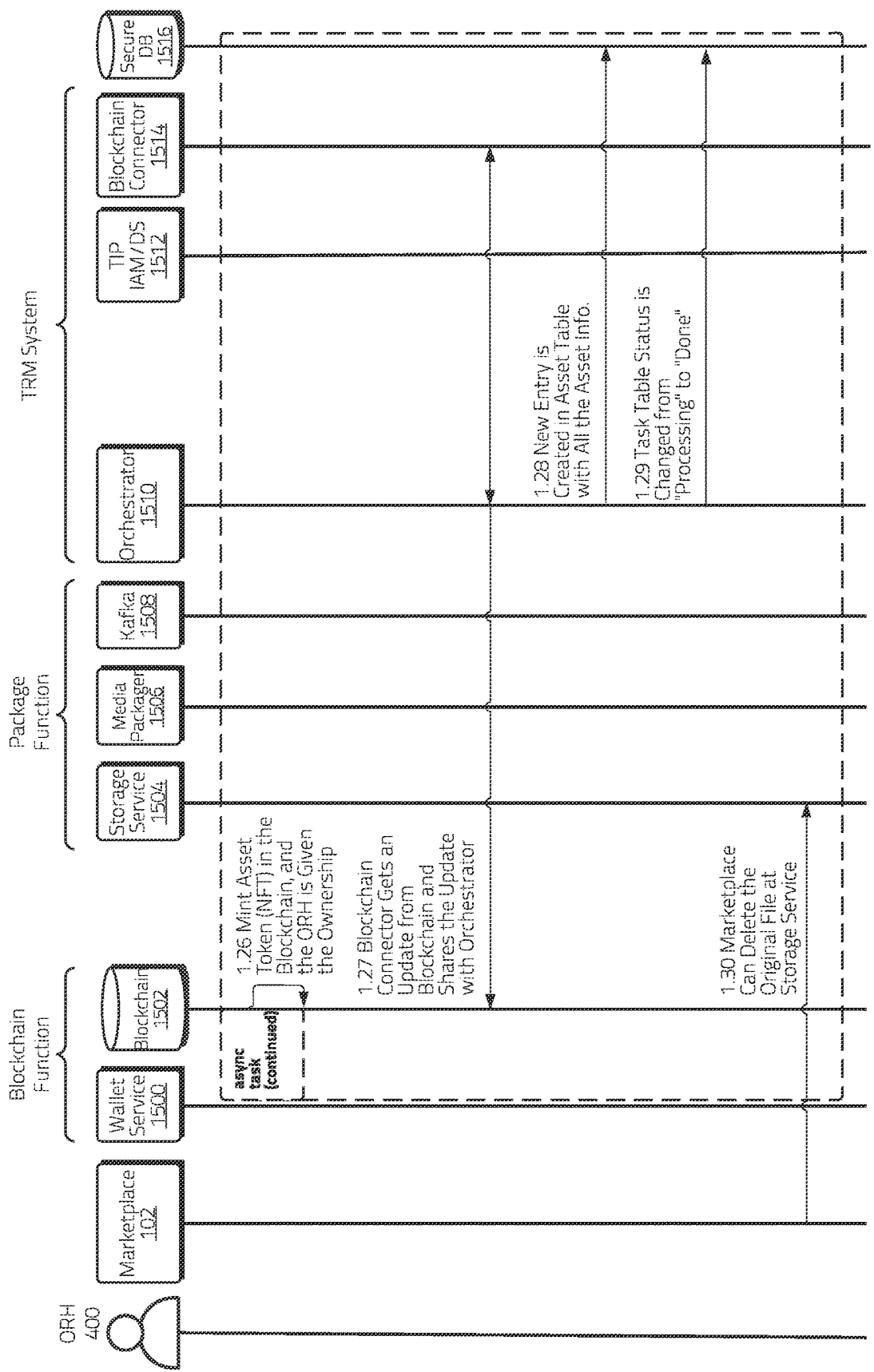
FIG. 15F illustrates a sixth part of a non-limiting example of an asset creation process using a blockchain ledger consistent with certain embodiments disclosed herein.

FIGS. 14A-14B illustrates a non-limiting example of a product disinvite process consistent with certain embodiments disclosed herein.

Steps 2.1-2.2: Login

In some embodiments, the owner 100 may login to the marketplace service 102. In certain embodiments, a Google account (e.g., Open ID connect) may be used for login, although other methods of login may also be employed. The marketplace service 102 may authenticate the owner 100, issuing the consumer an authentication token if successfully authenticated.

Steps 2.3-2.6: Disinvite Friend to Product

The marketplace service 102 may retrieve the list of products owned by the owner 100 from the products physical dataset at TIP service 104 using its marketplace TIP access token. The owner 100 may select one from the list of products and may update it. The owner 100 may remove the e-mail address of the friend to disinvite them from access to the product. The marketplace service 100 may send a request to the TRM service 402 with the updated user ID, product ID, owner ID, along with its TIP access token.

Steps 2.7-2.9: Verify Marketplace

The marketplace TIP access token may be verified via an IAM service of the TIP service 104. The marketplace ID may be obtained from IAM services and/or another user information endpoint. The marketplace service 102 may then be verified as being registered in the DB 108 (e.g., the marketplace ID exists in the marketplace table, as the marketplace table stores the list of verified marketplaces).

Steps 2.10-2.17: Process Product Disinvite Request

The product data corresponding to the product ID, owner ID may be retrieved from the product table in the DB 108. For each such product serial ID, a product ownership assertion may be generated and verified using the TIDAL 106. If one or more product ownership assertions are not verified, the product disinvite operation may be rejected. A product invite assertion (e.g., product ownership assertion+ invitee ID) may be generated, made false, and registered in the TIDAL 106. The invitee ID from the invitee's column in the product table in the DB 108 may be removed.

Token Rights Management Using a Commercial Blockchain Ledger

Although various embodiments of the disclosed systems and methods are described in connection with applications implementing TIDALs and/or TIDAL derivatives, certain embodiments of the disclosed systems and methods may be used in connection with established blockchain ledgers and/or derivatives of such ledgers that may be used in connection with a variety of other applications and/or users, entities, and/or parties. For example, certain non-limiting examples described herein may be used to manage tokens using the FLOW blockchain ledger. Although certain examples are described as being used in connection with a FLOW blockchain ledger, it will be appreciated that various aspects of the disclosed systems and methods may be implemented in connection with a wide variety of blockchain ledgers.

As discussed above, embodiments of the disclosed systems and methods may allow for rights binding and packaging and/or protection operations in connection with certain NFT transactions (e.g., minting NFTs, transferring NFTs, etc.). For example, uploaded assets (e.g., video, audio, etc.) may be encrypted with a unique key (e.g., a KID, which may be an identifier for a unique key used to encrypt and asset). The KID and usage conditions may be bound together and recorded in a blockchain. For example, an asset token may bind the KID with the uploader's ID (e.g., ORH ID), a product token may bind the KID with the owner's ID (e.g., owner ID) and other usage conditions (e.g., expiry date, invitee ID), and a rent token may bind the KID with the renter ID (e.g., renter ID) and other usage conditions (e.g., expiry date). In some implementations, an asset token may be used to bind the KID with the ORH ID and/or owner ID. Ownership of an NFT may be transferred by checking expiry data in a product token (and/or asset token depending on the implementation).

Various embodiments disclosed herein may support an ownership-rent period. An ownership-rent period may be set by an ORH to limit how long a product may be made available for sales, rental, and/or playback in the marketplace. After this period, the product may not be available in the marketplace. In some embodiments, an ownership-rent period may be associated with a product token enabling sales, rental, access invites, and/or playback during the specified period.

Further embodiments disclosed herein may provide for a rights binding service. A rights binding service may use TIDALs and/or other blockchains to bind additional rights to an NFT. These rights can include DRM rights and associated metadata can specify DRM authorities. Further embodiments provide for packaging and protection services. In conventional NFT platforms, the underlying content associated with an NFT is typically not part of the NFT. A packaging and protection service can take the original content and transform it, consistent with the metadata in the NFT, to provide various protections (e.g., encryption, authentication, and/or key management for keys that provide security).

In a FLOW blockchain ledger, objects such as fungible tokens ("FTs"), NFTs, and/or collections may be implemented as resources, which may be stored within a user's account(s). In embodiments where a FLOW ledger is used to implement various aspects of the disclosed token rights management systems and methods, resources may comprise, for example and without limitation, one or more of an:

Asset token—An asset token may represent an NFT for an asset. An asset token may comprise a number of fields including, for example and without limitation, one of or more of: (1) an asset token ID, which may be immutable and may comprise a unique identifier; (2) a serial number, which may be immutable and may comprise a unique serial number for different copies of an asset; (3) an asset type, which may be mutable and may be either "private" or "public"; (4) a URL, which may be immutable and may comprise a URL or URLs related to an asset file (e.g., an encrypted asset file); and (5) a KID, which may be immutable and may comprise a KID for a DRM management system (e.g., ExpressPlay).

Rent token—A Rent token may represent an NFT for renting an asset, enabling its owner to playback the content of the rented asset before an expiry timestamp. A rent token may comprise a number of fields including, for example and without limitation, one or more of: (1) a rent token ID, which may be immutable and may comprise a unique identifier; (2) an asset token ID, which may be immutable and may comprise the asset token ID of the asset being rented; (3) a URL, which may be immutable and may comprise a URL or URLs related to an asset file (e.g., an encrypted asset file); (4) a KID, which may be immutable and may comprise a KID for a DRM management system (e.g., ExpressPlay); and (5) an expiry timestamp, which may be immutable and comprise a timestamp after which the rent token becomes invalid for playing back the content. The expiry timestamp may be initialized to the current data plus the rental period.

Asset collection—An asset collection may comprise a collection of owned asset tokens.

Rent collection—A rent collection may comprise a collection of owned rent tokens.

Sale collection—A sale collection may comprise a resource used to track the asset tokens that are available for sale and rent. The sale collection may track the asset prices, enabling the owner to list, delist, and/or update listings. Purchase and rent transactions may be enabled via the sale collection. A cut of each sale/rent transaction may be sent to an administrator's cryptographic currency vault and/or digital wallet (e.g., using a fiat-backed stablecoin issued as a fungible token on the FLOW network such as FUSD). In some embodiments, a specific cut percentage (e.g., 5%) may be updated by the administrator at any time. Alternatively and/or in combination, logic may accommodate separate cuts for the marketplace and the TRM administrator. It will be appreciated that a variety of other cut percentages may be provided to a variety of parties and/or multiple parties in further embodiments.

The content of URL in asset token and rent token may depend on the implementation. For example and without limitation, it may comprise: (1) a link to the asset in a file system protocol (e.g., Interplanetary File System ("IPFS"); (2) a link to an JSON file which comprises copies of the asset in IPFS; and/or (3) one or more links to a manifest file (e.g., DASH, HLS, etc.).

Asset Creation

FIG. 15A-15F illustrate a non-limiting example of an asset creation process using a blockchain ledger consistent with certain embodiments disclosed herein. In various embodiments, the FLOW blockchain ledger may be used, although it will be appreciated that embodiments of the disclosed systems and methods may be used in connection with a variety of other blockchain ledgers.

In various embodiments, a wallet service 1500 (e.g., a cryptocurrency wallet) and a blockchain ledger 1502 may be used in connection with various embodiments of the disclosed systems and methods and be conceptually included in blockchain functionality of the disclosed ecosystem. Package functionality in the disclosed ecosystem may comprising, in some embodiments, a storage service 1502, a media packager 1506, and a distributed event store and/or stream processing platform such as Kafka 1508. TRM system functionality may be implemented using an orchestrator service 110, a TIP IAM and/or data service ("DS") 1512, and a blockchain connector service 1514. A secure DB 1516 may also be used to store and/or manage various tables and/or other values. Various interactions between these systems and/or services are described in more detail below.

Steps 1.1-1.3: User Login

The ORH 400 may login to the wallet service 1500 via the marketplace service 102. In the FLOW blockchain, the marketplace service 102 may use the FLOW Client Library ("FCL") to authenticate the ORH 400 with the wallet service 1500. FCL may comprise a JavaScript Client Library, enabling applications to integrate with FCL-compatible wallets (e.g., Blocto, Ledger, Dapper Wallet, etc.). The marketplace service 102 may obtain details about the ORH account like a wallet ID after the authentication. The marketplace service may check whether the wallet ID matches the registered ORH wallet IDs at the marketplace service 102.

Steps 1.4-1.5: Upload Asset to Marketplace

The ORH 400 may upload the asset content (e.g., image, video, text, audio, etc.) at the marketplace service 102 and may specify one or more of the following for the asset: (1) number of copies of the asset to mint; (2) a title of the asset; (3) a preview file (e.g., a thumbnail); (4) an asset type, which may comprise a public asset where any consumer can access (e.g., view and/or listen) the asset, or a private asset where a consumer can access (e.g., watch or listen) the asset after purchasing transactions (e.g., buyout, rent, etc.); and (5) a description and/or any other metadata associated with an asset that may be defined by the marketplace service. The ORH 400 may further upload a preview file to serve as a thumbnail for the asset on the marketplace service 102 portal.

Steps 1.6-1.8: Upload Asset Media Content to Package Function

The marketplace service 102 may upload the asset (e.g., image, video, music) content to a storage service 1504 (e.g., AWS S3) and may receive a URL and transaction ID. For certain content (e.g., audio and/or video), the marketplace service 102 may also subscribe to the Kafka service 1508 which may notify a media packager service 1506 when the digital asset content is uploaded and if there is any update to the digital asset content.

Steps 1.9-1.11: Upload Asset to TRM

The marketplace service 102 may obtain an access token from the TIP IAM service 1512 service using its API key and secret. The marketplace service 102 may provide an orchestrator service 1510 an asset upload request that may comprise one or more of: (1) an ORH wallet ID; (2) information set by the ORH 400 described above (e.g., number of copies of the asset, title of the asset, preview file, asset type, etc.); and (3) an access token; (4) the transaction ID.

Steps 1.12-1.16: Verify Marketplace and Create Task Entry

The orchestrator service 1510 may verify the marketplace access token with the TIP IAM service 1512. The marketplace group information may be provided to the orchestrator service 1510 from the TIP IAM service 1512. The orchestrator service 1510 may verify whether the marketplace service 102 is a member of the marketplace group. A task entry may be created by the orchestrator service 1510 in the task table with the status "processing" in the secure DB 1516 while the asset encryption process takes place within the package function services 1505-1508. The orchestrator service 1510 may then send an acknowledgement message to the marketplace service 102 and/or the ORH 400.

Steps 1.17-1.21 (Asynchronous Task): Package Asset Content, Generate KID, and Fact For certain content (e.g., video and/or audio content), the Kafka services 1508 may inform the media packager services 1506 when the asset has finished uploading. The media packager services 1506 may encrypt the content file and save the encrypted asset content on the file storage service 1504 (e.g. S3), then the media packager service 1506 may return KID, URL(*), and the transaction ID to the orchestrator service 1510. In some embodiments, the orchestrator service 1510 may use the transaction ID to correlate KID and URLs and/or ORH ID and/or other information set by the ORH 400.

To protect the content, a secret key may be obtained from TIP services vault. A new secret key may be generated and stored in the TIP services vault if it does not already exist. A content key may be generated and the asset file may be encrypted using the content key. The encrypted asset may be stored by the file storage service 1504. The content key may be encrypted using the secret key. An entry may be created at the asset table including the asset information at the DB 1516. The entry may be updated at the task table with the status set to "done." The asset ID may also be updated in the task table at the DB 1516.

The orchestrator service 1510 may generate an asset fact. The asset fact may comprise one or more of an owner ID (e.g., an ORH Wallet ID), an asset type, a KID, a URL, and/or a serial number. The content of the URL may depend on the implementation and may comprise, for example and without limitation, one or more of a link of the asset in IPFS, a link to JSON which may comprise copies of the asset in IPFS, one or more links to a manifest file (e.g., DASH, HLS), and/or the like.

Step 1.22-1.25 (Asynchronous Task): Initiate Asset Token Creation

The orchestrator service 1510 may provide the asset fact to a blockchain connector service 1514 to initiate asset token creation by the blockchain 1512, which may comprise the FLOW blockchain. The blockchain connector service 1514 may retrieve the blockchain credentials (e.g., a private key) from the TIP service vault. A transaction to request minting the asset token may be generated by the blockchain connector service. The transaction may be signed with the private key as proposer and payer. The blockchain connector service may send the signed transaction to the blockchain 1514 (e.g., via the orchestrator service 1510). For example, in some embodiments, the blockchain connector service 1510 may call a mintNFT function in a smart contract at the FLOW blockchain by providing the signed transaction.

Step 1.26 (Asynchronous Task): Mint Asset Token

Provided with the signed transaction, the smart contract may transfer the newly minted asset token into ORH's blockchain account storage. Remaining objects may be saved in the asset fact as metadata. The minted asset token may be configured to make the asset token ID, KID, URL, and/or serial number to be immutable (e.g., read only) so that certain values may be securely bound to the asset token with its owner identified with the owner wallet ID and/or ORH wallet ID. These bound values may comprise, for example and without limitation, one or more of an asset token ID, which may be immutable, and metadata, which may comprise one or more of an asset type, a KID, which may be immutable, a URL, which may be immutable, and/or a serial number, which may be immutable.

Step 1.27-1.29 (Asynchronous Task): Create Asset Entry

The blockchain connector service 1514 may receive the update asset token minting result by polling the blockchain 1512 and make sure the update with the orchestrator service 1510. Once the blockchain connector service 1514 receives the result, it may create a new entry in the asset table in the DB 1516 with all the newly created asset information. The task entry in the task table may be changed in the DB 1516 to the status "done." After successful update, the marketplace service 102 can fetch the asset details from the DB 1516. In some implementations, after minting the asset token, this asset may not be listed on the marketplace service 102 until the ORH 400 updates the asset to list the asset for the marketplace service 102.

Step 1.30: Delete the Original Asset Content File

The marketplace service 102 may delete the originally uploaded asset content file at the file storage (e.g., AWS S3 storage).

Update Asset

Figure 16A:
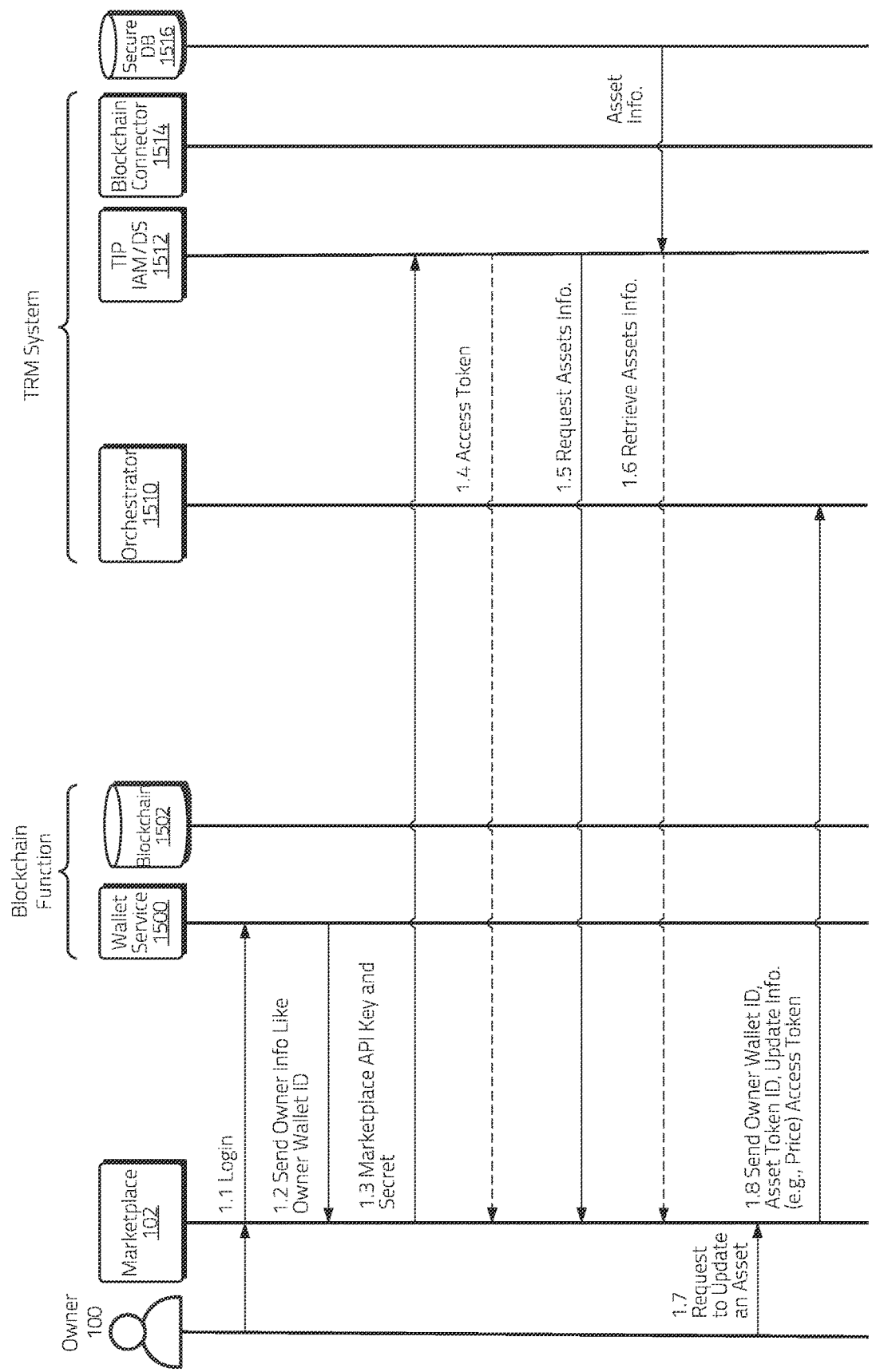
FIG. 16A illustrates a first part of a non-limiting example of an asset update process using a blockchain ledger consistent with certain embodiments disclosed herein.
Figure 16B:
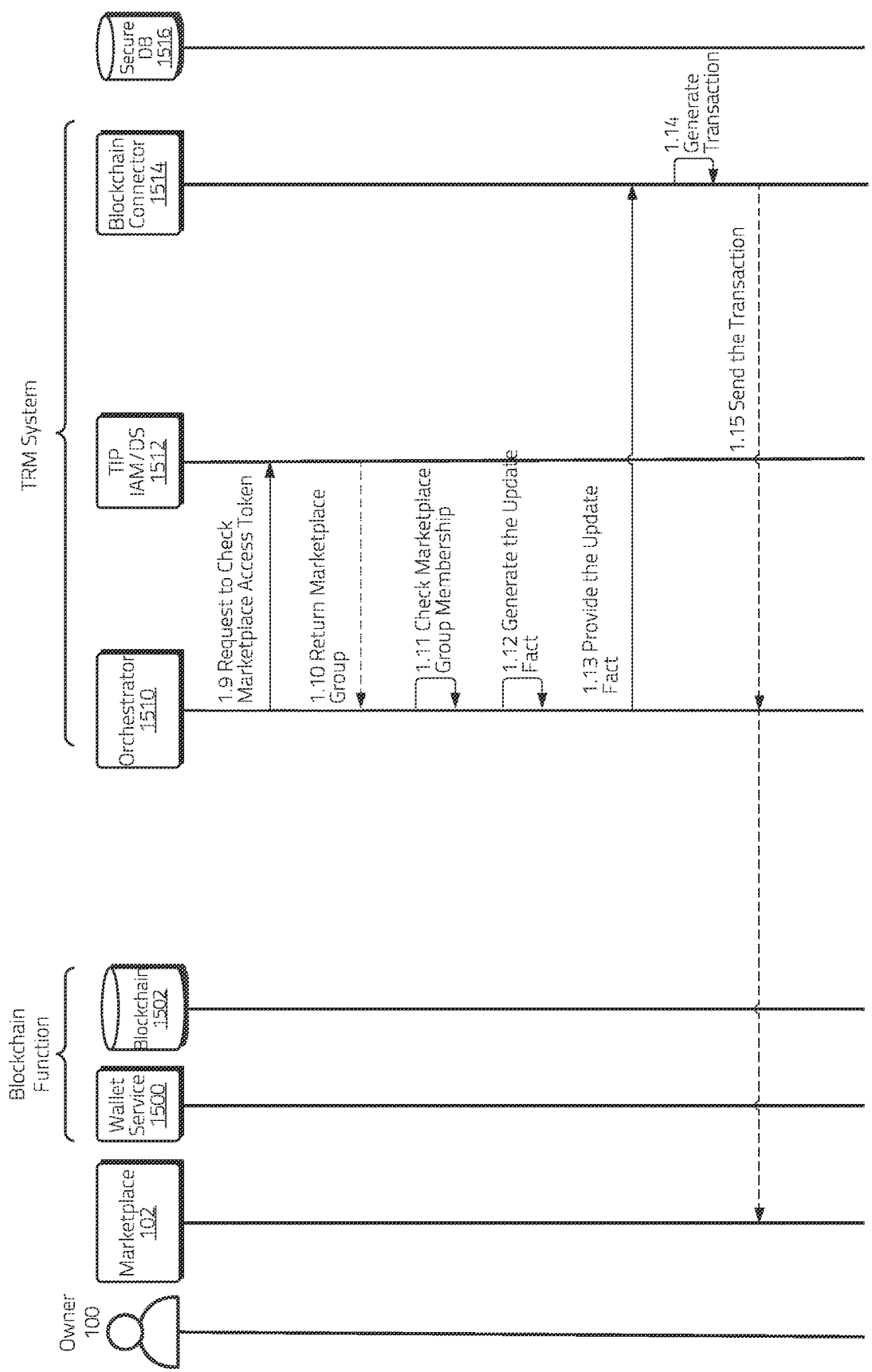
FIG. 16B illustrates a second part of a non-limiting example of an asset update process using a blockchain ledger consistent with certain embodiments disclosed herein.
Figure 16C:
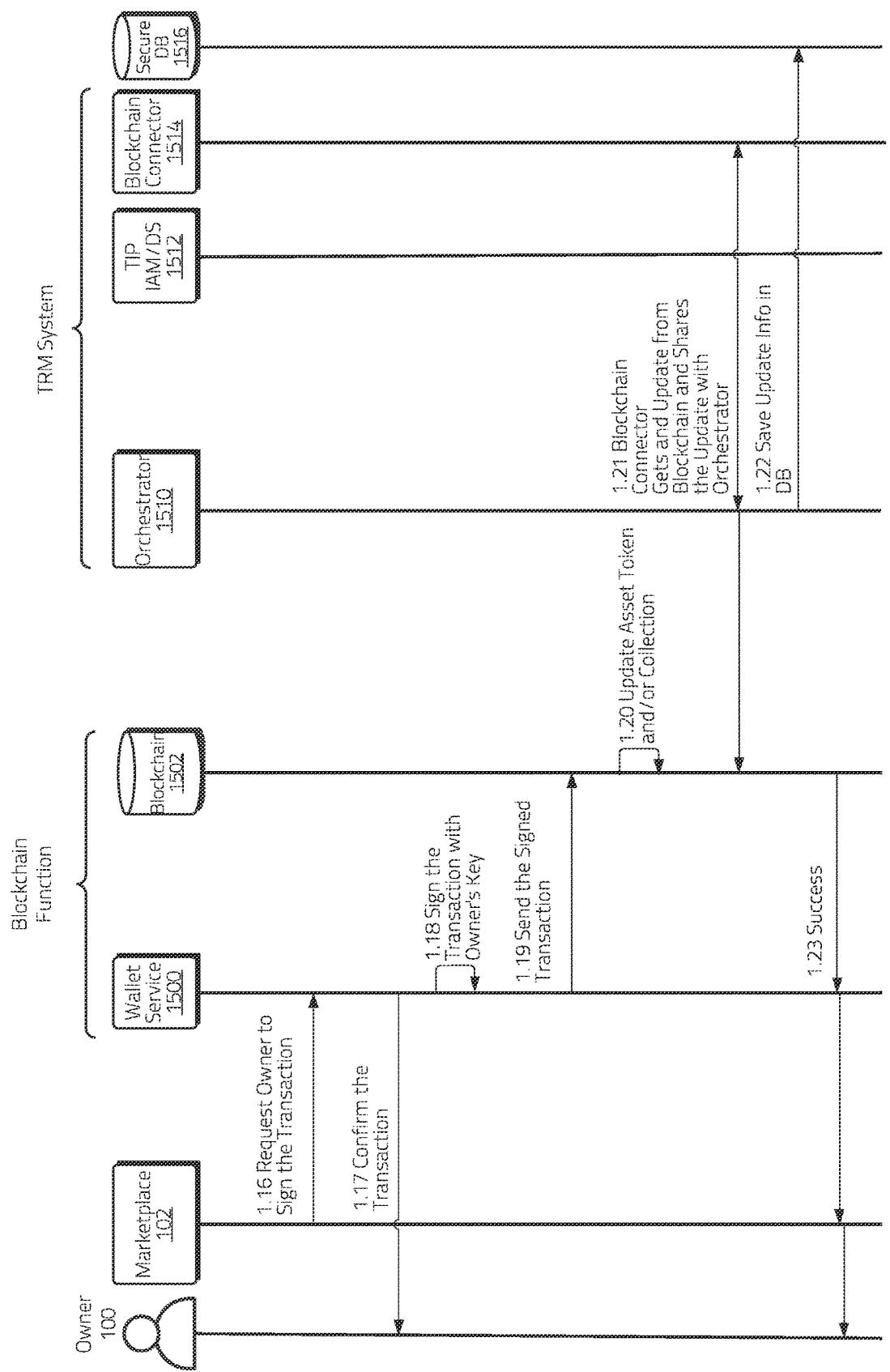
FIG. 16C illustrates a third part of a non-limiting example of an asset update process using a blockchain ledger consistent with certain embodiments disclosed herein.

FIGS. 16A-16C illustrate a non-limiting example of an asset update process using a blockchain ledger consistent with certain embodiments disclosed herein.

Steps 1.1-1.2: User Login

An owner 100 may log into a wallet service 1500 via a marketplace service 102. In the FLOW blockchain, the marketplace service 102 may use FCL to authenticate an owner 100 with the wallet service 1500. The marketplace service 102 may obtain details about the owner account corresponding to the owner 100 like a wallet ID after the authentication Steps 1.3-1.6: Retrieve Asset Information The marketplace service 102 may obtain an access token from the TIP IAM service 1512 using its API key and secret. The marketplace service 102 may fetch the list of assets created by the owner 100 from DB 1516 via the TIP DS service 1512 using its access token.

Steps 1.7-1.8: Request Asset Update

The owner 100 may select an asset from the list and can choose to update its asset information by sending an associated request to the marketplace service 102. For example and without limitation, an owner 100 may update one or more of the following:

Title

Asset type—An asset type may be public, where any consumers can access (e.g., watch and/or listen) the asset, or private, where consumers can access (e.g., watch and/or listen) the asset after completing purchase transactions (e.g., buyout, rent, etc.).

Business condition—Business conditions may comprise, for example and without limitation, one or more of sellout and/or rent. If sellout and/or rent is selected as a business condition, the asset may be listed to the marketplace service 102 after updating the asset. If neither of sellout and/or rent are selected as a business condition, the asset may be delisted from the marketplace service after updating the asset.

Rental period—This may be set when the business condition includes "Rent".

Price—Price may include, for example and without limitation, a price for sellout, a price for rent, etc.

Description, and/or any other metadata defined by the marketplace service 102.

The marketplace service 102 may send the updated information along with the owner wallet ID, asset token, ID, and/or access token to the orchestrator service 1510

Steps 1.9-1.11: Verify Marketplace

The orchestrator service 1510 may verify the marketplace access token using the TIP IAM service 1512. Marketplace group information may be obtained by the orchestrator service 1510 from the TIP IAM service 1512 The orchestrator service 1510 may verify whether the marketplace is a member of the marketplace group.

Step 1.12: Generate Update Fact

The orchestrator service 1510 may generate the update fact. The update fact may be an object that comprises one or more of an owner wallet ID, an access token ID, and/or update data.

Steps 1.13-1.15: Initiate Asset Update

The orchestrator service 1510 may provide the update fact to the blockchain connector service 1514 to initiate the asset update at the blockchain 1502. The blockchain connector service 1514 may generate a transaction to request updating the asset token and/or sale collection. The blockchain connector service 1514 may further send the transaction to the marketplace service 102 via the orchestrator service 1510.

Steps 1.16-1.20: Update Asset at Blockchain

The marketplace may request the owner 100 to sign the transaction via the wallet service 1500. Once the owner 100 confirms the transaction, the wallet service 1500 may sign the transaction with the owner's signing key. The wallet service may send the signed transaction to the blockchain 1502. Given the signed transaction, the smart contract may update the asset token and/or sale collection depending on the update request.

Steps 1.21-1.23: Update Asset Entry

The blockchain connector service 1514 may retrieve the asset update result by polling the blockchain 1502. Once the blockchain connector service 1514 gets the result, it may call the orchestrator service API and may provide transaction details to the orchestrator service 1510. The orchestrator service 1510 may save the updated result in DB 1516. The blockchain 1502 may send a success message to the wallet service 1500 which then may send it to the marketplace service 102 and/or owner 100.

Sellout Asset

Figure 17A:
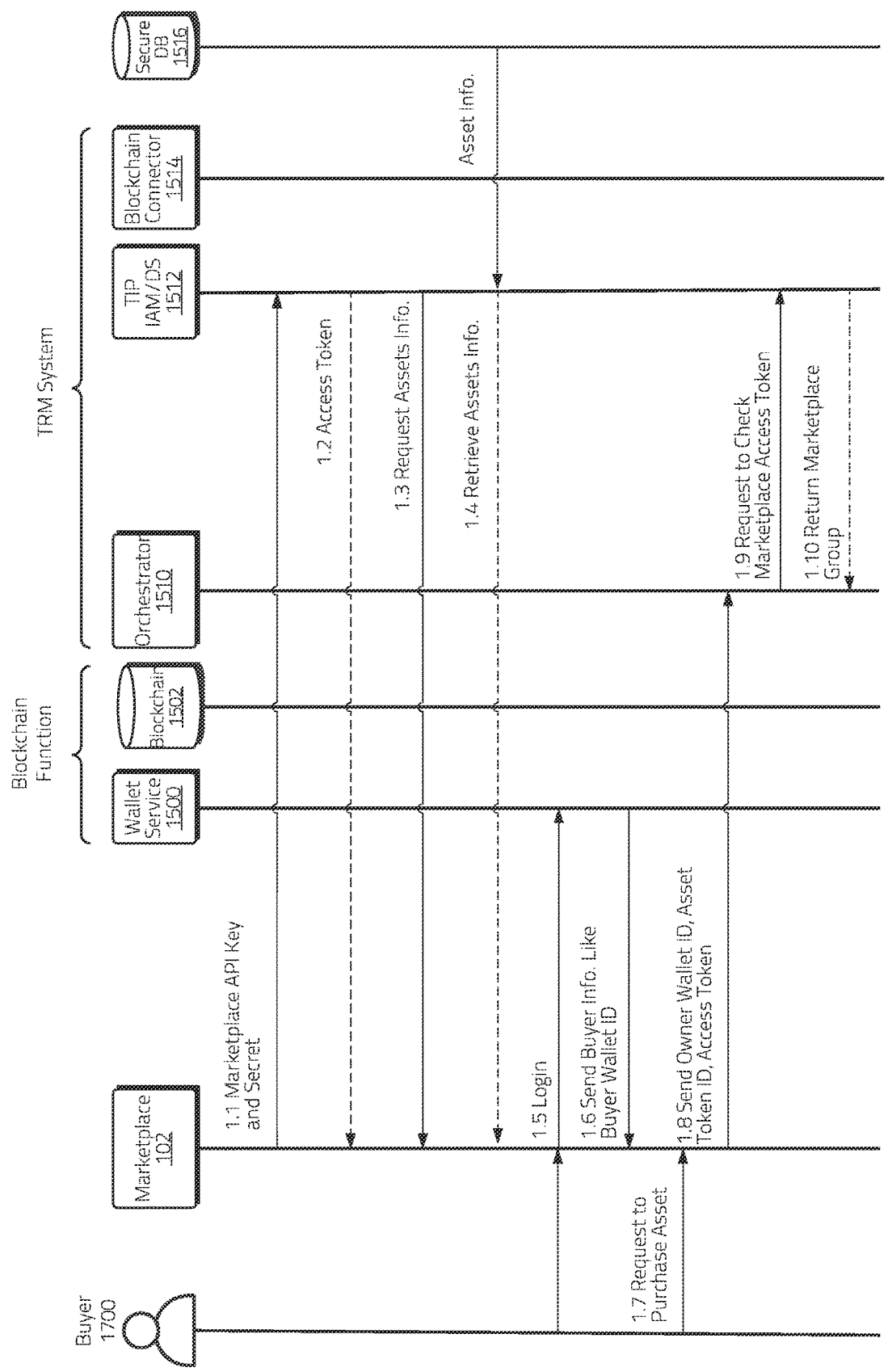
FIG. 17A illustrates a first part of a non-limiting example of an asset purchase process using a blockchain ledger consistent with certain embodiments disclosed herein.
Figure 17B:
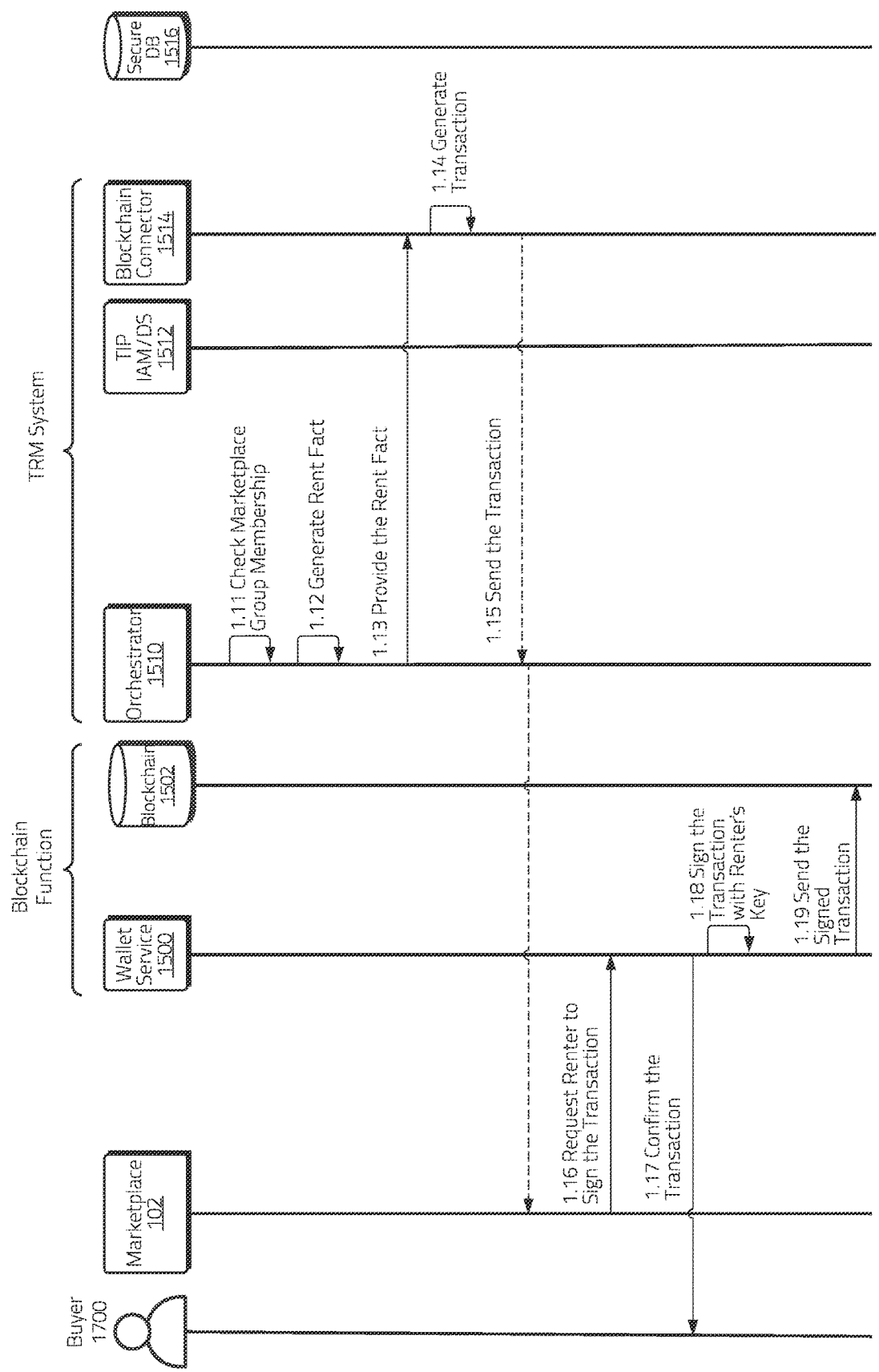
FIG. 17B illustrates a second part of a non-limiting example of an asset purchase process using a blockchain ledger consistent with certain embodiments disclosed herein.
Figure 17C:
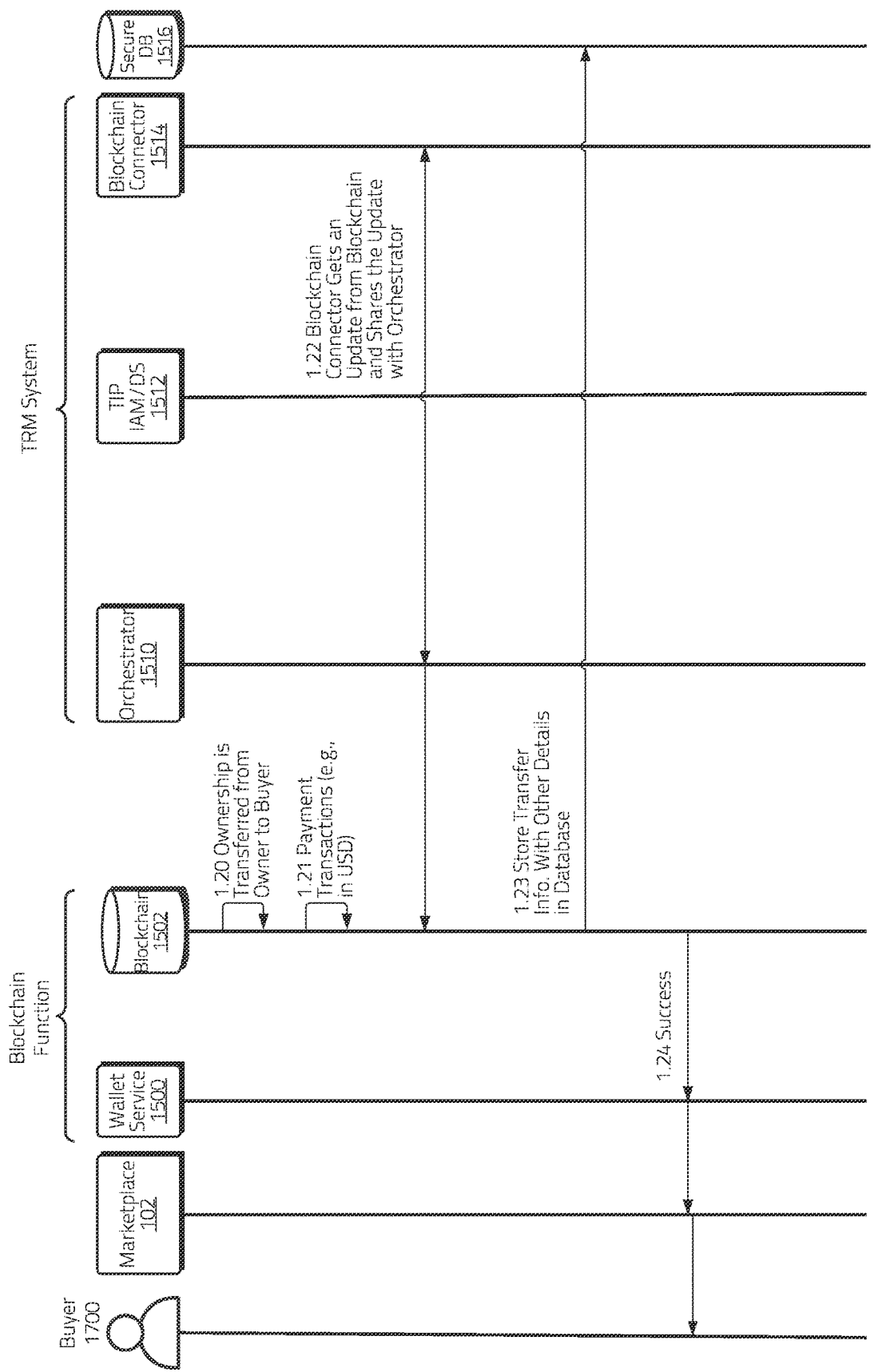
FIG. 17C illustrates a third part of a non-limiting example of an asset purchase process using a blockchain ledger consistent with certain embodiments disclosed herein.

FIGS. 17A-17B illustrate a non-limiting example of an asset purchase process using a blockchain ledger consistent with certain embodiments disclosed herein.

Steps 1.1-1.4: Retrieve Asset Information

The marketplace service 102 may obtain an access token from the TIP IAM service 1512 using its API key and secret. A list of listed assets may be fetched by the marketplace service 102 from the dataset by TIP DS service 1512 using its access token.

Steps 1.5-1.6: User Login

The buyer 1700 may login to the wallet service 1500 via the marketplace service 102. In the FLOW blockchain, the marketplace service 102 may use FCL to authenticate the buyer 1700 with the wallet service 1700. The marketplace service may obtain details about the account associated with the buyer 1700 like a wallet ID after the authentication.

Steps 1.7-1.8: Request Asset Purchase

The buyer 1700 may select an asset from the list and can choose to purchase the asset. The marketplace service 102 may send the owner wallet ID for the asset, asset token ID, and/or access token to the orchestrator service 1510.

Steps 1.9-1.11: Verify Marketplace

The orchestrator service 1510 may verify the marketplace access Token at the TIP IAM service 1512. Marketplace group information may be obtained by the orchestrator service 1510 from the TIP IAM service 1512. The orchestrator service 1510 may verify whether the marketplace service 102 is a member of the marketplace group.

Step 1.12: Generate Purchase Fact

The orchestrator service 1510 may generate a purchase fact. The purchase fact may comprise one or more of the owner Wallet ID and/or the asset token ID.

Steps 1.13-1.15: Initiate Asset Transfer

The Orchestrator may provide a purchase fact to the blockchain connector service 1514 to initiate an asset transfer at the blockchain 1502. The blockchain connector service 1514 may generate a transaction to request transfer of an asset token. The transaction may be sent by the blockchain connector service to the marketplace service 102 via the orchestrator service 1510.

Steps 1.16-1.21: Purchase Asset at Blockchain

The marketplace service 102 may request the buyer 1700 to sign the transaction via the wallet service 1500. Once the buyer confirms the transaction, the wallet service 1500 may sign the transaction with the buyer's signing key. The wallet service 1500 may send the signed transaction to the blockchain 1502. Given the signed transaction, the smart contract may transfer ownership of the asset token to the buyer 1700, update the owner's sale collection by removing asset token ID, and initiate a payout (e.g., a payout in FUSD or some other cryptographic currency). In some embodiments, the administrator may receive a percentage of the transaction defined by a cut percentage (e.g., 5% of the sale) and the owner may receive the remaining payment, although it will be appreciated that a variety of other cut percentages may be provided to a variety of parties in further embodiments.

Step 1.22-1.24: Update Asset Entry

The blockchain connector service 1514 may determine the asset transfer result by polling the blockchain 1502. Once the blockchain connector obtains the result, it may call the API of the orchestrator service 1510 and provides transaction details to the orchestrator service 1510. The orchestrator service 1510 may save the updated result in the DB 1516. The blockchain 1502 may send a success message to the wallet service 1500 which then may send it to the marketplace service 102 and/or the buyer 1700.

Rent Asset

Figure 18A:
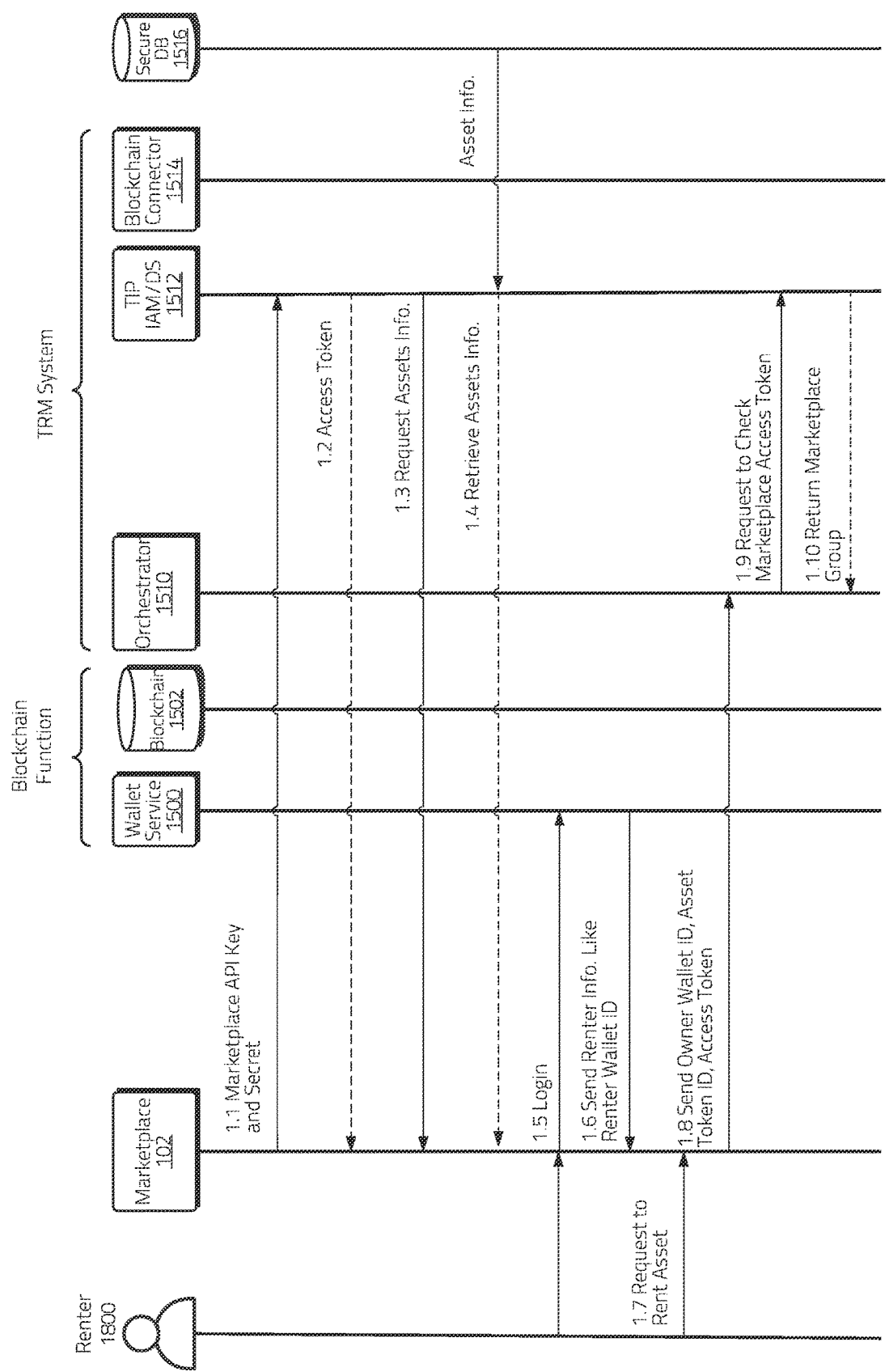
FIG. 18A illustrates a first part of a non-limiting example of an asset rental process using a blockchain ledger consistent with certain embodiments disclosed herein.
Figure 18B:
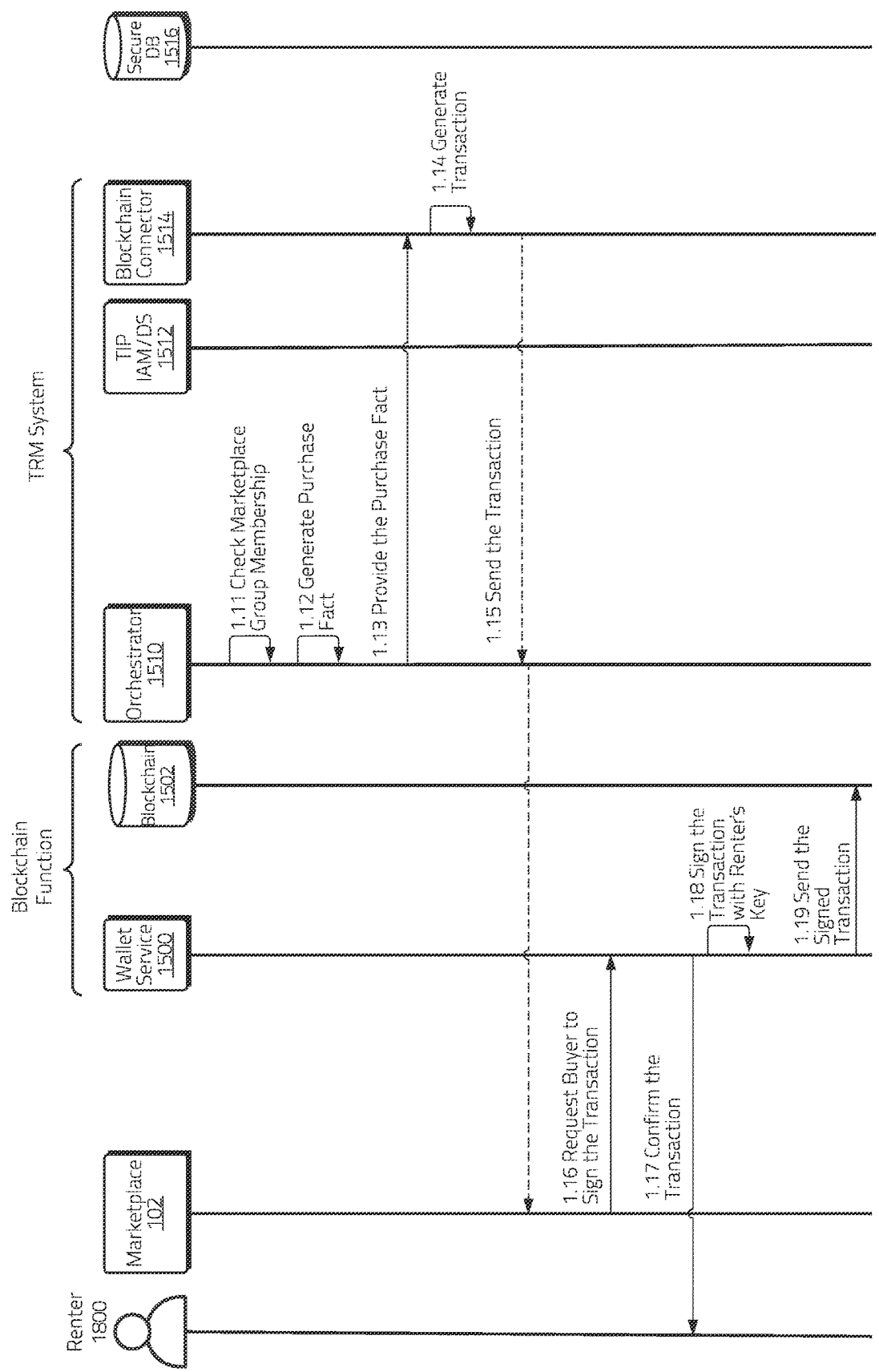
FIG. 18B illustrates a second part of a non-limiting example of an asset rental process using a blockchain ledger consistent with certain embodiments disclosed herein.
Figure 18C:
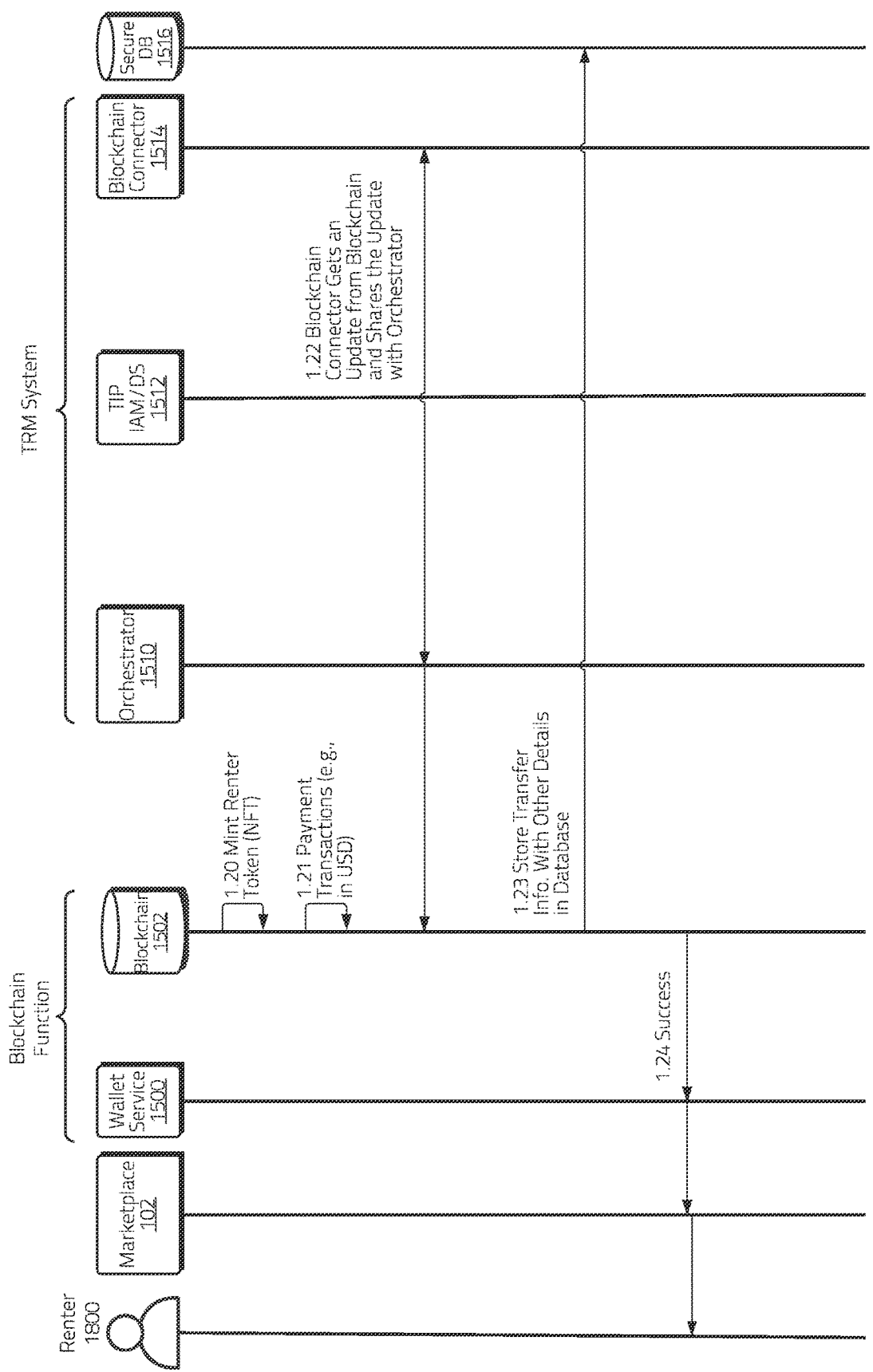
FIG. 18C illustrates a third part of a non-limiting example of an asset rental process using a blockchain ledger consistent with certain embodiments disclosed herein.

FIGS. 18A-18C illustrate a non-limiting example of an asset rental process using a blockchain ledger consistent with certain embodiments disclosed herein.

Steps 1.1-1-4: Retrieve Asset Information

The marketplace service 102 may obtain an access token from the TIP IAM service 1512 using its API key and secret. The marketplace service 102 may fetch the listed assets from the dataset at TIP DS 1512 using its access token.

Steps 1.1-1.2: User Login

A renter 1800 may log into a wallet service 1500 via a marketplace service 102. In the FLOW blockchain, the marketplace service 102 may use FCL to authenticate the renter 1800 with the wallet service 1500. The marketplace service 102 may obtain details about an account associated with the renter 1800 such as a wallet ID after the authentication.

Steps 1.7-1.8: Request Asset Rent

The renter 1800 may select an asset from a list and can choose to rent the asset, issuing a request to the marketplace service 102. The marketplace service 102 may send the owner wallet ID for the asset, asset token ID, and access token to the orchestrator service 1510.

Steps 1.9-1.11: Verify Marketplace

The orchestrator service 1510 may verify the marketplace access token using the TIP IAM service 1512. Marketplace group information may be obtained by the orchestrator service 1510 from the TIP IAM service 1512. The orchestrator service 1510 may verify whether the marketplace service 102 is a member of the marketplace group.

Step 1.12: Generate Rent Fact

The orchestrator service 102 may generate a rent fact. The rent fact may comprise one or more of the owner wallet ID and/or the asset token ID.

Steps 1.13-1.15: Initiate Asset Rent

The orchestrator service 1510 may provide the generated rent fact to the blockchain connector service to initiate minting a rent token at the blockchain 1502. The blockchain connector service 1510 may generate a transaction and send the transaction to the marketplace service 102 via an orchestrator service 1510.

Steps 1.16-1.21: Rent Asset at Blockchain

The marketplace service 102 may request the renter 1800 to sign the transaction via the wallet service 1500. Once the renter confirms the transaction, the wallet service 1500 may sign the transaction with the renter's signing key. The wallet service may send the signed transaction to the blockchain 1502.

Provided with the signed transaction, the smart contract may mint a rent token and transfer it to the renter's blockchain account storage. The smart contract may further initiate a payout in (e.g., via a cryptocurrency like FUSD). In some embodiments, the administrator may receive a percentage of the transaction defined by a cut percentage (e.g., 5% of the sale) and the owner may receive the remaining payment, although it will be appreciated that a variety of other cut percentages may be provided to a variety of parties in further embodiments.

The minted rent token may be configured to make the rent token ID, asset token ID, KID, URL, and/or expiry date be immutable (e.g., read only) so that certain values may be securely bound to the rent token owned by the renter.

These bound values may comprise, for example and without limitation, one or more of an rent token ID, which may be immutable, and metadata, which may comprise one or more of an asset token ID, which may be immutable, a KID, which may be immutable and/or be the same KID included in the asset token identified with the asset token ID, a URL, which may be immutable and/or be the same URL included in the asset token identified with the asset token ID, and/or a expiry date, which may be immutable and may be the date after which the rent token becomes invalid for playing back the asset content. In some embodiments, the expiry date may be initialized to the current date plus the rental period specified in the asset token.

Step 1.22-1.24: Create Transaction Entry

The blockchain connector service 1514 may get the rent token minting result by polling the blockchain 1502 and share it with the orchestrator 1510. The orchestrator service 1510 may save the updated result in the DB 1516. The blockchain 1502 may send a success message to the wallet service 1500 which then may send it to the marketplace service 102 and/or the renter 1800.

Playback Asset

Figure 19A:
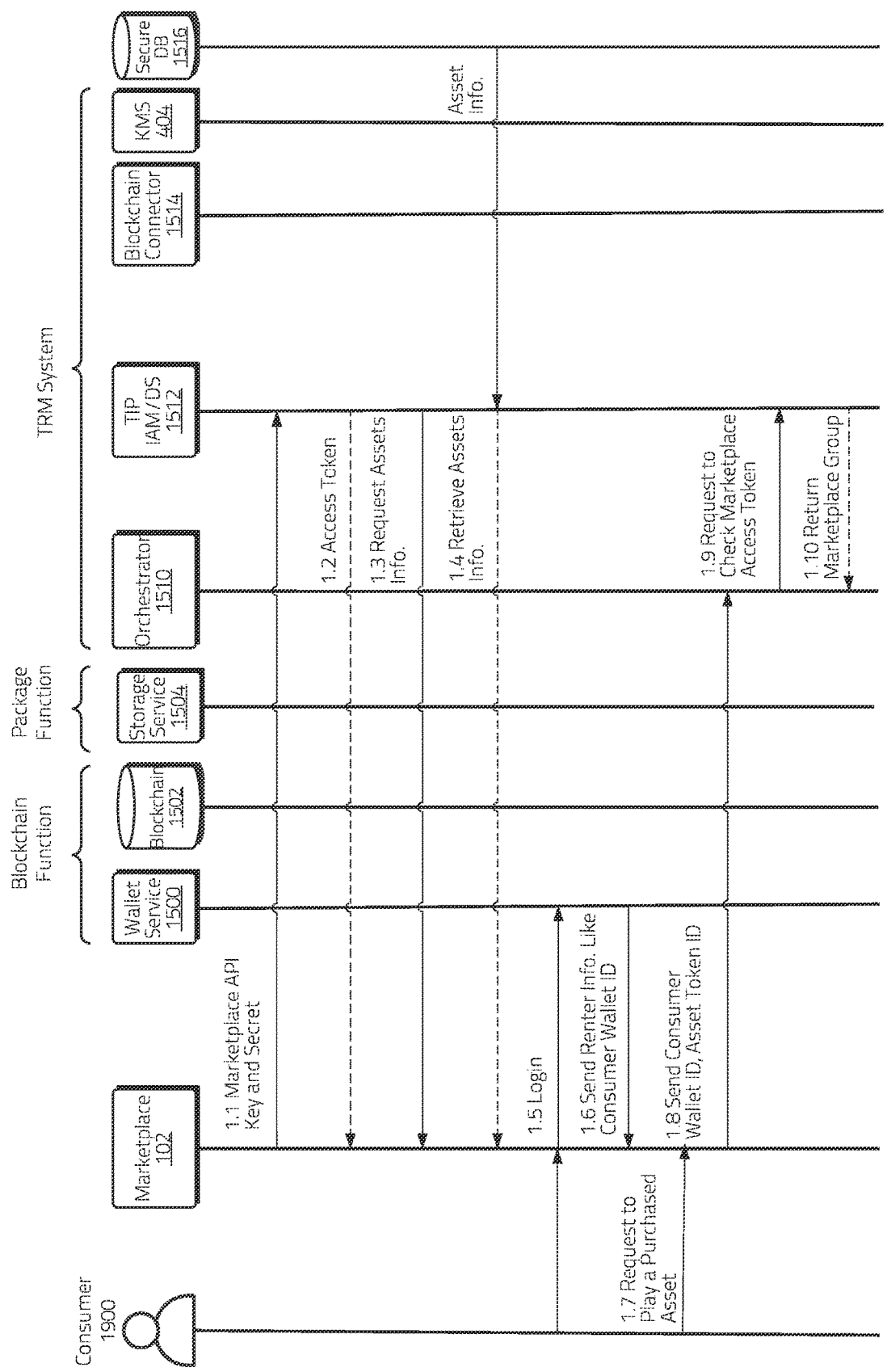
FIG. 19A illustrates a first part of a non-limiting example of an asset playback process using a blockchain ledger consistent with certain embodiments disclosed herein.
Figure 19B:
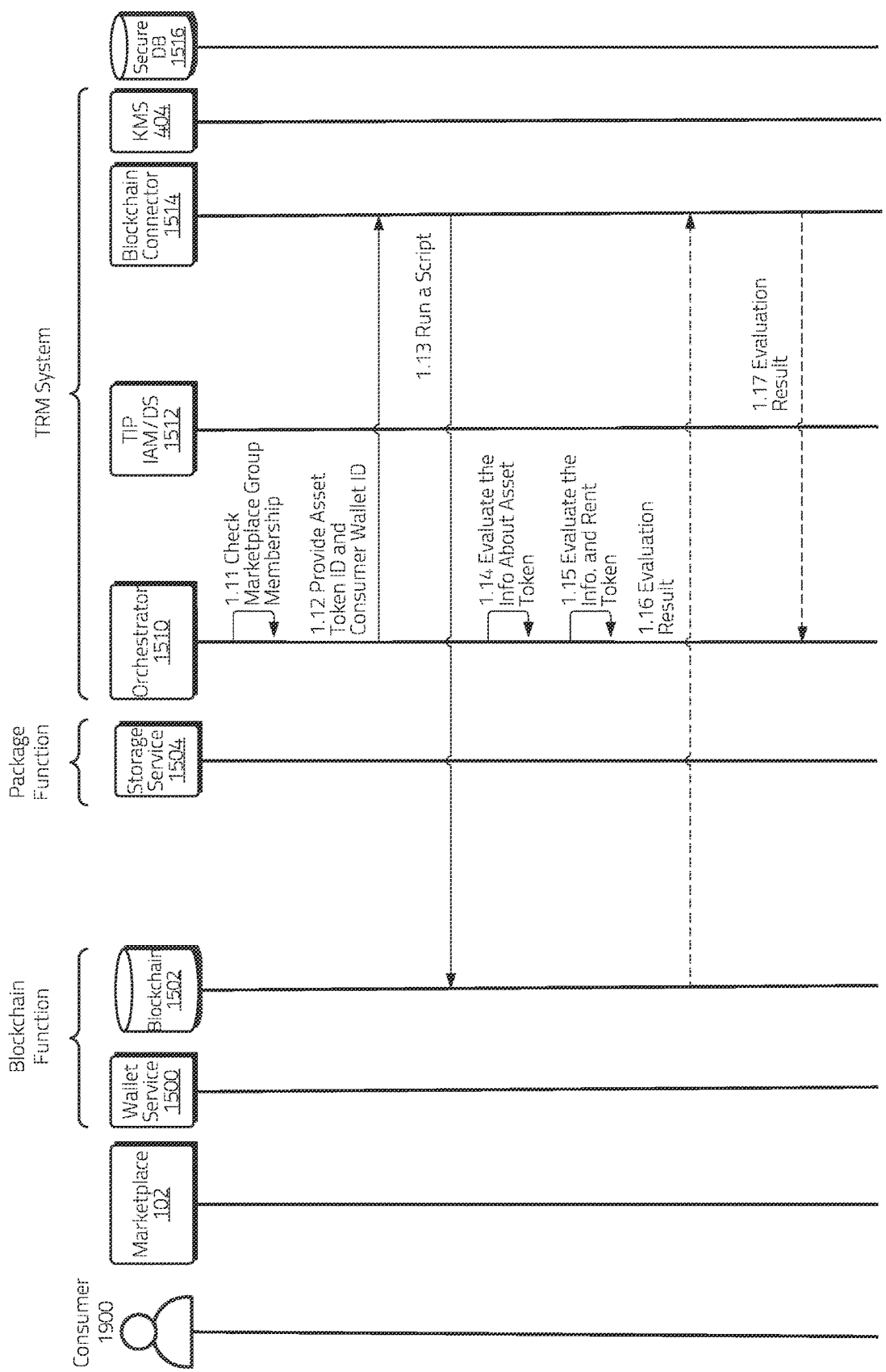
FIG. 19B illustrates a second part of a non-limiting example of an asset playback process using a blockchain ledger consistent with certain embodiments disclosed herein.
Figure 19C:
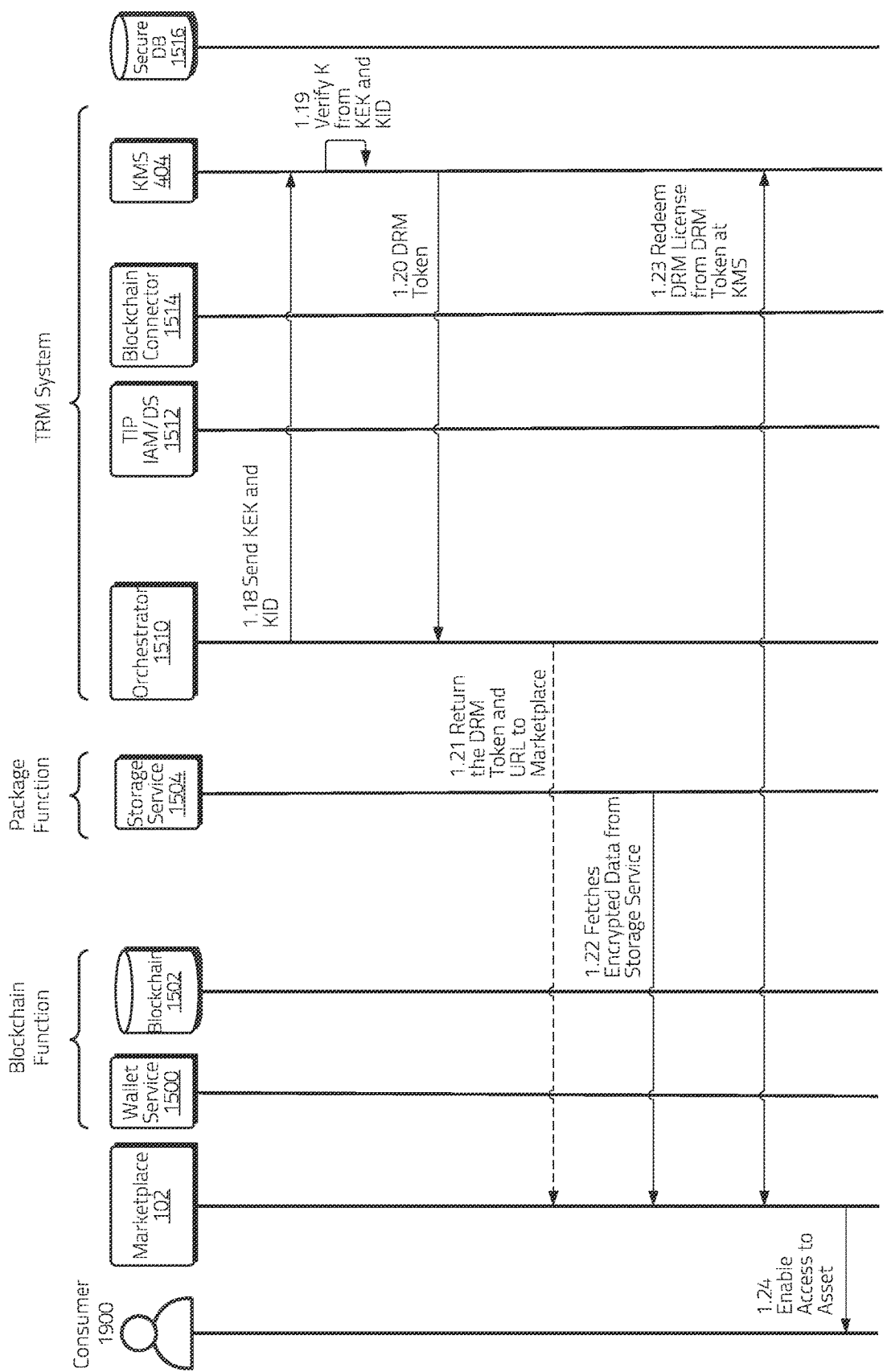
FIG. 19C illustrates a third part of a non-limiting example of an asset playback process using a blockchain ledger consistent with certain embodiments disclosed herein.

FIGS. 19A-19C illustrate a non-limiting example of an asset playback process using a blockchain ledger consistent with certain embodiments disclosed herein.

Steps 1.1-1.4: Retrieve Asset Information

The marketplace service 102 may obtain an access token from the TIP IAM service 1512 using its API key and secret. A list of assets may be fetched by the marketplace service 102 from the DB 1516 using TIP DS services 1512 and its access token.

Steps 1.5-1.6: User Login

A consumer 1900 may login to the wallet service 1500 via the marketplace service 102. In the FLOW blockchain, the marketplace service 102 may use FCL to authenticate the consumer 1900 with the wallet service 1500. The marketplace service 102 may obtain details about the consumer account 1900 such as a wallet ID after the authentication.

Steps 1.7-1.8: Request Asset Playback

The consumer 1900 may select an asset from the list and can choose to playback the asset by requesting the marketplace service 102. The marketplace service 102 may send the consumer wallet ID for the asset, asset token ID, and/or access token to the orchestrator service 1510.

Steps 1.9-1.11: Verify Marketplace

The orchestrator service 1510 may verify the marketplace access token at the TIP IAM service 1512. Marketplace group information may be obtained by the orchestrator service 1510 from the TIP IAM service 1512. The orchestrator service 1510 may verify whether the marketplace service 102 is a member of the marketplace group.

Step 1.12: Initiate Usage Evaluation

The orchestrator service 1510 may provide an asset token ID and consumer wallet ID to the blockchain connector service 1514 to initiate running a script.

Steps 1.14-1.15: Evaluate Usage

After initiating, the script may evaluate usage of the asset at the blockchain 1502. If the asset type is "public," the process may proceed with a "success" result. If the asset type is "private" and the consumer 1900 is the owner of the asset token, the process may proceed to with a "success" result.

If the asset type is "private" and the consumer 1900 is not the owner of the asset token, a check may be performed to determine if there is a rent token associated with the asset token and the consumer 1900. If there is no rent token associated with the asset token and consumer 1900, the process may proceed with a "fail" result.

If there is a rent token associated with the asset token and consumer 1900, the expiry date may be checked in the rent token. If the expiry date is already passed at the current time, the process may proceed with a "fail" result. If the expiry date is not passed at the current time, the process may proceed with a "success" result.

Steps 1.16-1.17: Send Evaluation Result

If there is a "success" result, the KID and URL for the asset token may be sent to the blockchain connector service 1514 from the blockchain 1502, and the blockchain connector service 1514 may forward them to the orchestrator service 1510.

Steps 1.18-1.24: Playback Asset

If the orchestrator service 1510 receives a "success" result from the blockchain connector service 1514 along with a KID and/or URL, the orchestrator service 1510 may proceed to engage in transactions that, in some embodiments, may depend on a DRM implementation and/or use case. For example, in at least one DRM use case, which may be used in implementations involving audio, image, and/or video content, the orchestrator service 1510 may retrieve a KEK stored in a TIP vault. The orchestrator service 1510 may call a KMS 404 via DRM service APIs to issue a token for a DRM license by providing the KEK and the KID. The KMS 404 may verify the K from the KEK and KID before issuing a DRM token. Once the token is issued by the KMS 404, the orchestrator service 1510 may return to the token and the URL to the marketplace service 102. The marketplace service 102 may use the DRM client (e.g., KMS 404) to redeem the token from the DRM service, fetch the encrypted asset data by using the given URL, and initiate the playback of the asset with the player application.

In a non-DRM case, the orchestrator service 1510 may retrieve its secret key from the TIP Vault and encrypted content key from the asset table in the DB 1516. The orchestrator service 1510 may decrypt the encrypted content key with its secret key. The orchestrator service 1510 may retrieve the encrypted asset from the given URL and may decrypt it with the content key. The orchestrator service 1510 may then make the decrypted asset available to the marketplace service 102, and the consumer 1900 can access the asset on the marketplace service 102.

Figure 20:
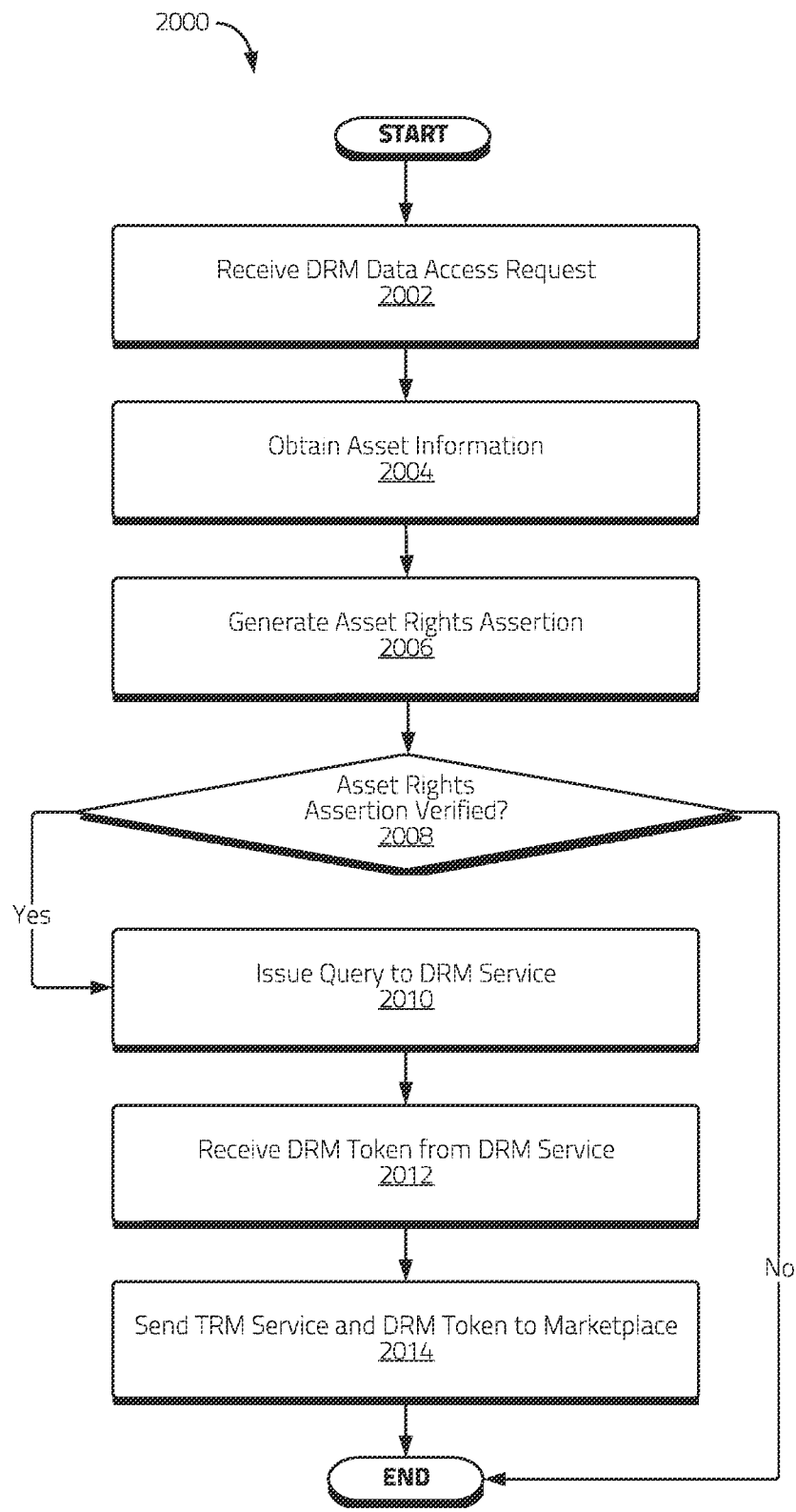
FIG. 20 illustrates a flow chart of a non-limiting example of a method of managing a digital asset consistent with certain embodiments of the present disclosure.

FIG. 20 illustrates a flow chart of a non-limiting example of a method 2000 of managing a digital asset consistent with certain embodiments of the present disclosure. The illustrated method 2000 may be implemented in a variety of ways, including using software, firmware, hardware, and/or any combination thereof. In certain embodiments, various aspects of the method 2000 and/or its constituent steps may be performed by a service, system, and/or device configured to implement embodiments of a TRM service (and/or associated services such as a marketplace service, a TIP service, a TIDAL service, a DRM and/or KMS service, etc.), and/or any other suitable application, device, system and/or service or combination of applications, devices, systems, and/or services.

At 2002, a TRM service may receive from a marketplace service a DRM data access request. In some embodiments, the TRM service may comprise a service of a TIP service. The DRM access request may comprise, among other things, a marketplace access token and/or an identifier associated with a user. In further embodiments, the DRM access request may further comprise an identifier associated with the digital asset and/or an identifier associated with a product that includes the digital asset. In some embodiments, the DRM access request may be issued by the marketplace service to the TRM service in response to a receiving a user request to access a digital asset from the user associated with the identifier.

Asset information may be obtained at 2004 that is associated with the marketplace service based on the marketplace access token included in the DRM access request. In some embodiments, the asset information may comprise, among other things, a hash of the digital asset.

In some embodiments obtaining the asset information associated with the marketplace service may comprise obtaining the asset information from a DB associated with a TIP service. For example, in some embodiments, the marketplace service may be verified with the TIP service using the marketplace access token. Based on successful verification of the marketplace service, an indication may be received from the TIP service on an account identifier associated with the marketplace service, which may be used to obtain the asset information associated with the marketplace.

At 2006, an asset rights assertion may be generated based on the hash of the digital asset and the identifier associated with the user received in the DRM access request. The TRM service may query the asset rights assertion against a trusted ledger, which may comprise a TIDAL and/or a blockchain ledger at 2008. If the asset rights assertion is recorded in the trusted ledger, it may be determined that the user has rights to access the digital asset. In some embodiments, it may be determined that the user is an owner of the digital asset. Checks may be performed to determine whether there are available remaining copies of the digital asset available for consumption and/or further management.

Based on the determination, a query may be issued to a DRM service at 2010. In some embodiments, the DRM service may comprise a KMS service (and may in some implementations be a service of the TIP service). In various embodiments, the TRM service, the marketplace service, the TIP service, the DRM service (and/or KMS service), and the TIDAL may execute on a single system and/or any suitable combination of systems.

The query to the DRM service may comprise a KID and/or a KEK, which may comprise a public encryption key associated with the user. In some embodiments, the KID and/or the KEK may be accessed from a DB associated with the TIP service.

At 2012, the DRM service may issue a DRM token in response to the query. The DRM token may comprise an encrypted version of a content key that may be used to decrypt the digital asset. The TRM service may send the DRM token and location of the digital asset (e.g., a URL) to the marketplace service at 2014 for communication to a system associated with the user.

System and/or Service Architecture

Figure 21:
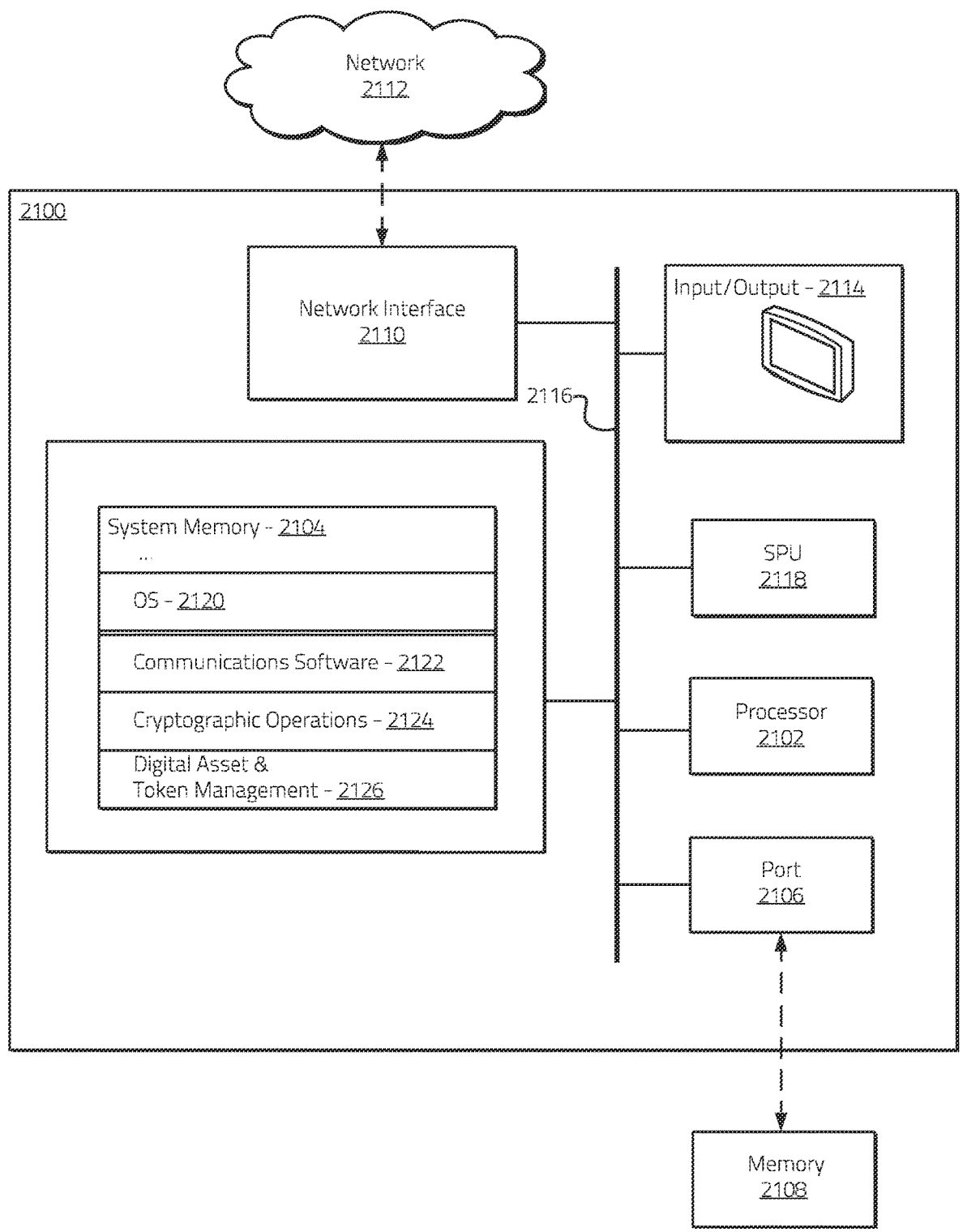
FIG. 21 illustrates a non-limiting example of a system that may be used to implement certain embodiments of the systems and methods of the present disclosure.

FIG. 21 illustrates a non-limiting example of a system 2100 that may be used to implement certain embodiments of the systems and methods of the present disclosure. The system 2100 of FIG. 21 and/or aspects thereof may be included in a system, service, and/or device associated with an owner, an ORH, a consumer, a buyer, a renter, a marketplace service, a TRM service, a TIP service, a TIDAL and/or an associated service, a DRM and/or KMS service, a DB, a file storage service, a payment gateway service, a wallet service, a blockchain service, a media packager service, an orchestrator service, a blockchain connector service, and/or any other service, which may comprise a trusted service, system, and/or component configured to implement embodiments of the disclosed systems and methods and/or aspects thereof.

The various systems and/or devices used in connection with aspects the disclosed embodiments may be communicatively coupled using a variety of networks and/or network connections (e.g., network 2112). In certain embodiments, the network 2112 may comprise a variety of network communication devices and/or channels and may utilize any suitable communications protocols and/or standards facilitating communication between the systems and/or devices. The network 2112 may comprise the Internet, a local area network, a virtual private network, and/or any other communication network utilizing one or more electronic communication technologies and/or standards (e.g., Ethernet or the like). In some embodiments, the network 2112 may comprise a wireless carrier system such as a personal communications system ("PCS"), and/or any other suitable communication system incorporating any suitable communication standards and/or protocols. In further embodiments, the network 2112 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 2112 may incorporate one or more satellite communication links. In yet further embodiments, the network 2112 may utilize IEEE's 802.11 standards, Bluetooth©, ultra-wide band ("UWB"), Zigbee®, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 21, the example system 2100 may comprise: a processing unit 2102; system memory 2104, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 2102; a port 2106 for interfacing with removable memory 608 that may include one or more diskettes, optical storage mediums (e.g., flash memory, thumb drives, USB dongles, compact discs, DVDs, etc.) and/or other non-transitory computer-readable storage mediums; a network interface 2110 for communicating with other systems via one or more network connections and/or networks 2112 using one or more communication technologies; a user interface 2114 that may include a display and/or one or more input/output devices such as, for example, a touchscreen, a keyboard, a mouse, a track pad, and the like; and one or more busses 2116 for communicatively coupling the elements of the system.

In some embodiments, the system 2100 may, alternatively or in addition, include a trusted execution environment and/or an SPU 2118 that is protected from tampering by a user of the system or other entities by utilizing secure physical and/or virtual security techniques. A trusted execution environment and/or a SPU 2118 can help enhance the security of sensitive operations such as personal information management, trusted credential, token, and/or key management, privacy and policy management, and other aspects of the systems and methods disclosed herein. In certain embodiments, the trusted execution environment and/or SPU 2118 may operate in a logically secure processing domain and be configured to protect and operate on secret information, as described herein. In some embodiments, the trusted execution environment and/or a SPU 2118 may include internal memory storing executable instructions or programs configured to enable the SPU 2118 to perform secure operations, as described herein.

The operation of the system 2100 may be generally controlled by the processing unit 2102 and/or an SPU 2118 operating by executing software instructions and programs stored in the system memory 2104 (and/or other computer-readable media, such as memory 2108, which may be removable). The system memory 2104 may store a variety of executable programs or modules for controlling the operation of the system. For example, the system memory may include an operating system ("OS") 2120 that may manage and coordinate, at least in part, and/or system hardware resources and provide for common services for execution of various applications.

The system memory 2104 may further include, without limitation, communication software 2122 configured to enable in part communication with and by the system, one or more applications, a cryptographic operation module 2124 configured to perform various aspects of the disclosed embodiments (e.g., cryptographic key and hash generation operations, key management operations, etc.), one or more verification digital asset and/or token management modules 2126 configured to perform various aspects of the methods disclosed herein, and/or any other information, modules, and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified with the scope and equivalents of the appended claims.

What is claimed is:

1. A method for managing a digital asset performed by a token rights management service, the method comprising:
   receiving, from a marketplace service, a digital asset;
   generating a first hash using the digital asset;
   receiving, from the marketplace service, a digital rights management data access request, the digital rights management data access request comprising a marketplace access token and an identifier associated with a user;
   obtaining asset information associated with the marketplace service based on the marketplace access token, the asset information comprising the first hash;
   generating a second hash using a structured combination of at least the first hash and the identifier associated with the user;
   generating an asset rights assertion comprising the second hash;
   generating a trusted ledger query, the trusted ledger query comprising the asset rights assertion;
   issuing the generated trusted ledger query to a trusted ledger service maintaining a trusted ledger comprising a plurality of cryptographically linked ledger entries;
   receiving, from the trusted ledger service in response to the issued trusted ledger query, an indication verifying that the second hash included in the asset rights assertion has been previously recorded in a cryptographically linked ledger entry of the plurality of cryptographically linked ledger entries of the trusted ledger;
   determining that the user has rights to access the digital asset based on the received indication
   generating a rights management query based on determining that the user has rights to access the digital asset, the rights management query comprising a key identifier and a key encryption key, the key encryption key comprising a public encryption key associated with the user;
   issuing the generated rights management query to a digital rights management service;
   receiving, from the digital rights management service in response to the issued rights management query, a digital rights management token associated with the digital asset, the digital rights management token comprising an encrypted content key, the encrypted content key comprising a content key for the digital asset encrypted with the key encryption key; and
   sending the digital rights management token and an access link for accessing the digital asset to the marketplace service for communication to a system associated with the user.

2. The method of claim 1, wherein the method further comprises storing the first hash in a database associated with a trusted data management service and wherein obtaining the asset information associated with the marketplace service comprises retrieving the asset information from the database associated with the trusted data management service.

3. The method of claim 2, wherein the method further comprises:
   verifying the marketplace service with the trusted data management service using the marketplace access token, wherein verifying the marketplace service with the trusted data management service comprises sending the marketplace access token to the trusted data management service; and
   receiving, based on successful verification of the marketplace service, an indication from the trusted data management service of an account identifier associated with the marketplace service,
   wherein obtaining the asset information associated with the marketplace service is based on the account identifier associated with the marketplace service.

4. The method of claim 2, wherein the token rights management service is a service of the trusted data management service.

5. The method of claim 1, wherein the key identifier and the key encryption key are accessed from a database associated with a trusted data management service.

6. The method of claim 1, wherein the access link for accessing the digital asset comprises a uniform resource locator associated with an electronic file corresponding to the digital asset.

7. The method of claim 1, wherein determining that the user has rights to the digital asset comprises determining that the user is an owner of the digital asset.

8. The method of claim 7, wherein the method further comprises verifying, by the token rights management service, that there is remaining supply of the digital asset.

9. The method of claim 1, wherein the digital rights management data access request comprises at least one of an identifier associated with the digital asset, an identifier associated with a user requesting access to the digital asset, and an identifier associated with a product that includes the digital asset.

10. The method of claim 1, wherein the marketplace service executes on the same system as the token rights management service.

11. The method of claim 1, wherein the trusted ledger comprises a trusted immutable distributed assertion ledger.

12. The method of claim 1, wherein the trusted ledger comprises a blockchain ledger.

13. The method of claim 2, wherein the digital rights management service is a service of the trusted data management service.

* * * * *